United States Patent
Pellegrini et al.

(10) Patent No.: US 10,805,786 B2
(45) Date of Patent: Oct. 13, 2020

(54) SYSTEMS AND USER INTERFACES FOR EMERGENCY DATA INTEGRATION

(71) Applicant: RapidSOS, Inc., New York, NY (US)

(72) Inventors: William Pellegrini, Graham, WA (US); Gabriel Mahoney, Brooklyn, NY (US); Lucas Richard Eager Leavitt, Forest Hills, NY (US); Andrew Hwang, Brooklyn, NY (US); BingJun Sy, Flushing, NY (US); Zvika Ferentz, Rye Brook, NY (US); Henry Katz, Brookline, MA (US); Riccardo Pellegrini, New York, NY (US)

(73) Assignee: RAPIDSOS, INC., New York, NY (US)

( * ) Notice: Subject to any disclaimer, the term of this patent is extended or adjusted under 35 U.S.C. 154(b) by 0 days.

(21) Appl. No.: 16/436,810

(22) Filed: Jun. 10, 2019

(65) Prior Publication Data

US 2019/0380020 A1   Dec. 12, 2019

Related U.S. Application Data

(60) Provisional application No. 62/683,575, filed on Jun. 11, 2018, provisional application No. 62/684,144, (Continued)

(51) Int. Cl.
*H04W 4/90* (2018.01)
*H04M 1/725* (2006.01)
*H04W 4/021* (2018.01)

(52) U.S. Cl.
CPC ......... *H04W 4/90* (2018.02); *H04M 1/72536* (2013.01); *H04W 4/021* (2013.01)

(58) Field of Classification Search
CPC .. H04W 4/02; H04W 64/00; H04L 29/08657; H04L 29/08108; H04L 29/08936;
(Continued)

(56) References Cited

U.S. PATENT DOCUMENTS

| 5,379,337 A | 1/1995 | Castillo et al. |
| 5,479,482 A | 12/1995 | Grimes |

(Continued)

FOREIGN PATENT DOCUMENTS

| CA | 2662606 A1 | 10/2009 |
| CA | 2697986 A1 | 9/2010 |

(Continued)

OTHER PUBLICATIONS

Abel et al. Semantics + Filtering + Search = Twitcident exploring information in social web streams. HT'12—Proceedings of 23rd ACM Conference on Hypertext and Social Media (10 pgs) (2012).

(Continued)

*Primary Examiner* — Dai Phuong
(74) *Attorney, Agent, or Firm* — Wilson Sonsini Goodrich & Rosati

(57) ABSTRACT

Described herein are systems, devices, methods, and media providing emergency data to public safety answering points (PSAPs). Also provided are systems, methods, and media for utilizing location data and geofences to provide emergency data to PSAPs and interactive graphical displays to efficiently display relevant emergency data.

19 Claims, 23 Drawing Sheets

Related U.S. Application Data filed on Jun. 12, 2018, provisional application No. 62/826,680, filed on Mar. 29, 2019.

(58) Field of Classification Search
CPC . G01S 5/0252; G01S 5/02; G01S 5/14; G01S 5/0242; G01S 17/48; G01S 5/16; G01S 5/0263; H04M 1/72572; G01C 21/20
See application file for complete search history.

(56) References Cited

U.S. PATENT DOCUMENTS

| | | |
|---|---|---|
| 5,563,931 A | 10/1996 | Bishop et al. |
| 5,596,625 A | 1/1997 | Leblanc |
| 5,710,803 A | 1/1998 | Kowal et al. |
| 5,742,666 A | 4/1998 | Alpert |
| 6,014,555 A | 1/2000 | Tendler |
| 6,133,853 A | 10/2000 | Obradovich et al. |
| 6,249,674 B1 | 6/2001 | Verdonk |
| 6,252,943 B1 | 6/2001 | Johnson et al. |
| 6,256,489 B1 | 7/2001 | Lichter et al. |
| 6,363,138 B1 | 3/2002 | Aprile |
| 6,459,782 B1 | 10/2002 | Bedrosian et al. |
| 6,477,362 B1 | 11/2002 | Raith et al. |
| 6,502,030 B2 | 12/2002 | Hilleary |
| 6,510,315 B1 | 1/2003 | Arnson |
| 6,556,816 B1 | 4/2003 | Gafrick et al. |
| 6,571,092 B2 | 5/2003 | Faccin et al. |
| 6,574,323 B1 | 6/2003 | Manuel et al. |
| 6,587,545 B1 | 7/2003 | Antonucci et al. |
| 6,594,666 B1 | 7/2003 | Biswas et al. |
| 6,600,812 B1 | 7/2003 | Gentillin et al. |
| 6,628,933 B1 | 9/2003 | Humes |
| 6,680,998 B1 | 1/2004 | Bell et al. |
| 6,707,421 B1 | 3/2004 | Drury et al. |
| 6,731,610 B2 | 5/2004 | Sajikawa et al. |
| 6,993,118 B2 | 1/2006 | Antonucci et al. |
| 7,054,611 B2 | 5/2006 | Eisner et al. |
| 7,058,385 B2 | 6/2006 | Lauper |
| 7,084,775 B1 | 8/2006 | Smith |
| 7,177,400 B2 | 2/2007 | Eisner et al. |
| 7,224,773 B2 | 5/2007 | Croak et al. |
| 7,271,704 B2 | 9/2007 | McSheffrey et al. |
| 7,313,402 B1 | 12/2007 | Rahman |
| 7,324,801 B2 | 1/2008 | Droste et al. |
| 7,349,706 B2 | 3/2008 | Kim et al. |
| 7,409,044 B2 | 8/2008 | Leduc |
| 7,436,938 B2 | 10/2008 | Savaglio et al. |
| 7,437,143 B1 | 10/2008 | Williams |
| 7,469,138 B2 | 12/2008 | Dayar et al. |
| 7,483,519 B2 | 1/2009 | Binning |
| 7,519,351 B2 | 4/2009 | Malone, III |
| 7,519,372 B2 | 4/2009 | MacDonald et al. |
| 7,548,158 B2 | 6/2009 | Titus et al. |
| 7,565,131 B2 | 7/2009 | Rollender |
| 7,646,854 B2 | 1/2010 | Anderson |
| 7,676,215 B2 | 3/2010 | Chin et al. |
| 7,684,782 B2 | 3/2010 | Ashley, Jr. et al. |
| 7,848,733 B2 | 12/2010 | Bull et al. |
| 7,937,067 B2 | 5/2011 | Maier et al. |
| 7,949,326 B2 | 5/2011 | Gallagher et al. |
| 8,009,810 B2 | 8/2011 | Seidberg et al. |
| 8,041,335 B2 | 10/2011 | Khetawat et al. |
| 8,041,341 B1 | 10/2011 | Malackowski et al. |
| 8,045,954 B2 | 10/2011 | Barbeau et al. |
| 8,068,881 B2 | 11/2011 | Schrager |
| 8,102,972 B2 | 1/2012 | Poremba |
| 8,126,424 B2 | 2/2012 | Piett et al. |
| 8,150,367 B1 | 4/2012 | Malladi et al. |
| 8,165,560 B2 | 4/2012 | Stenquist |
| 8,165,562 B2 | 4/2012 | Piett et al. |
| 8,185,087 B2 | 5/2012 | Mitchell, Jr. et al. |
| 8,195,121 B2 | 6/2012 | Dunn et al. |
| 8,219,135 B2 | 7/2012 | De Amorim et al. |
| 8,244,205 B2 | 8/2012 | Wu |
| 8,249,546 B1 | 8/2012 | Shah et al. |
| 8,249,547 B1 | 8/2012 | Fellner |
| 8,289,953 B2 | 10/2012 | Ray et al. |
| 8,306,501 B2 | 11/2012 | Moodbidri et al. |
| 8,326,260 B1 | 12/2012 | Bradish et al. |
| 8,369,488 B2 | 2/2013 | Sennett et al. |
| 8,396,970 B2 | 3/2013 | Black et al. |
| 8,401,565 B2 | 3/2013 | Sandberg et al. |
| 8,417,090 B2 | 4/2013 | Fleming |
| 8,417,212 B2 | 4/2013 | Cepuran et al. |
| 8,442,481 B2 | 5/2013 | Maier et al. |
| 8,442,482 B2 | 5/2013 | Maier et al. |
| 8,472,973 B2 | 6/2013 | Lin et al. |
| 8,484,352 B2 | 7/2013 | Piett et al. |
| 8,489,062 B2 | 7/2013 | Ray et al. |
| 8,509,729 B2 | 8/2013 | Shaw |
| 8,516,122 B2 | 8/2013 | Piett et al. |
| 8,538,370 B2 | 9/2013 | Ray et al. |
| 8,538,468 B2 | 9/2013 | Daly |
| 8,594,015 B2 | 11/2013 | Dunn et al. |
| 8,606,218 B2 | 12/2013 | Ray et al. |
| 8,625,578 B2 | 1/2014 | Roy et al. |
| 8,626,112 B2 | 1/2014 | Ray et al. |
| 8,630,609 B2 | 1/2014 | Ray et al. |
| 8,644,301 B2 | 2/2014 | Tamhankar et al. |
| 8,682,279 B2 | 3/2014 | Rudolf et al. |
| 8,682,281 B2 | 3/2014 | Dunn et al. |
| 8,682,286 B2 | 3/2014 | Dickinson et al. |
| 8,712,366 B2 | 4/2014 | Greene et al. |
| 8,747,336 B2 | 6/2014 | Tran |
| 8,751,265 B2 | 6/2014 | Piett et al. |
| 8,755,767 B2 | 6/2014 | Maier et al. |
| 8,760,290 B2 | 6/2014 | Piett et al. |
| 8,811,935 B2 | 8/2014 | Faccin et al. |
| 8,825,687 B2 | 9/2014 | Marceau et al. |
| 8,848,877 B2 | 9/2014 | Seidberg et al. |
| 8,866,606 B1 | 10/2014 | Will et al. |
| 8,868,028 B1 | 10/2014 | Kaltsukis |
| 8,880,021 B2 | 11/2014 | Hawkins |
| 8,890,685 B1 | 11/2014 | Sookman et al. |
| 8,918,075 B2 | 12/2014 | Maier et al. |
| 8,948,732 B1 | 2/2015 | Negahban et al. |
| 8,971,839 B2 | 3/2015 | Hong |
| 8,984,143 B2 | 3/2015 | Serra et al. |
| 9,008,078 B2 | 4/2015 | Kamdar et al. |
| 9,014,657 B2 | 4/2015 | Rohde et al. |
| 9,019,870 B2 | 4/2015 | Khan et al. |
| 9,071,643 B2 | 6/2015 | Saito et al. |
| 9,077,676 B2 | 7/2015 | Price et al. |
| 9,078,092 B2 | 7/2015 | Piett et al. |
| 9,094,816 B2 | 7/2015 | Maier et al. |
| 9,167,379 B1 | 10/2015 | Hamilton et al. |
| 9,244,922 B2 | 1/2016 | Marceau et al. |
| 9,258,680 B2 | 2/2016 | Drucker |
| 9,277,389 B2 | 3/2016 | Saito et al. |
| 9,351,142 B2 | 5/2016 | Basore et al. |
| 9,369,847 B2 | 6/2016 | Borghei |
| 9,384,491 B1 | 7/2016 | Briggs et al. |
| 9,402,159 B1 | 7/2016 | Self et al. |
| 9,408,051 B2 | 8/2016 | Finney et al. |
| 9,420,099 B1 | 8/2016 | Krishnan et al. |
| 9,497,585 B1 | 11/2016 | Cooley et al. |
| 9,503,876 B2 | 11/2016 | Saito et al. |
| 9,544,750 B1 | 1/2017 | Self et al. |
| 9,591,467 B2 | 3/2017 | Piett et al. |
| 9,629,185 B1 | 4/2017 | Gluckman et al. |
| 9,635,534 B2 | 4/2017 | Maier et al. |
| 9,659,484 B1 | 5/2017 | Mehta et al. |
| 9,693,213 B2 | 6/2017 | Self et al. |
| 9,734,721 B2 | 8/2017 | Stenneth et al. |
| 9,736,670 B2 | 8/2017 | Mehta et al. |
| 9,756,169 B2 | 9/2017 | Mehta et al. |
| 9,805,430 B2 | 10/2017 | Miasnik et al. |
| 9,838,858 B2 | 12/2017 | Anand et al. |
| 9,924,043 B2 | 3/2018 | Mehta et al. |
| 9,942,739 B2 | 4/2018 | Bozik et al. |
| 9,986,404 B2 | 5/2018 | Mehta et al. |
| 9,992,655 B2 | 6/2018 | Anand et al. |
| 9,998,507 B2 | 6/2018 | Mehta et al. |
| 10,002,375 B1 | 6/2018 | Scythes et al. |

(56) References Cited

U.S. PATENT DOCUMENTS

| | | |
|---|---|---|
| 10,136,294 B2 | 11/2018 | Mehta et al. |
| 10,140,482 B2 | 11/2018 | Mehta et al. |
| 10,140,842 B2 | 11/2018 | Mehta et al. |
| 10,142,213 B1 | 11/2018 | Hart et al. |
| 10,165,431 B2 | 12/2018 | Bozik et al. |
| 2001/0051849 A1 | 12/2001 | Boone |
| 2002/0001367 A1 | 1/2002 | Lee |
| 2002/0027975 A1 | 3/2002 | Oxley |
| 2002/0057678 A1 | 5/2002 | Jiang et al. |
| 2002/0120698 A1 | 8/2002 | Tamargo |
| 2003/0069035 A1 | 4/2003 | Shurvinton |
| 2003/0109245 A1 | 6/2003 | McCalmont et al. |
| 2004/0203572 A1 | 10/2004 | Aerrabotu et al. |
| 2004/0229620 A1* | 11/2004 | Zhao ................ H04W 64/00 455/445 |
| 2004/0266390 A1 | 12/2004 | Faucher et al. |
| 2005/0085215 A1 | 4/2005 | Kokko et al. |
| 2005/0104745 A1 | 5/2005 | Bachelder et al. |
| 2005/0151642 A1 | 7/2005 | Tupler et al. |
| 2005/0190892 A1 | 9/2005 | Dawson et al. |
| 2006/0085275 A1 | 4/2006 | Stokes et al. |
| 2006/0109960 A1 | 5/2006 | D'Evelyn et al. |
| 2006/0293024 A1 | 12/2006 | Benco et al. |
| 2007/0003024 A1* | 1/2007 | Olivier ................ H04M 7/1205 379/45 |
| 2007/0030144 A1 | 2/2007 | Titus et al. |
| 2007/0030146 A1 | 2/2007 | Shepherd |
| 2007/0033095 A1 | 2/2007 | Hodgin et al. |
| 2007/0049287 A1 | 3/2007 | Dunn |
| 2007/0053308 A1 | 3/2007 | Dumas et al. |
| 2007/0058528 A1 | 3/2007 | Massa et al. |
| 2007/0060097 A1 | 3/2007 | Edge et al. |
| 2007/0161383 A1 | 7/2007 | Caci |
| 2007/0164872 A1 | 7/2007 | Monroe |
| 2007/0171854 A1 | 7/2007 | Chen et al. |
| 2007/0218895 A1 | 9/2007 | Saito et al. |
| 2008/0019268 A1 | 1/2008 | Rollins |
| 2008/0063153 A1 | 3/2008 | Krivorot et al. |
| 2008/0081646 A1 | 4/2008 | Morin et al. |
| 2008/0166990 A1 | 7/2008 | Toiv |
| 2008/0194238 A1 | 8/2008 | Kwon |
| 2008/0253535 A1 | 10/2008 | Sherry et al. |
| 2008/0294058 A1 | 11/2008 | Shklarski |
| 2009/0134982 A1 | 5/2009 | Robertson et al. |
| 2009/0186596 A1* | 7/2009 | Kaltsukis ................ G08B 25/08 455/404.2 |
| 2009/0214000 A1* | 8/2009 | Patel ................ G06F 21/6245 379/45 |
| 2009/0257345 A1 | 10/2009 | King |
| 2009/0322513 A1 | 12/2009 | Hwang et al. |
| 2010/0002846 A1 | 1/2010 | Ray et al. |
| 2010/0003964 A1 | 1/2010 | Khare et al. |
| 2010/0093305 A1 | 4/2010 | Reich et al. |
| 2010/0156626 A1 | 6/2010 | Story |
| 2010/0159976 A1 | 6/2010 | Marocchi et al. |
| 2010/0166153 A1 | 7/2010 | Guleria et al. |
| 2010/0202368 A1 | 8/2010 | Hans |
| 2010/0238018 A1 | 9/2010 | Kelly |
| 2010/0262668 A1 | 10/2010 | Piett et al. |
| 2011/0009086 A1 | 1/2011 | Poremba et al. |
| 2011/0029600 A1 | 2/2011 | Theimer |
| 2011/0071880 A1* | 3/2011 | Spector ................ H04W 4/90 340/573.1 |
| 2011/0086607 A1 | 4/2011 | Wang et al. |
| 2011/0103266 A1 | 5/2011 | Andreasen et al. |
| 2011/0134897 A1 | 6/2011 | Montemurro et al. |
| 2011/0153368 A1 | 6/2011 | Pierre et al. |
| 2011/0201357 A1 | 8/2011 | Garrett et al. |
| 2011/0263219 A1 | 10/2011 | Hasenfang et al. |
| 2012/0002792 A1 | 1/2012 | Chang |
| 2012/0028599 A1 | 2/2012 | Hatton et al. |
| 2012/0029970 A1 | 2/2012 | Stiles et al. |
| 2012/0040636 A1 | 2/2012 | Kazmi |
| 2012/0092161 A1 | 4/2012 | West |
| 2012/0144019 A1 | 6/2012 | Zhu |
| 2012/0196557 A1 | 8/2012 | Reich et al. |
| 2012/0196558 A1 | 8/2012 | Reich et al. |
| 2012/0202428 A1 | 8/2012 | Mirbaha et al. |
| 2012/0210325 A1 | 8/2012 | De Lind Van Wijngaarden et al. |
| 2012/0218102 A1 | 8/2012 | Bivens et al. |
| 2012/0256745 A1 | 10/2012 | Piett et al. |
| 2012/0257729 A1 | 10/2012 | Piett et al. |
| 2012/0258680 A1 | 10/2012 | Piett et al. |
| 2012/0289243 A1 | 11/2012 | Tarlow et al. |
| 2012/0295575 A1 | 11/2012 | Nam |
| 2012/0309341 A1 | 12/2012 | Ward |
| 2013/0005295 A1 | 1/2013 | Park et al. |
| 2013/0030825 A1 | 1/2013 | Bagwandeen et al. |
| 2013/0036175 A1 | 2/2013 | Lau |
| 2013/0065569 A1 | 3/2013 | Leipzig et al. |
| 2013/0084824 A1 | 4/2013 | Hursey |
| 2013/0102351 A1* | 4/2013 | Mo ................ H04W 4/10 455/518 |
| 2013/0122932 A1 | 5/2013 | Patel et al. |
| 2013/0138791 A1 | 5/2013 | Thomas et al. |
| 2013/0183924 A1 | 7/2013 | Saigh et al. |
| 2013/0185368 A1 | 7/2013 | Nordstrom et al. |
| 2013/0203373 A1 | 8/2013 | Edge |
| 2013/0203376 A1 | 8/2013 | Maier et al. |
| 2013/0226369 A1 | 8/2013 | Yorio et al. |
| 2013/0237175 A1 | 9/2013 | Piett |
| 2013/0237181 A1 | 9/2013 | Ray |
| 2013/0309994 A1* | 11/2013 | Hellwig ................ H04W 4/90 455/404.2 |
| 2013/0331055 A1 | 12/2013 | McKown et al. |
| 2014/0051379 A1 | 2/2014 | Ganesh et al. |
| 2014/0086108 A1 | 3/2014 | Dunn et al. |
| 2014/0087680 A1 | 3/2014 | Luukkala et al. |
| 2014/0095425 A1 | 4/2014 | Sipple |
| 2014/0113606 A1 | 4/2014 | Morken et al. |
| 2014/0126356 A1 | 5/2014 | Lee et al. |
| 2014/0148120 A1 | 5/2014 | Buck |
| 2014/0155018 A1 | 6/2014 | Fan et al. |
| 2014/0164505 A1 | 6/2014 | Daly et al. |
| 2014/0199959 A1 | 7/2014 | Hassan et al. |
| 2014/0248848 A1 | 9/2014 | Mufti et al. |
| 2014/0302810 A1 | 10/2014 | Inha et al. |
| 2014/0324351 A1 | 10/2014 | Dannevik et al. |
| 2014/0359008 A1 | 12/2014 | Finney et al. |
| 2015/0029836 A1 | 1/2015 | Hans et al. |
| 2015/0055453 A1 | 2/2015 | Chaki et al. |
| 2015/0081209 A1 | 3/2015 | Yeh et al. |
| 2015/0085997 A1* | 3/2015 | Biage ................ H04M 3/5116 379/45 |
| 2015/0099481 A1 | 4/2015 | Maitre et al. |
| 2015/0109125 A1 | 4/2015 | Kaib et al. |
| 2015/0111524 A1 | 4/2015 | South et al. |
| 2015/0137972 A1 | 5/2015 | Nepo et al. |
| 2015/0172897 A1 | 6/2015 | Mariathasan et al. |
| 2015/0181401 A1 | 6/2015 | Dhandu et al. |
| 2015/0289121 A1 | 10/2015 | Lesage et al. |
| 2015/0304827 A1 | 10/2015 | Price et al. |
| 2015/0317392 A1 | 11/2015 | Fernandez |
| 2015/0350262 A1 | 12/2015 | Rainisto et al. |
| 2015/0358794 A1 | 12/2015 | Nokhoudian et al. |
| 2015/0365319 A1 | 12/2015 | Finn et al. |
| 2016/0004224 A1 | 1/2016 | Pi |
| 2016/0026768 A1 | 1/2016 | Singh et al. |
| 2016/0034961 A1 | 2/2016 | May et al. |
| 2016/0057595 A1 | 2/2016 | Ahmed et al. |
| 2016/0142894 A1 | 5/2016 | Papakonstantinou et al. |
| 2016/0210581 A1 | 7/2016 | Braun |
| 2016/0219084 A1 | 7/2016 | Abiezzi |
| 2016/0219397 A1 | 7/2016 | Mayor et al. |
| 2016/0227589 A1 | 8/2016 | Marshall et al. |
| 2016/0269535 A1 | 9/2016 | Balabhadruni et al. |
| 2016/0307436 A1 | 10/2016 | Nixon |
| 2016/0315923 A1 | 10/2016 | Riscombe-Burton et al. |
| 2016/0337831 A1 | 11/2016 | Piett et al. |
| 2016/0345171 A1 | 11/2016 | Kulkarni et al. |
| 2016/0353262 A1 | 12/2016 | Acevedo et al. |
| 2016/0353266 A1* | 12/2016 | Winkler ................ H04W 4/90 |
| 2016/0363931 A1 | 12/2016 | Yang et al. |

(56) References Cited

U.S. PATENT DOCUMENTS

| | | |
|---|---|---|
| 2017/0004427 A1 | 1/2017 | Bruchal et al. |
| 2017/0012815 A1 | 1/2017 | Nekrestyanov et al. |
| 2017/0046216 A1 | 2/2017 | Stenneth et al. |
| 2017/0075407 A1 | 3/2017 | Kritt et al. |
| 2017/0099579 A1 | 4/2017 | Ryan et al. |
| 2017/0124670 A1 | 5/2017 | Becker et al. |
| 2017/0140637 A1 | 5/2017 | Thurlow et al. |
| 2017/0142568 A1 | 5/2017 | Saito et al. |
| 2017/0150335 A1 | 5/2017 | Self et al. |
| 2017/0161614 A1 | 6/2017 | Mehta et al. |
| 2017/0180963 A1 | 6/2017 | Cavendish et al. |
| 2017/0180966 A1 | 6/2017 | Piett et al. |
| 2017/0213251 A1 | 7/2017 | Nunally et al. |
| 2017/0238129 A1 | 8/2017 | Maier et al. |
| 2017/0238136 A1 | 8/2017 | Smith |
| 2017/0245113 A1 | 8/2017 | Hooker |
| 2017/0287085 A1 | 10/2017 | Smith et al. |
| 2017/0310827 A1 | 10/2017 | Mehta et al. |
| 2017/0316698 A1 | 11/2017 | Stenneth et al. |
| 2017/0325056 A1 | 11/2017 | Mehta et al. |
| 2017/0359712 A1 | 12/2017 | Meredith et al. |
| 2018/0020091 A1 | 1/2018 | Self et al. |
| 2018/0039737 A1 | 2/2018 | Dempers et al. |
| 2018/0053401 A1 | 2/2018 | Martin et al. |
| 2018/0077282 A1 | 3/2018 | Herron et al. |
| 2018/0152563 A1 | 5/2018 | Mehta et al. |
| 2018/0242133 A1 | 8/2018 | Anand et al. |
| 2018/0249315 A1 | 8/2018 | Mehta et al. |
| 2018/0262544 A1 | 9/2018 | Mehta et al. |
| 2018/0310159 A1 | 10/2018 | Katz et al. |
| 2018/0352408 A1 | 12/2018 | Baer et al. |
| 2019/0020993 A1* | 1/2019 | Nguyen .................. H04W 4/90 |
| 2019/0073894 A1 | 3/2019 | Mehta et al. |
| 2019/0104395 A1 | 4/2019 | Mehta et al. |
| 2019/0166480 A1* | 5/2019 | Rauner .................. H04W 4/90 |
| 2019/0174288 A1 | 6/2019 | Bozik et al. |
| 2019/0174289 A1 | 6/2019 | Martin et al. |

FOREIGN PATENT DOCUMENTS

| | | |
|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2646607 C | 9/2016 |
| CA | 2886535 A1 | 10/2016 |
| CA | 2697986 C | 5/2018 |
| CN | 106021508 A | 10/2016 |
| JP | 2012222443 A | 11/2012 |
| KR | 20090019606 A | 2/2009 |
| KR | 20090092900 A | 9/2009 |
| KR | 20100055746 A | 5/2010 |
| KR | 101305286 B1 | 9/2013 |
| KR | 20140052780 A | 5/2014 |
| KR | 20140093568 A | 7/2014 |
| KR | 20150097031 A | 8/2015 |
| KR | 101602482 B1 | 3/2016 |
| KR | 101612423 B1 | 4/2016 |
| KR | 20160097933 A | 8/2016 |
| KR | 20170100422 A | 9/2017 |
| WO | WO-0022593 A1 | 4/2000 |
| WO | WO-0167419 A2 | 9/2001 |
| WO | WO-2007109599 A2 | 12/2007 |
| WO | WO-2012129561 A1 | 9/2012 |
| WO | WO-2014025563 A1 | 2/2014 |
| WO | WO-2014063121 A1 | 4/2014 |
| WO | WO-2014074420 A1 | 5/2014 |
| WO | WO-2014176646 A1 | 11/2014 |
| WO | WO-2015127867 A1 | 9/2015 |
| WO | WO-2015196155 A1 | 12/2015 |
| WO | WO-2016044540 A1 | 3/2016 |
| WO | WO-2017079354 A1 | 5/2017 |
| WO | WO-2017083571 A1 | 5/2017 |
| WO | WO-2017100220 A1 | 6/2017 |
| WO | WO-2017106775 A1 | 6/2017 |
| WO | WO-2017112820 A1 | 6/2017 |
| WO | WO-2017189610 A2 | 11/2017 |
| WO | WO-2017196753 A1 | 11/2017 |
| WO | WO-2018039142 A1 | 3/2018 |
| WO | WO-2019113129 A1 | 6/2019 |

OTHER PUBLICATIONS

Chowdhury et al. Tweet4act: Using incident-specific profiles for classifying crisis-related messages. Proceedings of the 10th International ISCRAM Conference (pp. 834-839) (2013).
Co-pending U.S. Appl. No. 16/271,634, filed Feb. 8, 2019.
Co-pending U.S. Appl. No. 16/378,363, filed Apr. 8, 2019.
Co-pending U.S. Appl. No. 16/384,600, filed Apr. 15, 2019.
Homeland Security Science and Technology. Using Social Media for Enhanced Situational Awareness and Decision Support. Virtual Social Medial Working Group and DHS First Responders Group. (44 pgs.) (Jun. 2014).
Marcus et al. TwitInfo: Aggregating and Visualizing Microblogs for Event Exploration. ACM CHI Conference 2011 (10 pgs).
Meier. MatchApp: Next Generation Disaster Response App? iRevolution (12 pgs.) (Feb. 27, 2013).
National Emergency Number Association (NENA). Social Networking in 9-1-1 PSAPs Information Document. Available at https://c.ymcdn.com/sites/www.nena.org/resource/resmgr/Standards/NENA-INF-001.1.1-2012_Social (18 pgs) (2012).
PCT/US2017/029465 International Search Report and Written Opinion dated Aug. 9, 2017.
PCT/US2018/063935 International Search Report and Written Opinion dated Mar. 22, 2019.
U.S. Appl. No. 16/209,892 Office Action dated Feb. 8, 2019.
U.S. Appl. No. 16/271,634 Office Action dated Jun. 13, 2019.
Co-pending U.S. Appl. No. 16/537,377, filed Aug. 9, 2019.
PCT/US2019/027538 International Search Report and Written Opinion dated Aug. 2, 2019.
Chohlaswood et al. Mining 911 Calls in New York City: Temporal Patterns, Detection and Forecasting. AAAI Conference on Artificial Intelligence Workshop (Apr. 2015).
Hodgkiss et al. Spatiotemporal Analysis of 911 Call Stream Data. Proceedings of the 2005 national conference on Digital government research (2005).
Jasso et al. Prediction of 911 Call Volumes For Emergency Event Detection. Proceedings of the 8th Annual International Digital Government Research Conference (2007).
U.S. Appl. No. 16/384,600 Office Action dated Apr. 2, 2020.
U.S. Appl. No. 16/421,355 Office Action dated Feb. 4, 2020.
U.S. Appl. No. 16/740,207 Office Action dated Mar. 11, 2020.
Co-pending U.S. Appl. No. 16/684,366, filed Nov. 14, 2019.
Co-pending U.S. Appl. No. 16/740,207, filed Jan. 10, 2020.
U.S. Appl. No. 16/271,634 Office Action dated Dec. 16, 2019.
Co-pending U.S. Appl. No. 16/834,914, filed Mar. 30, 2020.
PCT/US2020/013176 International Search Report and Written Opinion dated May 8, 2020.
Song. Next Generation Emergency Call System with Enhanced Indoor Positioning, Columbia University. Thesis [online] [retrieved Apr. 20, 2020 from< url:https://scholar.google.co.kr/citations/?user=h_4uUqAAAAAJ&hl=ko> (156 pgs) (2014)</url:<a>.
U.S. Appl. No. 16/740,207 Office Action dated Aug. 17, 2020.

* cited by examiner

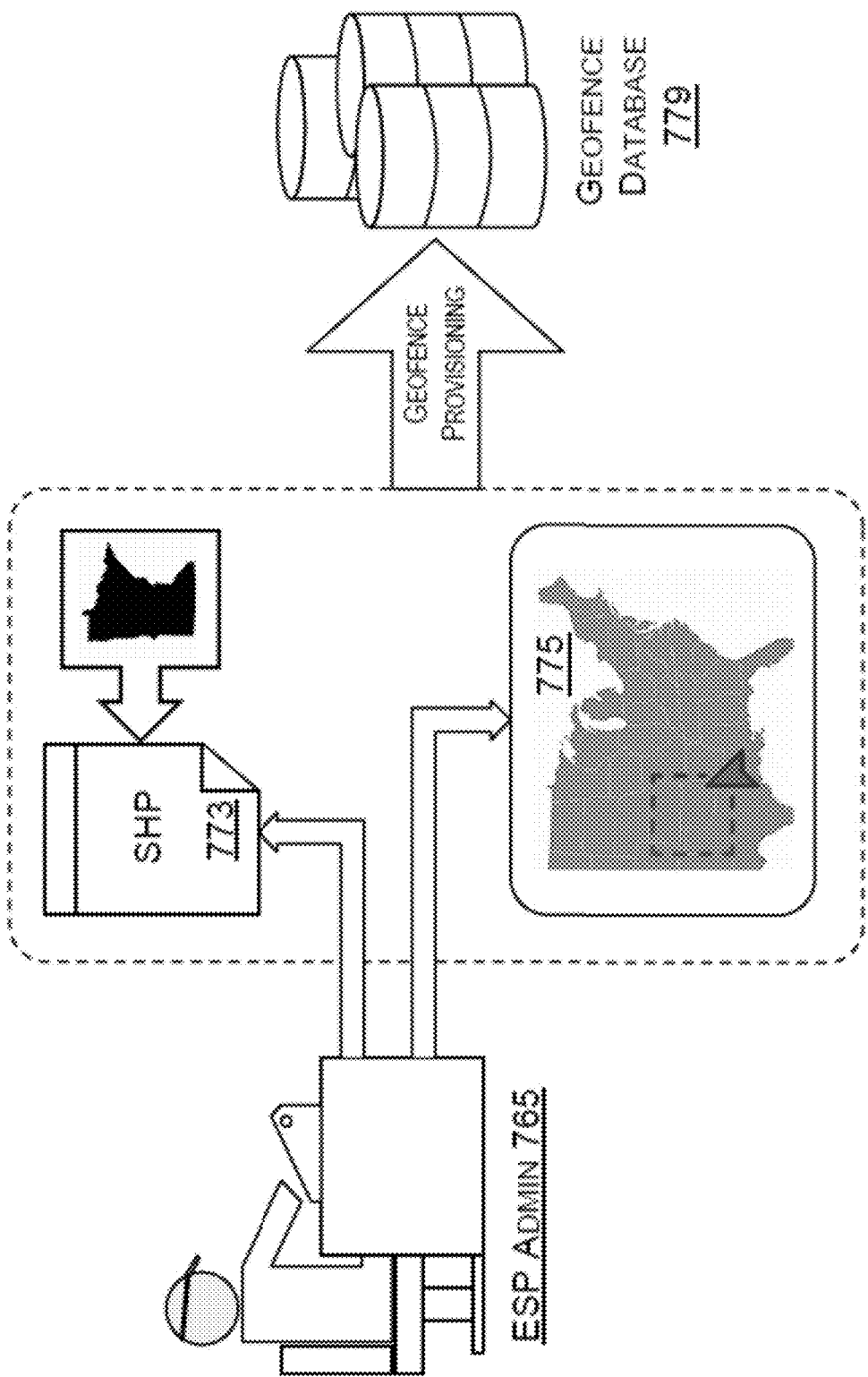

RapidLite

Log Out

Device Identifier

View: Location  Additional Info

1516

All Calls
A-Z R-S-D

1-655-222-4333 1512A
1/23/19 at 4:07PM

1-588-444-3232 1512B
1/23/19 at 3:59PM

1-984-562-4564 1512C
1/23/19 at 3:54PM

1-456-123-7897 1512D
1/23/19 at 3:49PM

1-789-456-1231 1512E
1/23/19 at 3:45PM

1510

Show Details
493

Additional Information 1518A

Last Updated          Today 10:12AM

Caller Info

Caller ID             15884443232

Caller Name           Jerry Jones

Last Known Location

Longitude             40.7072690

Latitude              -74.0074330

Uncertainty Radius    5m

Medical Information 1518B

Medical Info

Allergies             Nuts, eggs

Birthday              1972-5-1

Blood Type            A+

Disabilities          Mute

Gender                Male

Height                75 inches

Medical Conditions    Heart murmur, Asthma

Medical Notes         Has had open heart surgery

FIG. 15

SYSTEMS AND USER INTERFACES FOR EMERGENCY DATA INTEGRATION

CROSS-REFERENCE TO RELATED APPLICATIONS

This application claims the benefit of U.S. Application Ser. No. 62/683,575, filed Jun. 11, 2018, U.S. Application Ser. No. 62/684,144, filed Jun. 12, 2018, and U.S. Application Ser. No. 62/826,680, filed Mar. 29, 2019, the entire contents of which are hereby incorporated by reference.

BACKGROUND OF THE INVENTION

A person in an emergency situation may request help using a mobile communication device such as a cell phone to dial a designated emergency number like 9-1-1 or a direct access phone number for the local emergency service provider (e.g., a public safety answering point (PSAP), or an emergency dispatch center). This call is assigned to one or more first responders by the emergency service provider. However, these communications are typically limited to audio calls with narrow functionality since most emergency service providers that receive emergency calls currently lack the capacity for more sophisticated communications. However, these communications are typically limited to audio calls with narrow functionality because most emergency service providers that receive emergency calls currently lack the capacity for more sophisticated communications. In some instances, location determination is possible with the use of adjacent cellular towers, however, the determination often lacks the precision required to enable a rapid emergency response. Accordingly, emergency service providers are typically limited to verbally receiving emergency locations from the person in the emergency during the emergency call. Unfortunately, there are a great many instances in which a person in an emergency does not know or is otherwise incapable of articulating their location.

SUMMARY OF THE INVENTION

One advantage provided by the systems, servers, devices, methods, and media of the instant application is the ability to gather and deliver device-based hybrid locations (hereinafter, "enhanced locations") and additional data that may be pertinent to emergency situations to emergency service providers (ESPs; e.g., public safety answering points, fire departments, police departments, paramedics, police officers, etc.). In some embodiments, an emergency management system (EMS) includes a clearinghouse (also referred to as an "Emergency Clearinghouse") that functions to receive enhanced locations (e.g., global positioning systems location data, map data) and additional data (e.g., medical history, video feeds, emergency reports, media reports) from various sources (e.g., medical databases, mobile devices of public or first responders, public cameras, police systems, media outlets) and at various times before, during, or after emergency situations and distribute enhanced locations and additional data to ESPs to aid the ESPs in responding to live emergency situations. In some embodiments, the enhanced locations and additional data are delivered by the EMS to a public safety answering point (PSAP). In some embodiments, the enhanced locations and additional data are displayed within a preexisting PSAP system, such as an Automatic Location Identification (ALI) display. In some embodiments, the enhanced locations and additional data are displayed through a graphical user interface provided by an emergency response application separate from the preexisting ESP system (e.g., PSAP system).

In some embodiments, the enhanced locations and additional data are provided through the Emergency Clearinghouse through the use of an emergency response application separate from the preexisting PSAP system. In some embodiments, the PSAP is provided with the device identifier (e.g., phone number, IP address) from an emergency caller through a preexisting ESP system and manually inputs the device identifier into the emergency response application to receive enhanced location and additional data from the Emergency Clearinghouse. In some embodiments, the PSAP is provided with a device identifier from an emergency caller through the preexisting ESP system and the device identifier is automatically transferred (or "pushed") through a websocket into the emergency response application. In this instance, the PSAP automatically receives enhanced location and additional data from the emergency response application upon receiving the device identifier through the preexisting ESP system. In some embodiments, the emergency response application is integrated into the preexisting ESP system to form an integrated PSS system. In this instance, the integrated ESP system automatically receives enhanced location and additional data and allows the use of a single, integrated GUI. In some embodiments, the Emergency Clearinghouse automatically pushes the enhanced location data and additional data through the emergency response application into the integrated ESP system in response to a query generated by the integrated ESP system. In some embodiments, the emergency response application is separate from the preexisting ESP system and the Emergency Clearinghouse automatically pushes the enhanced location data or additional data through the emergency response application without receiving a query from the ESP by using a subscription system, as described below. In this instance, when the Emergency Clearinghouse receives an emergency alert comprising an enhanced location or additional data, the Emergency Clearinghouse or emergency management system can automatically determine one or more ESPs to receive the enhanced location or additional data based on the subscriptions of the one or more ESPs.

The benefits of the systems, applications, servers, devices, methods, and media of the instant application are numerous. Firstly, the emergency response application provides the PSAP with critical information to aid in the response to a given emergency. In the case of location data, the PSAP is enabled to verify the location of the emergency with the caller, rather than relying on the distressed caller to generate the location data. Thus, the PSAP can initiate a response before the user provides the location data, saving seconds or minutes on response time. Secondly, there is currently no mechanism for communicating third party enhanced location data and/or additional data to a PSAP with speed and efficiency. The systems, applications, servers, devices, methods, and media of the instant application allow for the communication of enhanced location data and additional data to the PSAP through a standalone emergency response application accessible by PSAP personnel, or as a software integration of the data pipeline with preexisting ESP systems. Disclosed herein are systems, applications, servers, devices, methods, and media that automatically push data to the PSAP, which is particularly beneficial because it streamlines the emergency response without requiring active input from the PSAP personnel.

Another advantage provided by the systems, servers, devices, methods, and media of the instant application is the ability to access an emergency response application provided to authorized emergency service providers (e.g., PSAPs) for receiving and displaying emergency data, such as enhanced locations. In some embodiments, the emergency response application functions to verify emergency service providers, generate emergency data requests, and display emergency data received from the Emergency Clearinghouse, as described below. In some embodiments, the emergency response application provides a graphical user interface to a computing device that is accessible by members of emergency service providers. In some embodiments, the emergency response application integrates with one or more preexisting ESP systems to provide a seamless and comprehensive emergency data delivery system.

Yet another advantage provided by the systems, servers, devices, methods and media of the instant application is the ability to protect potentially sensitive emergency data using geospatial analysis. In some embodiments, the Emergency Clearinghouse and the emergency response application use geofences to limit the delivery of emergency data to geographically appropriate recipients. In some embodiments, geofences are received from PSAP administrators through the emergency response application, such as by a PSAP administrator defining a jurisdiction of a particular PSAP within a map displayed within a graphical user interface provided by the emergency response application, as described below. In some embodiments, geofences received from PSAP administrators must be verified by public safety officials before the geofences are applied within the Emergency Clearinghouse and emergency response application.

An additional advantage provided by the systems, applications, servers, devices, methods, and media of the instant application is the ability to access a jurisdictional awareness view within the emergency response application. In some embodiments, the jurisdictional awareness view enables an ESP (e.g., a PSAP) to view ongoing and optionally recently received emergency alerts within one or more geofenced jurisdictions. In some embodiments, the jurisdictional management view displays an incident queue (also referred to as a "list of incidents") with numerous incidents associated with a device identifier and a location for each emergency alert. In some embodiments, the location associated with an incident is updated in real time. In some embodiments, the jurisdictional management view displays the location of available emergency services within a variable proximity to a location associated with an incident. In some embodiments, the ESP is enabled to coordinate the dispatch of emergency responders to emergency callers, so as to reduce response times and improve the allocation of resources.

In another aspect, disclosed herein is a method for delivering emergency data to a public safety answering point (PSAP), the method comprising: a) receiving available emergency data associated with a device identifier from one or more third party databases, the emergency data comprising a current location; b) retrieving a geofence associated with the PSAP using the identifier of the PSAP, wherein the geofence encloses a region within a jurisdiction of the PSAP; c) determining if the current location is within the geofence associated with the PSAP; d) in response to determining that the current location is within the geofence associated with the PSAP, transmitting the emergency data to a PSAP computing device; and e) providing an emergency response application comprising a graphical user interface (GUI) accessible by the computing device at the PSAP, the GUI comprising an interactive map showing an incident associated with the device identifier within the jurisdiction of the PSAP and at least one data overlay displaying at least a subset of the emergency data. In some embodiments, the method further comprising accessing an Automatic Location Information (ALI) feed or a Computer Aided Dispatch (CAD) spill to identify the incident and the associated device identifier. In some embodiments, the emergency data associated with the device identifier comprises one or more historical locations. In some embodiments, the method further comprises: a) determining if the one or more historical locations are within the geofence associated with the PSAP; and b) in response to determining that the one or more historical locations are within the geofence associated with the PSAP, transmitting the one or more historical locations to the computing device for display within the interactive map. In some embodiments, determining if the current location is within the geofence associated with the PSAP further comprises applying a buffer that expands one or more boundaries of the geofence when comparing the current location to the geofence. In some embodiments, the buffer is 10 kilometers beyond a boundary of the geofence. In some embodiments, determining if the current location is within the geofence associated with the PSAP further comprises shrinking one or more boundaries of the geofence when comparing the current location to the geofence. In some embodiments, the method the geofence associated with the PSAP is submitted through the GUI by an administrator of the PSAP. In some embodiments, the geofence is a rectangle defined by the administrator of the PSAP on a map within the GUI. In some embodiments, the rectangle is defined using two latitude-longitude coordinates. In some embodiments, the geofence comprises a shape defined by the administrator of the PSAP on a map provided by the GUI. In some embodiments, the geofence is a polygon defined by the administrator of the PSAP on a map provided by the GUI. In some embodiments, the geofence comprises a GIS file. In some embodiments, the geofence comprises a GIS shapefile. In some embodiments, the geofence comprises a plurality of polygons. In some embodiments, the method further comprises PSAP registration steps comprising: a) receiving a registration request for access to the emergency response application from an administrator of the PSAP through the GUI, the registration request comprising a name of the PSAP and a non-emergency landline telephone number of the PSAP; b) receiving an administrator-designated definition of the geofence associated with the PSAP through an interactive map provided by the GUI; c) verifying the PSAP using the name of the PSAP, the non-emergency landline telephone number of the PSAP, and the geofence associated with the PSAP; and d) in response to verifying the PSAP, generating credentials associated with the PSAP and providing access to the emergency response application to the administrator of the PSAP. In some embodiments, the PSAP is authorized to receive the emergency data using a temporary access token. In some embodiments, the temporary access token is generated by a credential management system. In some embodiments, the credentials associated with the PSAP are generated and stored within a credential management system. In some embodiments, the method further comprises: a) receiving selection of a new user account for a PSAP member from an administrator of the PSAP, wherein the selection of a new user account comprises an email address associated with the PSAP member; b) delivering an email comprising the login information to the email address associated with the PSAP member; c) generating the new user account within the credential management system; and d) linking the new user account with both the login information and the credentials associated with the PSAP. In some embodiments, the temporary access token is generated by steps comprising: a) identifying the new user account within the credential management system using the login information; b) identifying the PSAP using the new user account; c) retrieving the credentials associated with the PSAP; and d) deriving the temporary access token from the credentials associated with the PSAP. In some embodiments: a) the selection of a new user account further comprises a user type for the new user account; b) the emergency data request further comprises the user type; and c) the method further comprises differentiating access to the emergency data based on the user type. In some embodiments, the method further comprises: a) in response to receiving the login information from the member of the PSAP, checking an IP address of the computing device against a whitelist of IP addresses; b) in response to determining that the IP address of the computing device is not on the whitelist of IP addresses: i) denying the member of the PSAP access to the emergency response application; and ii) delivering an interactive call to a landline associated with the PSAP, wherein the interactive call audibly dictates an access code; c) receiving the access code from the member of the PSAP through the GUI; and d) providing access to the emergency response application to the member of the PSAP. In some embodiments, the method further comprises: a) in response to receiving the login information from the member of the PSAP, checking an IP address of the computing device against a whitelist of IP addresses; b) in response to determining that the IP address of the computing device is not on the whitelist of IP addresses: i) denying the member of the PSAP access to the emergency response application; and ii) delivering an email to an administrator of the PSAP, the email comprising a confirmation link; c) receiving selection of the confirmation link; and d) in response to receiving selection of the confirmation link, providing access to the emergency response application to the member of the PSAP. In some embodiments, the device identifier is associated with an electronic device used to make an emergency call to the PSAP. In some embodiments, the device identifier is a phone number. In some embodiments, the device identifier is an email address. In some embodiments, the device identifier is manually submitted to the emergency response application by the member of the PSAP through an entry field provided by the GUI. In some embodiments, the device identifier is automatically submitted to the emergency response application by call-taking software installed on the computing device. In some embodiments, the emergency data request is an API GET request. In some embodiments, the emergency data comprises at least one of caller information, sensor data, emergency contact information, emergency indication, and medical information. In some embodiments, the at least one data overlay comprises one or more Internet of Things (IoT) sensors graphically depicted on the interactive map. In some embodiments, the IoT sensors comprise a network-enabled camera, video camera, environmental sensor, or any combination thereof. In some embodiments, the at least one data overlay comprises one or more first responders graphically depicted on the interactive map. In some embodiments, the at least one data overlay comprises traffic data graphically depicted on the interactive map. In some embodiments, the emergency response application is configured to allow user adjustment of one or more filters for graphically depicting at least a subset of the emergency data on the interactive map. In some embodiments, the incident shown on the interactive map is configured to be user selectable and displays at least a subset of the emergency data associated with the incident upon user selection. In some embodiments, the at least a subset of the emergency data comprises user name, user address, emergency contact information, or any combination thereof. In some embodiments, the emergency response application is configured to automatically remove one or more incidents from the interactive map over time. In some embodiments, the interactive map is configured to show a plurality of nearby incidents located in proximity to the incident. In some embodiments, the emergency response application is configured to display a queue of ongoing or recent incidents.

In another aspect, disclosed herein is a method for delivering emergency data to a public safety answering point (PSAP), the method comprising: a) providing an emergency response comprising a graphical user interface (GUI) accessible by a computing device at a public safety answering point; b) receiving login information for a member of the PSAP from the computing device; c) generating a temporary access token authorizing the member of the PSAP to access emergency data, wherein the temporary access token is derived from credentials associated with the PSAP; d) accessing a data feed of the PSAP to identify an emergency incident and an associated device identifier; e) associating the emergency incident with an identifier of the PSAP based on the temporary access token; f) receiving emergency data associated with the device identifier from one or more databases, the emergency data comprising a current location; and g) transmitting the emergency data to the computing device for display on the computing device through the GUI, the GUI comprising an interactive map showing an incident associated with the device identifier within the jurisdiction of the PSAP and at least one data overlay displaying at least a subset of the emergency data.

In another aspect, disclosed herein is a system for delivering emergency data to a public safety answering point (PSAP), the system comprising: a) an emergency response application communicatively coupled to a network server and comprising a graphical user interface (GUI) accessible by a PSAP computing device through the computing network, wherein the emergency response application is configured to: i) receive emergency data regarding an emergency incident, the emergency data comprising a device identifier and a current location; and ii) display an interactive map through the GUI showing the emergency incident within the jurisdiction of the PSAP and at least one data overlay displaying at least a subset of the emergency data; and b) an emergency management system (EMS) communicatively coupled to the network server and configured to: i) gather emergency data associated with the device identifier from one or more third party databases, the emergency data comprising a current location; ii) retrieve a geofence associated with the PSAP using an identifier of the PSAP, wherein a geofence encloses a region within a jurisdiction of the PSAP; iii) determining if the current location is within the geofence associated with the PSAP; and in response to determining that the current location is within the geofence associated with the PSAP, transmitting the emergency data to the computing device for display through the GUI. In some embodiments, the EMS is further configured to configured to: a) receive definition of a role for the PSAP; b) display the second set of data categories; and c) receive selection of the first set of data categories to be accessible for the role from the second set of data categories, wherein the first set of data categories is a subset of the second set of data categories. In some embodiments, the system is further configured to access an Automatic Location Information (ALI) feed or a Computer Aided Dispatch (CAD) spill to identify the incident and the associated device identifier. In some embodiments, the emergency data associated with the device identifier comprises one or more historical locations.

In some embodiments, the system is further configured to: a) determine if the one or more historical locations are within the geofence associated with the PSAP; and b) in response to determining that the one or more historical locations are within the geofence associated with the PSAP, transmit the one or more historical locations to the computing device for display within the interactive map. In some embodiments, determining if the current location is within the geofence associated with the PSAP further comprises applying a buffer that expands one or more boundaries of the geofence when comparing the current location to the geofence. In some embodiments, the buffer is 10 kilometers beyond a boundary of the geofence. In some embodiments, determining if the current location is within the geofence associated with the PSAP further comprises shrinking one or more boundaries of the geofence when comparing the current location to the geofence. In some embodiments, the geofence associated with the PSAP is submitted through the GUI by an administrator of the PSAP. 52. The system of embodiment 51, wherein the geofence is a rectangle defined by the administrator of the PSAP on a map within the GUI. In some embodiments, the rectangle is defined using two latitude-longitude coordinates. In some embodiments, the geofence comprises a shape defined by the administrator of the PSAP on a map provided by the GUI. In some embodiments, the geofence is a polygon defined by the administrator of the PSAP on a map provided by the GUI. In some embodiments, the geofence comprises a GIS file. In some embodiments, the geofence comprises a GIS shapefile. In some embodiments, the geofence comprises a plurality of polygons. In some embodiments, the system is further configured to receive a PSAP registration, the PSAP registration comprising: a) a registration request for access to the emergency response application from an administrator of the PSAP through the GUI, the registration request comprising a name of the PSAP and a non-emergency landline telephone number of the PSAP; b) an administrator-designated definition of the geofence associated with the PSAP through an interactive map provided by the GUI; c) verification of the PSAP using the name of the PSAP, the non-emergency landline telephone number of the PSAP, and the geofence associated with the PSAP; and d) credentials associated with the PSAP and providing access to the emergency response application to the administrator of the PSAP. In some embodiments, the PSAP is authorized to receive the emergency data using a temporary access token. In some embodiments, the temporary access token is generated by a credential management system. In some embodiments, the credentials associated with the PSAP are generated and stored within a credential management system. In some embodiments, the system is further configured to: a) receive a selection of a new user account for a PSAP member from an administrator of the PSAP, wherein the selection of a new user account comprises an email address associated with the PSAP member; b) deliver an email comprising the login information to the email address associated with the PSAP member; c) generate the new user account within the credential management system; and d) link the new user account with both the login information and the credentials associated with the PSAP. In some embodiments, the temporary access token is generated by steps comprising: a) identifying the new user account within the credential management system using the login information; b) identifying the PSAP using the new user account; c) retrieving the credentials associated with the PSAP; and d) deriving the temporary access token from the credentials associated with the PSAP. In some embodiments: a) wherein the selection of a new user account further comprises a user type for the new user account; b) the emergency data request further comprises the user type; and c) the system is further configured to differentiate access to the emergency data based on the user type. In some embodiments, the system is further configured to: a) in response to receiving the login information from the member of the PSAP, check an IP address of the computing device against a whitelist of IP addresses; b) in response to determining that the IP address of the computing device is not on the whitelist of IP addresses: i) deny the member of the PSAP access to the emergency response application; and ii) deliver an interactive call to a landline associated with the PSAP, wherein the interactive call audibly dictates an access code; c) receive the access code from the member of the PSAP through the GUI; and d) provide access to the emergency response application to the member of the PSAP. In some embodiments, the system is further configured to: a) in response to receiving the login information from the member of the PSAP, check an IP address of the computing device against a whitelist of IP addresses; b) in response to determining that the IP address of the computing device is not on the whitelist of IP addresses: i) deny the member of the PSAP access to the emergency response application; and ii) deliver an email to an administrator of the PSAP, the email comprising a confirmation link; c) receive selection of the confirmation link; and d) in response to receiving selection of the confirmation link, provide access to the emergency response application to the member of the PSAP. In some embodiments, the device identifier is associated with an electronic device used to make an emergency call to the PSAP. In some embodiments, the device identifier is a phone number. In some embodiments, the device identifier is an email address. In some embodiments, the device identifier is manually submitted to the emergency response application by the member of the PSAP through an entry field provided by the GUI. In some embodiments, the device identifier is automatically submitted to the emergency response application by call-taking software installed on the computing device. In some embodiments, the emergency data request is an API GET request. In some embodiments, the emergency data comprises at least one of caller information, sensor data, emergency contact information, emergency indication, and medical information. In some embodiments, the at least one data overlay comprises one or more Internet of Things (IoT) sensors graphically depicted on the interactive map. In some embodiments, the IoT sensors comprise a network-enabled camera, video camera, environmental sensor, or any combination thereof. In some embodiments, the at least one data overlay comprises one or more first responders graphically depicted on the interactive map. In some embodiments, the at least one data overlay comprises traffic data graphically depicted on the interactive map. In some embodiments, the emergency response application is configured to allow user adjustment of one or more filters for graphically depicting at least a subset of the emergency data on the interactive map. In some embodiments, the incident shown on the interactive map is configured to be user selectable and displays at least a subset of the emergency data associated with the incident upon user selection. In some embodiments, the at least a subset of the emergency data comprises user name, user address, emergency contact information, or any combination thereof. In some embodiments, the emergency response application is configured to automatically remove one or more incidents from the interactive map over time. In some embodiments, the interactive map is configured to show a plurality of nearby incidents located in proximity to the incident. In some embodiments, the emergency response application is configured to display a queue of ongoing or recent incidents. 85.

In another aspect, disclosed herein is a system for delivering emergency data to a public safety answering point (PSAP), the system configured to: a) provide an emergency response comprising a graphical user interface (GUI) accessible by a computing device at a public safety answering point; b) receive login information for a member of the PSAP from the computing device; c) generate temporary access token authorizing the member of the PSAP to access emergency data, wherein the temporary access token is derived from credentials associated with the PSAP; d) access a data feed of the PSAP to identify an emergency incident and an associated device identifier; e) associate the emergency incident with an identifier of the PSAP based on the temporary access token; f) receive emergency data associated with the device identifier from one or more databases, the emergency data comprising a current location; and transmit the emergency data to the computing device for display on the computing device through the GUI, the GUI comprising an interactive map showing an incident associated with the device identifier within the jurisdiction of the PSAP and at least one data overlay displaying at least a subset of the emergency data.

In another aspect, disclosed herein is non-transitory computer readable storage media encoded with a computer program including instructions executable by at least one processor for: a) receiving available emergency data associated with a device identifier from one or more third party databases, the emergency data comprising a current location; b) retrieving a geofence associated with the PSAP using the identifier of the PSAP, wherein the geofence encloses a region within the jurisdiction of the PSAP; c) determining if the current location is within the geofence associated with the PSAP; d) in response to determining that the current location is within the geofence associated with the PSAP, transmitting the emergency data to a PSAP computing device; and e) providing an emergency response application comprising a graphical user interface (GUI) accessible by the computing device at the PSAP, the GUI comprising an interactive map showing an incident associated with the device identifier within the jurisdiction of the PSAP and at least one data overlay displaying at least a subset of the emergency data. In some embodiments, the instructions further comprise accessing an Automatic Location Information (ALI) feed or a Computer Aided Dispatch (CAD) spill to identify the incident and the associated device identifier. In some embodiments, the emergency data associated with the device identifier comprises one or more historical locations. In some embodiments, further comprising: a) determining if the one or more historical locations are within the geofence associated with the PSAP; and b) in response to determining that the one or more historical locations are within the geofence associated with the PSAP, transmitting the one or more historical locations to the computing device for display within the interactive map. In some embodiments, determining if the current location is within the geofence associated with the PSAP further comprises applying a buffer that expands one or more boundaries of the geofence when comparing the current location to the geofence. In some embodiments, the buffer is 10 kilometers beyond a boundary of the geofence. In some embodiments, determining if the current location is within the geofence associated with the PSAP further comprises shrinking one or more boundaries of the geofence when comparing the current location to the geofence. In some embodiments, the geofence associated with the PSAP is submitted through the GUI by an administrator of the PSAP. In some embodiments, the geofence is a rectangle defined by the administrator of the PSAP on a map within the GUI. In some embodiments, the rectangle is defined using two latitude-longitude coordinates. In some embodiments, the geofence comprises a shape defined by the administrator of the PSAP on a map provided by the GUI. In some embodiments, the geofence is a polygon defined by the administrator of the PSAP on a map provided by the GUI. In some embodiments, the geofence comprises a GIS file. In some embodiments, the geofence comprises a GIS shapefile. In some embodiments, the geofence comprises a plurality of polygons. In some embodiments, further comprising PSAP registration steps comprising: a) receiving a registration request for access to the emergency response application from an administrator of the PSAP through the GUI, the registration request comprising a name of the PSAP and a non-emergency landline telephone number of the PSAP; b) receiving an administrator-designated definition of the geofence associated with the PSAP through an interactive map provided by the GUI; c) verifying the PSAP using the name of the PSAP, the non-emergency landline telephone number of the PSAP, and the geofence associated with the PSAP; and d) in response to verifying the PSAP, generating credentials associated with the PSAP and providing access to the emergency response application to the administrator of the PSAP. In some embodiments, the PSAP is authorized to receive the emergency data using a temporary access token. In some embodiments, the temporary access token is generated by a credential management system. In some embodiments, the credentials associated with the PSAP are generated and stored within a credential management system. In some embodiments, further comprising: a) receiving selection of a new user account for a PSAP member from an administrator of the PSAP, wherein the selection of a new user account comprises an email address associated with the PSAP member; b) delivering an email comprising the login information to the email address associated with the PSAP member; c) generating the new user account within the credential management system; and d) linking the new user account with both the login information and the credentials associated with the PSAP. In some embodiments, the temporary access token is generated by steps comprising: a) identifying the new user account within the credential management system using the login information; b) identifying the PSAP using the new user account; c) retrieving the credentials associated with the PSAP; and d) deriving the temporary access token from the credentials associated with the PSAP. In some embodiments: a) the selection of a new user account further comprises a user type for the new user account; b) the emergency data request further comprises the user type; and c) further comprising differentiating access to the emergency data based on the user type. In some embodiments, further comprising: a) in response to receiving the login information from the member of the PSAP, checking an IP address of the computing device against a whitelist of IP addresses; b) in response to determining that the IP address of the computing device is not on the whitelist of IP addresses: i) denying the member of the PSAP access to the emergency response application; and ii) delivering an interactive call to a landline associated with the PSAP, wherein the interactive call audibly dictates an access code; c) receiving the access code from the member of the PSAP through the GUI; and d) providing access to the emergency response application to the member of the PSAP. In some embodiments, further comprising: a) in response to receiving the login information from the member of the PSAP, checking an IP address of the computing device against a whitelist of IP addresses; b) in response to determining that the IP address of the computing device is not on the whitelist of IP addresses: i) denying the member of the PSAP access to the emergency response application; and ii) delivering an email to an administrator of the PSAP, the email comprising a confirmation link; c) receiving selection of the confirmation link; and d) in response to receiving selection of the confirmation link, providing access to the emergency response application to the member of the PSAP. In some embodiments, the device identifier is associated with an electronic device used to make an emergency call to the PSAP. In some embodiments, the device identifier is a phone number. In some embodiments, the device identifier is an email address. In some embodiments, the device identifier is manually submitted to the emergency response application by the member of the PSAP through an entry field provided by the GUI. In some embodiments, the device identifier is automatically submitted to the emergency response application by call-taking software installed on the computing device. In some embodiments, the emergency data request is an API GET request. In some embodiments, the emergency data comprises at least one of caller information, sensor data, emergency contact information, emergency indication, and medical information. In some embodiments, the at least one data overlay comprises one or more Internet of Things (IoT) sensors graphically depicted on the interactive map. In some embodiments, the IoT sensors comprise a network-enabled camera, video camera, environmental sensor, or any combination thereof. In some embodiments, the at least one data overlay comprises one or more first responders graphically depicted on the interactive map. In some embodiments, the at least one data overlay comprises traffic data graphically depicted on the interactive map. In some embodiments, the emergency response application is configured to allow user adjustment of one or more filters for graphically depicting at least a subset of the emergency data on the interactive map. In some embodiments, the incident shown on the interactive map is configured to be user selectable and displays at least a subset of the emergency data associated with the incident upon user selection. In some embodiments, the at least a subset of the emergency data comprises user name, user address, emergency contact information, or any combination thereof. In some embodiments, the emergency response application is configured to automatically remove one or more incidents from the interactive map over time. In some embodiments, the interactive map is configured to show a plurality of nearby incidents located in proximity to the incident. In some embodiments, the emergency response application is configured to display a queue of ongoing or recent incidents.

In another aspect, disclosed herein is non-transitory computer readable storage media encoded with a computer program including instructions executable by at least one processor for: a) providing an emergency response comprising a graphical user interface (GUI) accessible by a computing device at a public safety answering point; b) receiving login information for a member of the PSAP from the computing device; c) generating a temporary access token authorizing the member of the PSAP to access emergency data, wherein the temporary access token is derived from credentials associated with the PSAP; d) accessing a data feed of the PSAP to identify an emergency incident and an associated device identifier; e) associating the emergency incident with an identifier of the PSAP based on the temporary access token; f) receiving emergency data associated with the device identifier from one or more databases, the emergency data comprising a current location; and g) transmitting the emergency data to the computing device for display on the computing device through the GUI, the GUI comprising an interactive map showing an incident associated with the device identifier within the jurisdiction of the PSAP and at least one data overlay displaying at least a subset of the emergency data.

In another aspect, disclosed herein is a method for delivering emergency data to an emergency service provider (ESP), the method comprising: a) receiving an emergency alert associated with a device identifier, the emergency alert comprising a current location; b) determining a ESP for responding at the current location by retrieving a geofence associated with the ESP, and determining if the current location is within the geofence associated with the ESP; c) in response to determining that the current location is within the geofence associated with the ESP, transmitting the emergency data to an ESP computing device; and d) providing an emergency response application comprising a graphical user interface (GUI) accessible by the computing device at the ESP, the GUI comprising two sections: i) a first section comprising a list of emergency alerts and ii) a second section comprising an interactive map showing an incident location associated with the device identifier. In some embodiments, the ESP is an emergency authority such as a PSAP. In some embodiments, the list of emergency alerts comprises a list of emergency calls located within the geofence of the ESP. In some embodiments, the list of emergency alerts is ordered by the time the emergency call was received. In some embodiments, the list of emergency alerts is a prioritized list. In some embodiments, an ESP user selects an emergency alert in the list of emergency alerts to obtain the emergency data. In some embodiments, the GUI comprises a third section where the emergency data regarding the selected emergency alert is displayed. In some embodiments, the emergency alert comprises an emergency notification indicating an on-going emergency call. In some embodiments, the emergency alert is initiated by user input on a user device associated with the device identifier. In some embodiments, the emergency alert is initiated by one or more sensor readings from a user device associate with the device identifier. In some embodiments, further comprising marking two or more emergency alerts associated with one incident. In some embodiments, the current location falls within the jurisdiction of two or more ESPs and the emergency data is provided to the two or more ESPs. In some embodiments, the emergency data associated with the device identifier comprises one or more historical locations. In some embodiments, the device identifier is a phone number. In some embodiments, the device identifier is an email address. In some embodiments, the device identifier is an IP address. In some embodiments, the emergency data comprises at least one of caller information, sensor data, emergency contact information, emergency indication, and medical information. In some embodiments, the at least one data overlay comprises one or more Internet of Things (IoT) sensors graphically depicted on the interactive map. In some embodiments, the IoT sensors comprise a network-enabled camera, video camera, environmental sensor, or any combination thereof. In some embodiments, the at least one data overlay comprises one or more first responders graphically depicted on the interactive map. In some embodiments, the at least one data overlay comprises traffic data graphically depicted on the interactive map. In some embodiments, the emergency response application is configured to allow user adjustment of one or more filters for graphically depicting at least a subset of the emergency data on the interactive map. In some embodiments, the incident shown on the interactive map is configured to be user selectable and displays at least a subset of the emergency data associated with the incident upon user selection. In some embodiments, the at least a subset of the emergency data comprises user name, user address, emergency contact information, or any combination thereof. In some embodiments, the emergency response application is configured to automatically remove one or more incidents from the interactive map over time. In some embodiments, differential access to the emergency data is provided to an ESP user based on their assigned role.

In another aspect, disclosed herein is a method for presenting emergency data at a computing system of an emergency service provider (ESP), the method comprising: a) receiving, by the computing system, emergency data sourced from one or more third party databases, the emergency data comprising a current location and an associated device identifier; b) detecting, by the computing system, an emergency alert associated with the device identifier; c) linking, by the computing system, the emergency alert to the emergency data; and d) providing, by the computing system, a graphical user interface (GUI) comprising: i) an interactive map showing a geographic representation of a jurisdiction of the ESP and graphically depicting one or more emergency alerts within the jurisdiction, wherein the one or more emergency alerts comprises the emergency alert associated with the device identifier; and ii) a list of one or more emergency alerts showing at least a subset of the emergency data associated with the one or more emergency alerts.

In another aspect, disclosed herein is a computer-implemented system for presenting emergency data at an emergency service provider (ESP), the system comprising an emergency response application communicatively coupled to a network server and comprising a graphical user interface (GUI) accessible by a PSAP computing device through the computing network, wherein the emergency response application is configured to: a) receive emergency data sourced from one or more third party databases, the emergency data comprising a current location and an associated device identifier; b) detect an emergency alert associated with the device identifier; c) link the emergency alert to the emergency data; and d) provide a graphical user interface (GUI) comprising: i) an interactive map showing a geographic representation of a jurisdiction of the ESP and graphically depicting one or more emergency alerts within the jurisdiction, wherein the one or more emergency alerts comprises the emergency alert associated with the device identifier; and ii) a list of one or more emergency alerts showing at least a subset of the emergency data associated with the one or more emergency alerts.

In another aspect, disclosed herein is a method for presenting emergency data at a computing system of an emergency service provider (ESP), the method comprising: a) receiving, by the computing system, emergency data sourced from one or more third party databases, the emergency data comprising a current location and an associated device identifier; b) detecting, by the computing system, an emergency alert associated with the device identifier; c) linking, by the computing system, the emergency alert to the emergency data; and d) providing, by the computing system, a graphical user interface (GUI) comprising: i) an interactive map showing a geographic representation of a jurisdiction of the ESP and graphically depicting one or more emergency alerts within the jurisdiction, wherein the one or more emergency alerts comprises the emergency alert associated with the device identifier; and ii) a list of one or more emergency alerts showing at least a subset of the emergency data associated with the one or more emergency alerts.

In another aspect, disclosed herein is a method for delivering emergency data to a public safety answering point (PSAP), the method comprising: a) receiving available emergency data associated with a device identifier from one or more third party databases, the emergency data comprising a current location; b) retrieving a geofence associated with the PSAP using the identifier of the PSAP, wherein the geofence encloses a region within a jurisdiction of the PSAP; c) determining if the current location is within the geofence associated with the PSAP; d) in response to determining that the current location is within the geofence associated with the PSAP, transmitting the emergency data to a PSAP computing device; and e) providing an emergency response application comprising a graphical user interface (GUI) accessible by the computing device at the PSAP, the GUI comprising: i) an interactive map showing a geographic representation of a jurisdiction of the PSAP and graphically depicting one or more incidents within the jurisdiction; and ii) a list of one or more incidents showing at least a subset of the emergency data that is associated with the one or more incidents.

In another aspect, disclosed herein is a method for delivering emergency data to a public safety answering point (PSAP), the method comprising: a) providing an emergency response comprising a graphical user interface (GUI) accessible by a computing device at a public safety answering point; b) receiving login information for a member of the PSAP from the computing device; c) generating a temporary access token authorizing the member of the PSAP to access emergency data, wherein the temporary access token is derived from credentials associated with the PSAP; d) accessing a data feed of the PSAP to identify an emergency incident and an associated device identifier; e) associating the emergency incident with an identifier of the PSAP based on the temporary access token; f) receiving emergency data associated with the device identifier from one or more databases, the emergency data comprising a current location; and g) transmitting the emergency data to the computing device for display on the computing device through the GUI, the GUI comprising: i) an interactive map showing a geographic representation of a jurisdiction of the ESP and graphically depicting one or more incidents within the jurisdiction; and ii) a list of one or more incidents showing at least a subset of the emergency data that is associated with the one or more incidents.

In another aspect, disclosed herein is a system for delivering emergency data to a public safety answering point (PSAP), the system comprising: a) an emergency response application communicatively coupled to a network server and comprising a graphical user interface (GUI) accessible by a PSAP computing device through the computing network, wherein the emergency response application is configured to: i) receive emergency data regarding an emergency incident, the emergency data comprising a device identifier and a current location; and ii) an interactive map showing a geographic representation of a jurisdiction of the PSAP and graphically depicting one or more incidents within the jurisdiction, wherein the one or more incidents comprises the emergency incident; and iii) a list of one or more incidents showing at least a subset of the emergency data associated with the one or more incidents; and b) an emergency management system (EMS) communicatively coupled to the network server and configured to: i) gather emergency data associated with the device identifier from one or more third party databases, the emergency data comprising a current location; ii) retrieve a geofence associated with the PSAP using an identifier of the PSAP, wherein a geofence encloses a region within a jurisdiction of the PSAP; iii) determining if the current location is within the geofence associated with the PSAP; and iv) in response to determining that the current location is within the geofence associated with the PSAP, transmitting the emergency data to the computing device for display through the GUI.

In another aspect, disclosed herein is a system for delivering emergency data to a public safety answering point (PSAP), the system configured to: a) provide an emergency response comprising a graphical user interface (GUI) accessible by a computing device at a public safety answering point; b) receive login information for a member of the PSAP from the computing device; c) generate temporary access token authorizing the member of the PSAP to access emergency data, wherein the temporary access token is derived from credentials associated with the PSAP; d) access a data feed of the PSAP to identify an emergency incident and an associated device identifier; e) associate the emergency incident with an identifier of the PSAP based on the temporary access token; f) receive emergency data associated with the device identifier from one or more databases, the emergency data comprising a current location; and g) transmit the emergency data to the computing device for display on the computing device through the GUI, the GUI comprising: i) an interactive map showing a geographic representation of a jurisdiction of the PSAP and graphically depicting one or more incidents within the jurisdiction, wherein the one or more incidents comprises the emergency incident associated with the device identifier; and ii) a list of one or more incidents showing at least a subset of the emergency data associated with the one or more incidents.

In another aspect, disclosed herein is non-transitory computer readable storage media encoded with a computer program including instructions executable by at least one processor for: a) receiving available emergency data associated with a device identifier from one or more third party databases, the emergency data comprising a current location; b) retrieving a geofence associated with the PSAP using the identifier of the PSAP, wherein the geofence encloses a region within the jurisdiction of the PSAP; c) determining if the current location is within the geofence associated with the PSAP; d) in response to determining that the current location is within the geofence associated with the PSAP, transmitting the emergency data to a PSAP computing device; and e) providing an emergency response application comprising a graphical user interface (GUI) accessible by the computing device at the PSAP, the GUI comprising: i) an interactive map showing a geographic representation of a jurisdiction of the PSAP and graphically depicting one or more incidents within the jurisdiction, wherein the one or more incidents comprises the emergency incident associated with the device identifier; and ii) a list of one or more incidents showing at least a subset of the emergency data associated with the one or more incidents.

In another aspect, disclosed herein is a method for delivering emergency data to a public safety answering point by an emergency management system (EMS), the method comprising: a) receiving, by the EMS, an emergency alert comprising emergency data comprising a location generated by an electronic device and a device identifier associated with the electronic device; b) storing, by the EMS, the emergency data comprising the location generated by the electronic device on one or more databases; c) receiving, by the EMS, an emergency data request from a computing device at a public safety answering point (PSAP), wherein the emergency data request is generated at an emergency response application accessed at the computing device and comprises a device identifier associated with the electronic device; d) determining, by the EMS, a PSAP identifier associated with the emergency data request; e) retrieving, by the EMS, a geofence associated with the PSAP using the PSAP identifier, wherein the geofence encloses a region within the jurisdiction of the PSAP; f) determining, by the EMS, that the location is within the geofence associated with the PSAP; and g) in response to determining that the location is within the geofence associated with the PSAP, transmitting, by the EMS, the emergency data comprising the location to the computing device for display through a graphical user interface of the emergency response application. In some embodiments, the emergency data request further comprises a temporary access token and wherein the emergency data request is associated with the PSAP identifier using the temporary access token. In some embodiments, the location is a current location. In some embodiments, the emergency data associated with the device identifier comprises one or more historical locations of the electronic device. In some embodiments, further comprising: a) determining that the one or more historical locations are within the geofence associated with the PSAP; and b) in response to determining that the one or more historical locations are within the geofence associated with the PSAP, transmitting the one or more historical locations to the computing device for display within the graphical user interface. In some embodiments, determining if the location is within the geofence associated with the PSAP further comprises applying a buffer that expands one or more boundaries of the geofence when comparing the location to the geofence. In some embodiments, the geofence associated with the PSAP is submitted through the graphical user interface by an administration of the PSAP. In some embodiments, the geofence comprises a shapefile. In some embodiments, further comprising: a) receiving, through the emergency response application accessed at the computing device, login information for a member of the PSAP; b) generating a temporary access token authorizing the member of the PSAP to access emergency data from the emergency management system, wherein the emergency data request further comprises the temporary access token. In some embodiments, the temporary access token is derived from credentials associated with the PSAP. In some embodiments, further comprising: a) in response to receiving the login information from the member of the PSAP, checking an IP address of the computing device against a whitelist of IP addresses; b) in response to determining that the IP address of the computing device is not on the whitelist of IP addresses, denying the member of the PSAP access to the emergency response application. In some embodiments, further comprising: a) delivering an interactive call to a landline associated with the PSAP, wherein the interactive call audibly dictates an access code; b) receiving the access code from the member of the PSAP through the graphical user interface; and c) providing access to the emergency response application to the member of the PSAP. In some embodiments, further comprising: a) delivering an email to an administrator of the PSAP, wherein the email comprises a confirmation link; b) receiving selection of the confirmation link; and c) in response to receiving selection of the confirmation link, providing access to the emergency response application to the member of the PSAP. In some embodiments, the device identifier is a phone number or an email address. In some embodiments, the device identifier is manually submitted to the emergency response application through an entry field provided by the graphical user interface. In some embodiments, the device identifier is automatically submitted to the emergency response application by call-taking software installed on the computing device. In some embodiments, the emergency data request is an API GET request. In some embodiments, the emergency data further comprises at least one of caller information, sensor data, emergency contact information, emergency indication, or medical information.

In another aspect, disclosed herein is a method for delivering emergency data to a public safety answering point by an emergency management system (EMS), the method comprising: a) receiving, at the EMS, an emergency alert comprising emergency data comprising a location generated by an electronic device; b) receiving, at the EMS, an emergency data request from a computing device at a public safety answering point, wherein the emergency data request is generated at an emergency response application accessed at the computing device and comprises a device identifier associated with the electronic device; c) identifying, by the EMS, the emergency data comprising the location generated by the electronic device using the device identifier; and d) transmitting, by the EMS, the location to the computing device for display through a graphical user interface of the emergency response application.

In another aspect, disclosed herein is an emergency management system (EMS) configured for delivering emergency data to a public safety answering point, the EMS comprising at least one processor, a memory, a user interface, a display, and instructions executable by the at least one processor to create an application comprising: a) a module receiving an emergency alert comprising emergency data comprising a location generated by an electronic device and a device identifier associated with the electronic device; b) a module storing the emergency data comprising the location generated by the electronic device on one or more databases; c) a module receiving an emergency data request from a computing device at a public safety answering point (PSAP), wherein the emergency data request is generated at an emergency response application accessed at the computing device and comprises a device identifier associated with the electronic device; d) a module identifying the emergency data comprising the location generated by the electronic device using the device identifier; e) a module determining a PSAP identifier corresponding to the PSAP and associating the emergency data request with the PSAP identifier; f) a module retrieving a geofence associated with the PSAP using the PSAP identifier, wherein the geofence encloses a region within the jurisdiction of the PSAP; g) a module determining that the location is within the geofence associated with the PSAP; and h) a module, in response to determining that the location is within the geofence associated with the PSAP, transmitting the location to the computing device for display through a graphical user interface of the emergency response application. In some embodiments, the emergency data request further comprises a temporary access token and wherein the emergency data request is associated with the PSAP identifier using the temporary access token. In some embodiments, the location is a current location. In some embodiments, the emergency data associated with the device identifier comprises one or more historical locations of the electronic device. In some embodiments, the application further comprises: a) a module determining that the one or more historical locations are within the geofence associated with the PSAP; and b) a module, in response to determining that the one or more historical locations are within the geofence associated with the PSAP, transmitting the one or more historical locations to the computing device for display within the graphical user interface. In some embodiments, determining if the location is within the geofence associated with the PSAP further comprises applying a buffer that expands one or more boundaries of the geofence when comparing the location to the geofence. In some embodiments, the geofence associated with the PSAP is submitted through the graphical user interface by an administration of the PSAP. In some embodiments, the geofence comprises a shapefile. In some embodiments, further comprises: a) a module receiving, through the emergency response application accessed at the computing device, login information for a member of the PSAP; b) a module generating a temporary access token authorizing the member of the PSAP to access emergency data from the emergency management system, wherein the emergency data request further comprises the temporary access token. In some embodiments, the temporary access token is derived from credentials associated with the PSAP. In some embodiments, the application further comprises: a) a module in response to receiving the login information from the member of the PSAP, checking an IP address of the computing device against a whitelist of IP addresses; b) a module, in response to determining that the IP address of the computing device is not on the whitelist of IP addresses, denying the member of the PSAP access to the emergency response application. In some embodiments, the application further comprises: a) a module delivering an interactive call to a landline associated with the PSAP, wherein the interactive call audibly dictates an access code; b) a module receiving the access code from the member of the PSAP through the graphical user interface; and c) a module providing access to the emergency response application to the member of the PSAP. In some embodiments, the application further comprises: a) a module delivering an email to an administrator of the PSAP, wherein the email comprises a confirmation link; b) a module receiving selection of the confirmation link; and c) a module, in response to receiving selection of the confirmation link, providing access to the emergency response application to the member of the PSAP. In some embodiments, the device identifier is a phone number or an email address. In some embodiments, the device identifier is manually submitted to the emergency response application through an entry field provided by the graphical user interface. In some embodiments, the device identifier is automatically submitted to the emergency response application by call-taking software installed on the computing device. In some embodiments, the emergency data request is an API GET request. In some embodiments, the emergency data further comprises at least one of caller information, sensor data, emergency contact information, emergency indication, or medical information.

In another aspect, disclosed herein is a method for delivering emergency data to an emergency service provider (ESP), the method comprising: a) providing an emergency response application comprising a graphical user interface (GUI) accessible by the computing device at an ESP, the GUI comprising two sections: i) a first section comprising a list of one or more incidents; and ii) a second section comprising an interactive map; b) receiving a first emergency alert associated with a first device identifier, the emergency alert comprising emergency data comprising a first location; c) retrieving a plurality of geofences associated with a plurality of ESPs, wherein the plurality of geofences includes a geofence associated with the ESP; d)

determining that the first location is within the geofence associated with the ESP; e) in response to determining that the first location is within the geofence associated with the ESP: i) transmitting the emergency data to the computing device; ii) displaying a first incident associated with the first device identifier for the first emergency alert associated with the first device identifier within the list of incidents; and iii) displaying the first location within the interactive map as a first incident location associated with the first device identifier. In some embodiments, the ESP is a public safety answering point (PSAP) and the geofence is an authoritative jurisdiction of the PSAP. In some embodiments, the list of incidents comprises a list of emergency calls located within the geofence associated with the ESP. In some embodiments, further comprising: a) gathering additional emergency data associated with the first device identifier; b) receiving selection of the first incident associated with the device identifier within the list of emergency alerts; and c) in response to receiving selection of the first incident associated with the first device identifier, displaying the additional data within the GUI. In some embodiments, further comprising: a) gathering additional emergency data associated with the first device identifier; b) receiving selection of the first incident location associated with the first device identifier within the interactive map; and c) in response to receiving selection of the first incident location associated with the first device identifier, displaying the additional emergency data within the GUI. In some embodiments, the additional emergency data comprises at least one of caller information, sensor data, emergency contact information, emergency indication, and medical information. In some embodiments, selection of the first incident location associated with the first device identifier comprises clicking on or hovering over the first incident location. In some embodiments, further comprising: a) receiving a second emergency alert associated with a second device identifier, the second emergency alert comprising a second location; b) determining if the second location is within the geofence associated with the ESP; and c) in response to determining that the second location is within the geofence associated with the ESP: i) displaying a second incident associated with the second device identifier for the second emergency alert within the list of incidents simultaneously with the first incident associated with the first device identifier; and ii) displaying the second location as a second incident location associated with the second device identifier within the interactive map simultaneously with the first incident location associated with the first device identifier. In some embodiments, further comprising: a) receiving credentials associated with an account of an ESP personnel through the emergency response application at the computing device; b) identifying an ESP ID associated with the account of the ESP personnel; and c) determining that the geofence associated with the ESP is associated with the ESP ID. In some embodiments, the list of incidents comprises a plurality of incidents associated with a plurality of emergency alerts and wherein the list of incidents is ordered chronologically by the time the emergency alerts were received. In some embodiments, the first device identifier is one of a phone number, an email address, or an IP address. In some embodiments, further comprising: a) receiving a second emergency alert associated with a second device identifier, the second emergency alert comprising a second location; b) determining that the second location is within a threshold proximity of the first location; and c) consolidating the second emergency alert with the first emergency alert within the first incident, wherein the first incident is then associated with both the first device identifier and the second device identifier. In some embodiments, further comprising: a) receiving an updated location associated with the first device identifier; and b) moving the first incident location within the interactive map to the updated location associated with the first device identifier. In some embodiments, the geofence associated with the ESP is submitted through the emergency response application by a member of the ESP. In some embodiments, the geofence associated with the ESP comprises a GIS file. In some embodiments, the geofence associated with the ESP comprises a GeoJSON, a KML, or a shapefile. In some embodiments, the GUI comprises a third section comprising one data overlay displaying at least a subset of the emergency data associated with the first incident. In some embodiments, further comprising displaying one or more assets proximal to the first incident location, wherein assets comprise medical, fire, police, safety assets. 218 In some embodiments, further comprising displaying one or more data layers on the interactive map comprising one or more of weather, traffic and safety hazards. In some embodiments, further comprising receiving a geospatial query and displaying one or more assets on the interactive map. In some embodiments, the ESP is associated with the log in credentials of one or more ESP users through an ESP account. In some embodiments, the one or more ESP users are subscribed to the ESP account, wherein the emergency data within the geofence of the ESP is automatically pushed to the one or more ESP users. In some embodiments, the emergency data is transmitted to the ESP via a two-way websocket connection. In some embodiments, one or more ESP users sends messages via the two-way websocket connection.

In another aspect, disclosed herein is an emergency response system configured for delivering emergency data to an emergency service provider (ESP), the emergency response system comprising at least one processor, a memory, a user interface, a display, and instructions executable by the at least one processor to create an application for sending an emergency alert comprising: a) a module providing an emergency response application comprising a graphical user interface (GUI) accessible by the computing device at an ESP, the GUI comprising two sections: i) a first section comprising a list of one or more incidents; and ii) a second section comprising an interactive map; b) a module receiving a first emergency alert associated with a first device identifier, the emergency alert comprising emergency data comprising a first location; c) a module retrieving a plurality of geofences associated with a plurality of ESPs, wherein the plurality of geofences includes a geofence associated with the ESP; d) a module determining that the first location is within the geofence associated with the ESP; e) a module in response to determining that the first location is within the geofence associated with the ESP: i) transmitting the emergency data to the computing device; ii) displaying a first incident associated with the first device identifier for the first emergency alert associated with the first device identifier within the list of incidents; and iii) displaying the first location within the interactive map as a first incident location associated with the first device identifier. In some embodiments, the ESP is a public safety answering point (PSAP) and the geofence is an authoritative jurisdiction of the PSAP. In some embodiments, the list of incidents comprises a list of emergency calls located within the geofence associated with the ESP. In some embodiments, the application further comprises: a) a module gathering additional emergency data associated with the first device identifier; b) a module receiving selection of the first incident associated with the device identifier within the list of emergency alerts; and c) a module, in response to receiving selection of the first incident associated with the first device identifier, displaying the additional data within the GUI. In some embodiments, the application further comprises: a) a module gathering additional emergency data associated with the first device identifier; b) a module receiving selection of the first incident location associated with the first device identifier within the interactive map; and c) a module, in response to receiving selection of the first incident location associated with the first device identifier, displaying the additional emergency data within the GUI. In some embodiments, the additional emergency data comprises at least one of caller information, sensor data, emergency contact information, emergency indication, and medical information. In some embodiments, selection of the first incident location associated with the first device identifier comprises clicking on or hovering over the first incident location. In some embodiments, the application further comprises: a) a module receiving a second emergency alert associated with a second device identifier, the second emergency alert comprising a second location; b) a module determining if the second location is within the geofence associated with the ESP; and c) a module, in response to determining that the second location is within the geofence associated with the ESP: i) displaying a second incident associated with the second device identifier for the second emergency alert within the list of incidents simultaneously with the first incident associated with the first device identifier; and ii) displaying the second location as a second incident location associated with the second device identifier within the interactive map simultaneously with the first incident location associated with the first device identifier. In some embodiments, n the application further comprises: a) a module receiving credentials associated with an account of an ESP personnel through the emergency response application at the computing device; b) a module identifying an ESP ID associated with the account of the ESP personnel; and c) a module determining that the geofence associated with the ESP is associated with the ESP ID. In some embodiments, the list of incidents comprises a plurality of incidents associated with a plurality of emergency alerts and wherein the list of incidents is ordered chronologically by the time the emergency alerts were received. In some embodiments, the first device identifier is one of a phone number, an email address, or an IP address. In some embodiments, the application further comprises: a) a module receiving a second emergency alert associated with a second device identifier, the second emergency alert comprising a second location; b) a module determining that the second location is within a threshold proximity of the first location; and c) a module consolidating the second emergency alert with the first emergency alert within the first incident, wherein the first incident is then associated with both the first device identifier and the second device identifier. In some embodiments, the application further comprises: a) a module receiving an updated location associated with the first device identifier; and b) a module moving the first incident location within the interactive map to the updated location associated with the first device identifier. In some embodiments, the geofence associated with the ESP is submitted through the emergency response application by a member of the ESP. In some embodiments, the geofence associated with the ESP comprises a GIS file. In some embodiments, the geofence associated with the ESP comprises a GeoJSON, a KML, or a shapefile. In some embodiments, the GUI comprises a third section comprising one data overlay displaying at least a subset of the emergency data associated with the first incident. In some embodiments, further comprising a module displaying one or more assets proximal to the first incident location, wherein assets comprise medical, fire, police, safety assets. In some embodiments, further comprising a module displaying one or more data layers on the interactive map comprising one or more of weather, traffic and safety hazards. In some embodiments, further comprising a module receiving a geospatial query and displaying one or more assets on the interactive map. In some embodiments, the ESP is associated with the log in credentials of one or more ESP users through an ESP account. In some embodiments, the one or more ESP users are subscribed to the ESP account, wherein the emergency data within the geofence of the ESP is automatically pushed to the one or more ESP users. 246 In some embodiments, the emergency data is transmitted to the ESP via a two-way websocket connection. In some embodiments, one or more ESP users sends messages via the two-way websocket connection.

In another aspect, disclosed herein is a method for delivering emergency data to an emergency service provider (ESP), the method comprising: a) providing an emergency response application comprising a graphical user interface (GUI) accessible by the computing device at an ESP, the GUI comprising an interactive map; b) receiving credentials associated with an account of an ESP personnel through the emergency response application at the computing device; c) identifying an ESP ID associated with the account of the ESP personnel; d) determining that the geofence associated with the ESP is associated with the ESP ID; e) receiving a first emergency alert associated with a first device identifier, the emergency alert comprising emergency data comprising a first location; f) retrieving a plurality of geofences associated with a plurality of ESPs, wherein the plurality of geofences includes a geofence associated with the ESP; g) determining that the first location is within the geofence associated with the ESP; and h) in response to determining that the first location is within the geofence associated with the ESP displaying the first location within the interactive map as a first incident location associated with the first device identifier.

In another aspect, disclosed herein is an emergency response system comprising at least one processor, a memory, a user interface, a display, and instructions executable by the at least one processor to create an application for delivering emergency data to an emergency service provider (ESP), the application comprising: a) a module providing an emergency response application comprising a graphical user interface (GUI) accessible by the computing device at an ESP, the GUI comprising an interactive map; b) a module receiving credentials associated with an account of an ESP personnel through the emergency response application at the computing device; c) a module identifying an ESP ID associated with the account of the ESP personnel; d) a module determining that the geofence associated with the ESP is associated with the ESP ID; e) a module receiving a first emergency alert associated with a first device identifier, the emergency alert comprising emergency data comprising a first location; f) a module retrieving a plurality of geofences associated with a plurality of ESPs, wherein the plurality of geofences includes a geofence associated with the ESP; g) a module determining that the first location is within the geofence associated with the ESP; and h) in response to determining that the first location is within the geofence associated with the ESP displaying the first location within the interactive map as a first incident location associated with the first device identifier.

In another aspect, disclosed herein is a system comprising: a) an emergency management system (EMS) configured for delivering emergency data to a public safety answering point, the EMS comprising at least one processor, a memory, and instructions executable by the at least one processor to create an application configured to: i) receive a first emergency alert comprising emergency data comprising a first location generated by an electronic device and a first device identifier associated with the electronic device; ii) store the emergency data comprising the first location generated by the electronic device on one or more databases; iii) receive an emergency data request from an emergency response system at an emergency service provider (ESP), wherein the emergency data request comprises a first device identifier associated with the electronic device; iv) identify the emergency data stored on the one or more databases using the first device identifier; v) retrieve a geofence associated with the ESP, wherein the geofence encloses a region within the jurisdiction of the ESP; vi) determine that the first location is within the geofence associated with the ESP; and vii) in response to determining that the first location is within the geofence associated with the ESP, transmit the location to the emergency response system for display; and b) an emergency response system comprising at least one processor, a memory, a user interface, a display, and instructions executable by the at least one processor to create an application configured to: i) provide an emergency response application comprising a graphical user interface (GUI) at an ESP providing a list of one or more incidents and an interactive map; and ii) displaying the first location within the interactive map as an incident location associated with the first device identifier. In some embodiments, the ESP is a public safety answering point (PSAP) and the geofence is an authoritative jurisdiction of the PSAP. In some embodiments, the list of one or more incidents comprises a list of emergency calls located within the geofence associated with the ESP. In some embodiments, the emergency response system is further configured to: a) gather additional emergency data associated with the first device identifier; b) receive selection of an incident associated with the first device identifier within the list of one or more incidents; and c) in response to receiving selection of the incident associated with the first device identifier, displaying the additional emergency data within the GUI. In some embodiments, the emergency response system is further configured to: a) gather additional emergency data associated with the first device identifier; b) receive selection of the incident location associated with the device identifier within the interactive map; and c) in response to receiving selection of the incident location associated with the device identifier, display the additional emergency data within the GUI. In some embodiments, the additional emergency data comprises at least one of caller information, sensor data, emergency contact information, emergency indication, and medical information. In some embodiments, selection of the incident location associated with the device identifier comprises clicking on or hovering over the first incident location. In some embodiments, the emergency response system is further configured to: a) receive credentials associated with an account of an ESP personnel; b) identify an ESP ID associated with the account of the ESP personnel; and c) determine that the geofence associated with the ESP is associated with the ESP ID. In some embodiments, the list of one or more incidents comprises a plurality of incidents associated with a plurality of emergency alerts and wherein the list of incidents is ordered chronologically by the time the emergency alerts were received. In some embodiments, the first device identifier is one of a phone number, an email address, or an IP address. In some embodiments, the application is further configured to: a) receive a second emergency alert associated with a second device identifier, the second emergency alert comprising a second location; b) determine that the second location is within a threshold proximity of the first location; and c) consolidate the second emergency alert with the first emergency alert within the first incident, wherein the first incident is then associated with both the first device identifier and the second device identifier. In some embodiments, the application is further configured to: a) receive an updated location associated with the first device identifier; and b) move the first incident location within the interactive map to the updated location associated with the first device identifier. In some embodiments, the geofence associated with the ESP is submitted through the emergency response system by a member of the ESP. In some embodiments, the geofence associated with the ESP comprises a GIS file. In some embodiments, the geofence associated with the ESP comprises a GeoJSON, a KML, or a shapefile. In some embodiments, the GUI comprises a data overlay displaying at least a subset of the emergency data associated with the first incident. In some embodiments, the emergency response system is further configured to display one or more assets proximal to the first incident location, wherein assets comprise medical, fire, police, safety assets. In some embodiments, the emergency response system is further configured display one or more data layers on the interactive map comprising one or more of weather, traffic and safety hazards. In some embodiments, the ESP is associated with the log in credentials of one or more ESP users through an ESP account. In some embodiments, the one or more ESP users are subscribed to the ESP account, wherein the emergency data within the geofence of the ESP is automatically pushed to the one or more ESP users.

In another aspect, disclosed herein is an emergency management system (EMS) configured for delivering emergency data to an emergency service provider (ESP), the EMS comprising at least one processor, a memory, and instructions executable by the at least one processor to create an application configured to: a) receive a first emergency alert comprising emergency data comprising a first location generated by an electronic device and a first device identifier associated with the electronic device; b) store the emergency data comprising the first location generated by the electronic device on one or more databases; c) receive an emergency data request from an emergency response system at the ESP, wherein the emergency data request comprises a first device identifier associated with the electronic device; d) identify the emergency data stored on the one or more databases using the first device identifier; e) retrieve a geofence associated with the ESP, wherein the geofence encloses a region within the jurisdiction of the ESP; f) determine that the first location is within the geofence associated with the ESP; and g) in response to determining that the first location is within the geofence associated with the ESP, transmit the location to the emergency response system for display through a graphical user interface (GUI) at the ESP, wherein said GUI provides a list of one or more incidents and an interactive map and displays the first location within the interactive map as an incident location associated with the first device identifier.

In another aspect, disclosed herein is a method of delivering emergency data to an emergency service provider (ESP), comprising: a) receiving a first emergency alert comprising emergency data comprising a first location generated by an electronic device and a first device identifier associated with the electronic device; b) storing the emergency data comprising the first location generated by the electronic device on one or more databases; c) receiving an emergency data request from an emergency response system at the ESP, wherein the emergency data request comprises a first device identifier associated with the electronic device; d) identifying the emergency data stored on the one or more databases using the first device identifier; e) retrieving a geofence associated with the ESP, wherein the geofence encloses a region within the jurisdiction of the ESP; f) determining that the first location is within the geofence associated with the ESP; and g) in response to determining that the first location is within the geofence associated with the ESP, transmitting the location to the emergency response system for display through a graphical user interface (GUI) at the ESP, wherein said GUI: i) provides a list of one or more incidents and an interactive map; and ii) displays the first location within the interactive map as an incident location associated with the first device identifier.

In another aspect, disclosed herein is a system comprising: a) an emergency management system (EMS) configured for delivering emergency data to a public safety answering point, the EMS comprising at least one processor, a memory, and instructions executable by the at least one processor to create an application configured to: i) receive a first emergency alert comprising emergency data comprising a first location generated by an electronic device and a first device identifier associated with the electronic device; ii) store the emergency data comprising the first location generated by the electronic device on one or more databases; iii) retrieve one or more geofences associated with one or more emergency service providers (ESPs); iv) associate the first emergency alert with a first ESP of the one or more ESPs, wherein the first ESP is associated with a geofence that encloses a region comprising the first location; v) in response to determining that the first location is within the geofence associated with the first ESP, transmit the emergency data to an emergency response system associated with the first ESP for display; and b) an emergency response system comprising at least one processor, a memory, a user interface, a display, and instructions executable by the at least one processor to create an application configured to: i) provide an emergency response application comprising a graphical user interface (GUI) at an ESP providing a list of one or more incidents and an interactive map; and ii) displaying the first location within the interactive map as an incident location associated with the first device identifier. In some embodiments, the step of determining that the first emergency alert falls within the geofence associated with a first ESP comprises receiving a data request from an ESP user wherein the ESP user is associated with the first ESP and retrieving the geofence associated with the first ESP. In some embodiments, the ESP is associated with the log in credentials of one or more ESP users through an ESP account, wherein the emergency data within the geofence of the ESP is automatically pushed to the one or more ESP users. In some embodiments, the first ESP is a public safety answering point (PSAP) and the geofence is an authoritative jurisdiction of the PSAP. In some embodiments, the list of one or more incidents comprises a list of emergency calls located within the geofence associated with the first ESP. In some embodiments, the emergency response system is further configured to: a) gather additional emergency data associated with the first device identifier; b) receive selection of the incident location associated with the device identifier within the interactive map; and c) in response to receiving selection of the incident location associated with the device identifier, display a subset of the additional emergency data in an additional data overlay within the GUI. In some embodiments, the additional emergency data comprises at least one of caller information, sensor data, emergency contact information, emergency indication, and medical information. In some embodiments, the emergency response system is further configured to: a) receive credentials associated with an account of an ESP personnel; b) identify an ESP ID associated with the account of the ESP personnel; and c) determine that the geofence associated with the ESP is associated with the ESP ID. In some embodiments, the list of one or more incidents comprises a plurality of incidents associated with a plurality of emergency alerts and wherein the list of incidents is ordered chronologically by the time the emergency alerts were received. In some embodiments, the first device identifier is one of a phone number, an email address, or an IP address. In some embodiments, the EMS application is further configured to: a) receive a second emergency alert associated with a second device identifier, the second emergency alert comprising a second location; b) determine that the second location is within a threshold proximity of the first location; and c) consolidate the second emergency alert with the first emergency alert within the first incident, wherein the first incident is then associated with both the first device identifier and the second device identifier. In some embodiments, the EMS application is further configured to: a) receive an updated location associated with the first device identifier; and b) move the first incident location within the interactive map to the updated location associated with the first device identifier. In some embodiments, the geofence associated with the first ESP is submitted through the emergency response system by a member of the first ESP. In some embodiments, the GUI comprises a data overlay displaying at least a subset of the emergency data associated with the first incident. In some embodiments, the emergency response system is further configured to display one or more assets proximal to the first incident location, wherein assets comprise medical, fire, police, safety assets. In some embodiments, the emergency response system is further configured display one or more data layers on the interactive map comprising one or more of weather, traffic and safety hazards. In some embodiments, the first ESP is associated with the log in credentials of one or more ESP users through an ESP account. In some embodiments, the one or more ESP users are subscribed to the ESP account, wherein the emergency data within the geofence of the ESP is automatically pushed to the one or more ESP users.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 7 depicts a process of provisioning and indexing of geofences;

FIG. 15 the emergency response application displays emergency data returned from the clearinghouse within discrete categories of emergency data categories;

DETAILED DESCRIPTION OF THE INVENTION

Figure 1A:
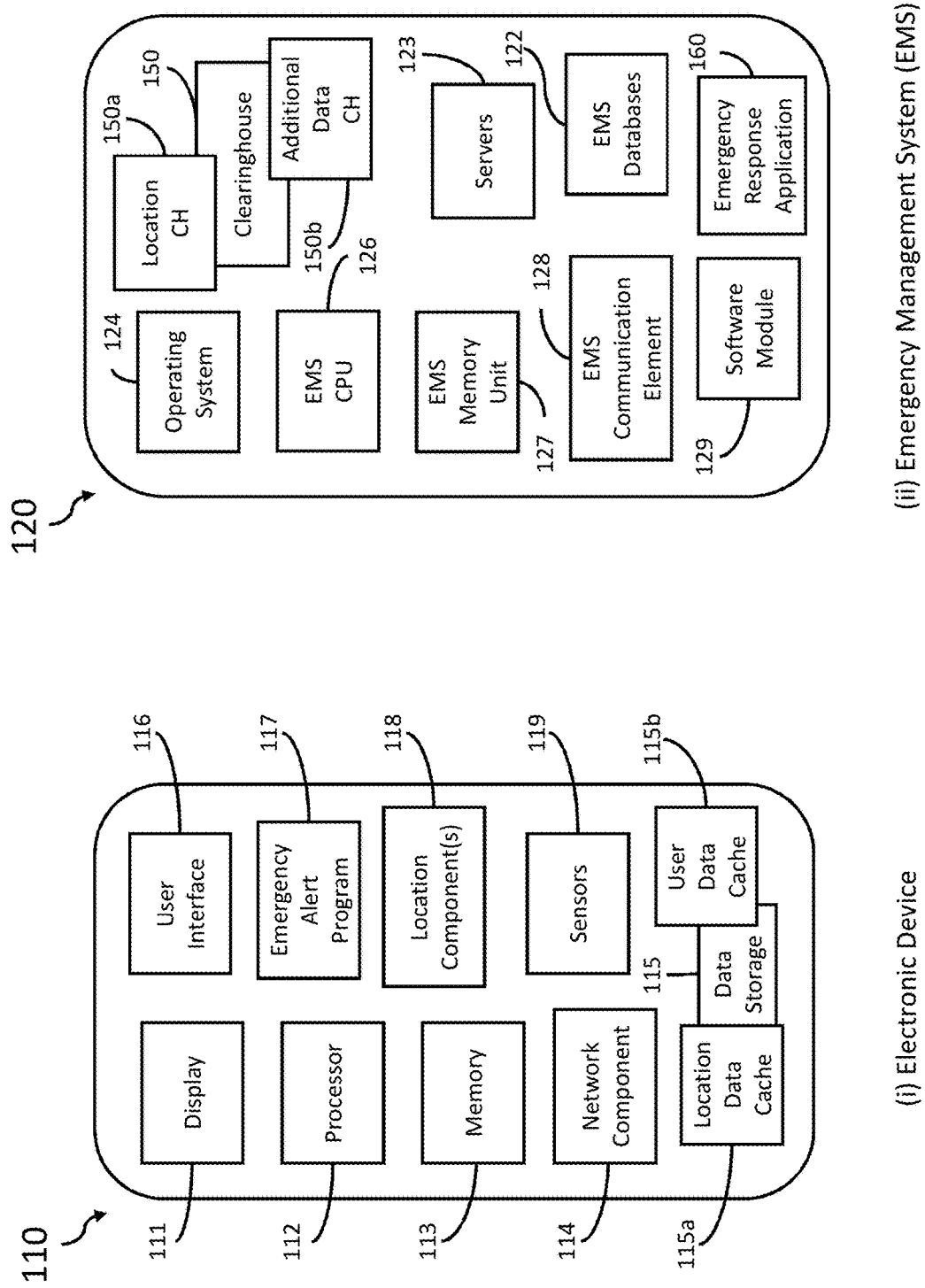
FIG. 1A depicts diagrams of an electronic device and an emergency management system (EMS)

Electronic Device, Emergency Management System, and Public Safety Answering Point In certain embodiments, disclosed herein are devices, systems, and methods for managing emergency data for emergency response. FIG. 1A depicts diagrams of (i) an electronic device 110 and (ii) an emergency management system (EMS) 120. In some embodiments, the electronic device 110 is a digital processing device such as a communication device (e.g., mobile or cellular phone, computer, laptop, etc.). In some embodiments, the electronic device is a wearable device (e.g., a smartwatch). In some embodiments, the electronic device is an Internet of Things (IoT) device, such as a home assistant (e.g., an Amazon Echo) or a connected smoke detector (e.g., a Nest Protect smoke and carbon monoxide alarm). In some embodiments, the electronic device is a walkie-talkie or two-way radio.

In some embodiments, the electronic device 110 includes a display 111, a processor 112, a memory 113 (e.g., an EPROM memory, a RAM, or a solid-state memory), and several optional components such as one or more network component(s) 114 (e.g., an antenna and associated components, Wi-Fi adapters, Bluetooth adapters, etc.), a data storage 115, a user interface 116, a computer program 117, one or more location components 118, and one or more sensors 119. In some embodiments, the processor 112 is implemented as one or more microprocessors, microcomputers, microcontrollers, digital signal processors, central processing units, state machines, logic circuitries, and/or devices that manipulate signals based on operational instructions. Among other capabilities, the processor 112 is configured to fetch and execute computer-readable instructions stored in the memory 113.

In some embodiments, the display 111 is part of the user interface 116 (e.g., a touchscreen is both a display and a user interface in that it provides an interface to receive user input or user interactions). In some embodiments, the user interface 116 includes physical buttons such as an on/off button or volume buttons. In some embodiments, the display 111 and/or the user interface 116 comprises a touchscreen (e.g., a capacitive touchscreen), which is capable of displaying information and receiving user input. In some embodiments, the user interface 116 does not include a touchscreen, but comprises one or more physical buttons and/or a microphone. In some embodiments, the display 111 does not include a touchscreen, but comprises one or more lights, indicators, and/or lighted buttons.

In some embodiments, the electronic device 110 includes various accessories that allow for additional functionality. In some embodiments, these accessories (not shown) include one or more of the following: a microphone, a camera, speaker, a fingerprint scanner/reader, health or environmental sensors, a USB or micro-USB port, a headphone jack, a card reader, a SIM card slot, or any combination thereof. In some embodiments, the one or more sensors include, but are not limited to: a gyroscope, an accelerometer, a thermometer, a heart rate sensor, a barometer, or a hematology analyzer. In some embodiments, the data storage 115 includes a location data cache 115a and a user data cache 115b. In some embodiments, the location data cache 115a is configured to store locations generated by the one or more location components 118.

In some embodiments, the computer program 117 is an emergency response application or emergency response mobile application. In some embodiments, the computer program 117 is configured to record user data, such as a name, address, or medical data of a user associated with the electronic device 110. In some embodiments, the computer program 117 is an emergency alert program configured to detect an emergency from the electronic device 110 (e.g., when a user 100 (not shown) uses the electronic device 110 to make an emergency call).

It is contemplated that the electronic device may be a triggering device where the emergency alert is triggered by a user input or sensor readings. In some embodiments, the user 100 initiates the emergency alert by interacting with the user interface 116. In some embodiments, the emergency is detected by one or more sensors (built in or peripheral to the device 110). In some embodiments, in response to detecting an emergency request for assistance (e.g., a native dial 9-1-1 call) generated or sent by the electronic device 110, the computer program is configured to deliver an emergency notification to the EMS 120.

In some embodiments, the emergency notification is an HTTP post or another type of Internet-based message containing information regarding the emergency request. In some embodiments, the emergency notification is an SMS message (data or text), a multimedia message, etc. In some embodiments, the emergency notification includes a location (e.g., a device-based hybrid location) generated by or for the electronic device 110, which may be current or historical location. In some embodiments, in response to detecting an emergency request generated or sent by the electronic device 110, the computer program is configured to deliver user data to the emergency management system (EMS) 120. In some embodiments, the current location is not more than 30 minutes, 1 hour, 2 hours or 24 hours old.

In some embodiments, as depicted in FIG. 1A, the emergency management system (EMS) 120 includes an EMS operating system 124, an EMS CPU 126, an EMS memory unit 127, an EMS communication element 128, and one or more software modules 129. In some embodiments, the EMS CPU 126 is implemented as one or more microprocessors, microcomputers, microcontrollers, digital signal processors, central processing units, state machines, logic circuitries, and/or devices that manipulate signals based on operational instructions. Among other capabilities, the EMS CPU 126 is configured to fetch and execute computer-readable instructions stored in the EMS memory unit 127. The EMS memory unit 127 optionally includes any computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes. The EMS memory unit 127 optionally includes modules, routines, programs, objects, components, data structures, etc., which perform particular tasks or implement particular abstract data types.

In some embodiments, the EMS 120 includes one or more EMS databases 122, one or more servers 123, and a clearinghouse 150. In some embodiments, the clearinghouse 150, as described in further detail below, is an input/output (I/O) interface configured to manage communications and data transfers to and from the EMS 120 and external systems and devices. In some embodiments, the clearinghouse 150 includes a variety of software and hardware interfaces, for example, a web interface, a graphical user interface (GUI), and the like. The clearinghouse 150 optionally enables the EMS 120 to communicate with other computing devices, such as web servers and external data servers (not shown). In some embodiments, the clearinghouse 150 facilitates multiple communications within a wide variety of networks and protocol types, including wired networks, for example, LAN, cable, etc., and wireless networks, such as WLAN, cellular, or satellite. In some embodiments, the clearinghouse 150 includes one or more ports for connecting a number of devices to one another or to another server. In some embodiments, the clearinghouse 150 includes one or more sub-clearinghouses, such as location clearinghouse 150*a* and additional data clearinghouse 150*b*, configured to manage the transfer of locations and additional data, respectively.

Figure 1B:
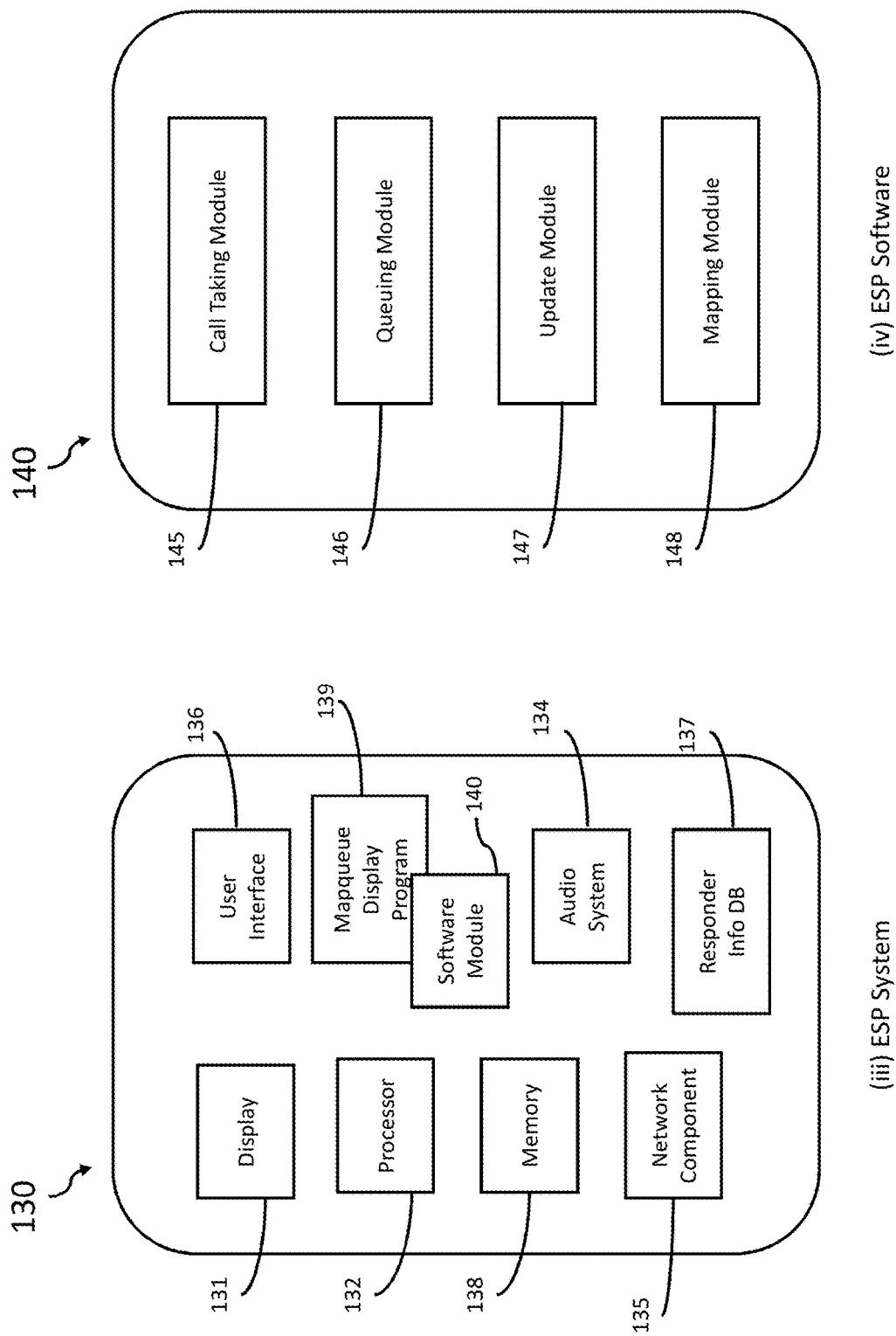
FIG. 1B depicts diagrams of an emergency service provider (ESP) system and ESP software.

In some embodiments, as depicted in FIG. 1B, an ESP system 130 includes one or more of a display 131 (e.g., a primary screen and supplemental screens), a user interface 136, at least one central processing unit or processor 132, a network component 135, an audio system 134 (e.g., microphone, speaker and/or a call-taking headset), and a computer program such as a ESP application or ESP program 139. In some embodiments, the ESP application or program 139 (e.g., a MapQueue application) comprises one or more software modules 140. In some embodiments, the ESP system 130 comprises a database of emergency responders (not shown), such as medical assets, police assets, fire response assets, rescue assets, safety assets, etc.

It is contemplated that responder devices may include a version of MapQueue application for displaying an interactive map of incidents. In some embodiments, responder devices are designed to display incidents within authoritative, administrative or assigned jurisdiction of the specific responder. The credentials of the responders may be matched to one or more geofence and incidents with current location within the geofences are displayed.

In some embodiments, responder devices display incidents based on a proximity radius on the interactive map. For example, a proximity radius may be within 10 meters to 5 kms, between 50 meters to 1000 meters, preferably 500 meters. As the responder moves towards an area, new incidents within the proximity radius may be "unlocked" and viewed.

In some embodiments, as depicted in FIG. 1B, the ESP application or program 139 installed on a ESP system 130 comprising a software module 140 is a call taking module 145 (for receiving and disconnecting with callers), a queuing module 146 (for queuing emergency alerts in the jurisdiction), an update module 147 (once subscribed, the ESP may get updated emergency data such as location), a mapping module 148 (for displaying an interactive map) or a combination thereof. In some embodiments, the ESP application 139 displays the information on a map (e.g., on the display 131). In some embodiments, the mapping module 148 is configured to provide feedback from the ESP 130 to the EMS, as described below. It is contemplated that responder devices have optionally installed a responder device program (not shown) similar to the mapping module 148. In some embodiments, the responder device program displays the emergency location (e.g., current location) on a map.

Emergency Clearinghouse

In some embodiments, as described above, the emergency management system (EMS) 120 includes a clearinghouse 150 (also referred to as an "Emergency Clearinghouse") for storing and retrieving emergency data. In some embodiments, the clearinghouse 150 includes a location clearinghouse 150A and an additional data clearinghouse 150B. In some embodiments, the location clearinghouse 150A includes a location ingestion module and a location retrieval module, as described below with respect to FIG. 2. In some embodiments, the additional data clearinghouse 150B includes an additional data ingestion module and an additional data retrieval module, as described below with respect to FIG. 2. In other embodiments, additional data and location data (hereinafter "emergency data") are stored in one or more databases in a distributed manner. In some embodiments, the emergency data is stored in an external or third-party server that is accessible to the EMS 120. The clearinghouse 150 optionally functions as an interface that receives and stores emergency data from electronic or communication devices that are then retrieved, transmitted, and/or distributed to recipients (e.g., emergency personnel) before, during, or after emergencies. As described above, the clearinghouse optionally receives emergency data from electronic or communication devices such as mobile phones, wearable devices, laptop or desktop computers, personal assistants, intelligent vehicle systems, home security systems, IoT devices, camera feeds, and other sources. As described above and below, emergency data optionally includes locations or additional data such as medical history, personal information, or contact information. In some embodiments, during an emergency, the clearinghouse 150 detects the emergency and/or otherwise identifies the need to provide emergency data pertaining to the emergency. The clearinghouse 150 then identifies any emergency data pertaining to the emergency stored within the clearinghouse 150 and transmits the pertinent emergency data to the requesting ESP. Accordingly, in some embodiments, the clearinghouse 150 acts as a data pipeline that automatically pushes emergency data to the ESP that would otherwise be without access to emergency data that is critical to most effectively and efficiently responding to an emergency. Accordingly, location data stored within the clearinghouse 150 allows emergency responders to arrive at the scene of an emergency faster, and additional data stored within the clearinghouse 150 allows emergency responders to be better prepared for the emergencies they face.

For example, in one embodiment, an emergency alert is triggered by an electronic device 110 (e.g., by pressing a soft button, a physical button, voice command, or gesture) or autonomously based on sensor data (e.g., smoke alarms). In this example, the user then confirms the emergency and/or provides authorization for sending the emergency alert. Emergency data, such as an enhanced location and additional data regarding the user (e.g., the user's medical history) is delivered by the electronic device 110 to the EMS 120 and stored in the clearinghouse 150 (e.g., in the location clearinghouse 150A and the additional data clearinghouse 150B'). In some embodiments, the EMS 120 or clearinghouse 150 formats the emergency data into a format that is compatible with industry standards for storing and sharing emergency data. For example, the emergency data is formatted to be compatible with National Emergency Number Association (NENA) standards. In some embodiments, the clearinghouse 150 transmits the emergency data to a receiving party in response to receiving a query from the receiving party, as described below. In some embodiments, the clearinghouse 150 automatically pushes the emergency data to a receiving party such as the PSAP. For example, in some embodiments, the emergency management system automatically pushes the emergency data to a receiving party using a subscription system, as described below.

In some embodiments, as mentioned above, a requesting party (such as a PSAP responding to an emergency alert) queries the clearinghouse 150 with an emergency data request (such as a HTTP GET request). In some embodiments, the emergency data request is in the form of the Location Information Server (LIS) protocol. In response to the emergency data request, the EMS 120 or clearinghouse 150 sends an appropriate response including relevant emergency data to the requesting party via an encrypted pathway. In some embodiments, the emergency data request is in the form of HTTP-Enabled Location Delivery (HELD) and the response from the EMS 120 or clearinghouse 150 is in the form of Presence Information Data Format Location Object (PIDF-LO). In some embodiments, the emergency data request includes an authorization code (also referred to as an "authorization token" or "temporary access token") in the body, header, or metadata of the request, and the EMS 120 checks that the authorization code is active before providing a response to the requesting party. In some embodiments, authorization is provided in the "Authorization" header of the emergency data request using HTTP Basic Authentication. For example, in some embodiments, authorization is base64-encoded user name and password for an account associated with the requesting party. In some embodiments, emergency data requests are sent over public networks using API access keys or credentials. In some embodiments, Transport Layer Security (TLS) is used in the requests and responses from the EMS 120 for encryption security. In some embodiments, the call taking module 145 includes a call-handling application, which is provided by a third-party vendor. In some embodiments, an ESP personnel interacts with the call-handling application to send an emergency data request to the EMS 120. In some embodiments, the response from the EMS 120 is displayed at the ESP display 131.

In some embodiments, as described above, emergency data includes locations and additional data. In some embodiments, emergency data includes one or more emergency data categories (also referred to as "data categories"). In some embodiments, the emergency data categories include: service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments. In some embodiments, emergency data categories are tagged with tags for specific types of data such as "demographics" or "medical data." For example, in some embodiments, gender, height, weight, ethnicity, profile picture (image-url) are tagged as demographic data. In some embodiments, medical data protected under HIPAA and other laws are tagged as "HIPAA" or "private." In some embodiments, medical data includes information on one or more of allergies, medical condition(s) or illness(es), medication(s), disabilities, blood type, medical note(s), and other medical information. In some embodiments, medical information protected under HIPAA are encrypted and/or anonymized. In some embodiments, some data are tagged as "general" or another similar tag, wherein access is not specifically restricted.

An example of an additional data communication from the EMS 120 in a standard format compatible with industry standards, PIDF-LO, is shown below.

HTTP/1.1 200 OK
    Date: Tue, 1 Dec. 2016 23:27:30 GMT
    Content-Length: 489
    Content-Type: application/EmergencyCallData.DeviceInfo+xml
    <dev:EmergencyCallData.DeviceInfo
    xmlns:dev="urn:ietfparams:xml:ns:EmergencyCallData:DeviceInfo">
    <dev:
DataProviderReference>d4b3072df.201409182208075@example.org In some embodiments, when the emergency data is stored at a third-party server and receives a request for emergency data from the EMS 120, as a database query, the third-party server formats the requested emergency data and stores this information in an alternate database, and forwards either a response or a reference to the alternate database for accessing the emergency data requested by the EMS 120, which is provided to the ESP 130 over a hybrid analog and/or a data communication channel, depending on the capabilities of ESP 130. In some embodiments, the third-party server stores the emergency data, requested by the EMS 120 or directly by the ESP 130, in the alternate database for a certain period of time after receiving the request for the emergency data regarding a user and any electronic devices 110. In some embodiments, this period of time is a timer value (e.g., a timer countdown or a set time point) defined by the EMS 120 and the third-party server in conjunction with each other prior to the addition of the requested emergency data to the alternate database at the third-party server. In some embodiments, once the timer value has passed and no new requests for the emergency data pertaining to the particular user and the electronic device 110, or other devices associated with the user, are received by the third-party server, then the third-party server marks the particular alternate database entries to be deleted and waits for another, different, time-out interval. In some embodiments, once this particular second time-out interval has also been completed and no new requests for location data for the particular user or associated electronic devices 110 are received by the third-party server, the third-party server removes the specific marked entries from the alternate database in the next cycle of updates for the alternate database. In some embodiments, after adding the emergency data in the alternate database by the third-party server, the third-party server keeps updating the emergency data in the alternate database on a periodic, or as-needed basis, for the purpose of keeping the emergency data about the user or electronic device 110 current for providing the most recent and accurate emergency data to the EMS 120 and the ESP 130 for the purposes of responding to a request for emergency assistance. In some embodiments, the third-party server is updated by the EMS 120 for all the emergency data pertaining to all users and their associated electronic devices 110 that are served by the EMS 120 at any current time.

In some non-emergency situations, there is a need to access location data, user data, emergency data or sensor data. For example, in some embodiments, a user of an electronic device 110 grants authorization to family members to access location data for the user. Accordingly, when a family member requests location data for a user, access is granted if there is proper authorization. As another example, in some embodiments, a taxi operations company requests and obtains location data of one or more fleet members to keep track of its vehicles (e.g., via onboard vehicle console or terminal).

Push to PSAP

In some situations, emergency alerts may be generated without an associated emergency call. Thus, the ESP user may see the incident on the interactive map, but not be assigned to take a call. An ESP user (e.g., a PSAP supervisor) may review the emergency alert and may determine that an emergency response is warranted. In such situations, the "push to PSAP" is initiated by sending the emergency alert from the user device to the EMS. The ESP user may accept the "push to PSAP" by creating an incident in CAD as described below.

It is contemplated that "push to PSAP" will be a valuable functionality as there is currently limited pathways into the PSAP (e.g., by emergency calls or texts in some jurisdiction). In this way, users and user devices can get access to emergency response through alternate pathways.

Various embodiments and applications of the clearinghouse 150 are described in detail herein. However, the embodiments and applications described herein should not be considered exhaustive or limiting in any way.

Figure 2:
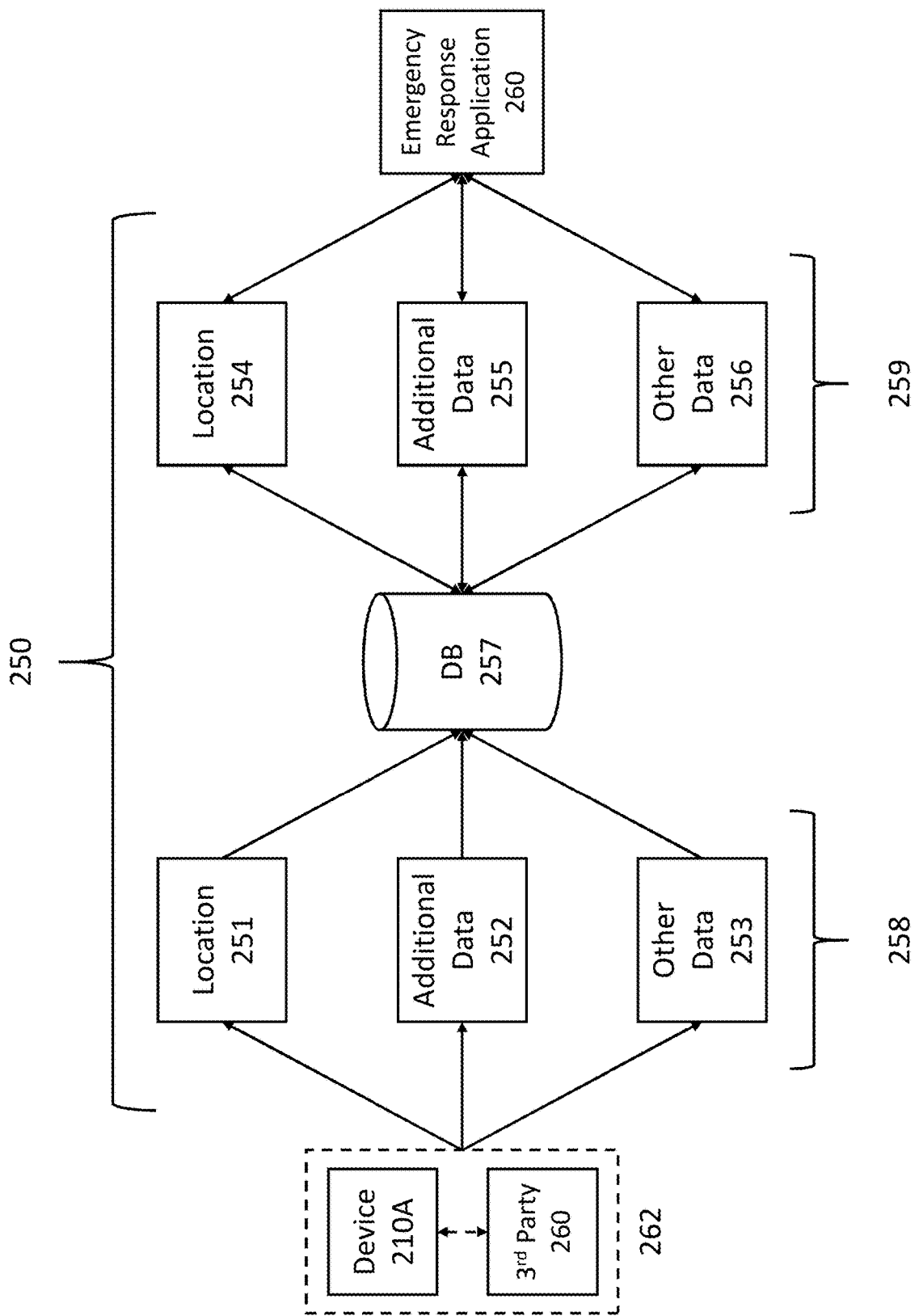
FIG. 2 depicts a diagram showing a non-limiting embodiment of a clearinghouse for emergency data.

FIG. 2 depicts an embodiment of an Emergency Clearinghouse 250 for storing and retrieving emergency data. In some embodiments, the clearinghouse 250 includes a set of ingestion modules 258 (also referred to as "ingestion modules") and a set of retrieval modules 259 (also referred to as "retrieval modules"). The set of ingestion modules 258 is configured to receive various forms of emergency data from various emergency data sources 262, such as an electronic device 210A or a third-party server system 260 (hereinafter, "third-party server"). In some embodiments, an electronic device 210A is a communication device (e.g., a mobile phone), a wearable device (e.g., a smartwatch), or an internet of things (IoT) device (e.g., a smart speaker) that can communicate with one or more of the ingestion modules within the set of ingestion modules 258. In some embodiments, a third-party server 260 stores data that is not generated by or stored within an electronic device. For example, in some embodiments, a third-party server includes a database of static medical information that can be sent to the clearinghouse during an emergency. In some embodiments, when the emergency management system 120 detects an emergency (e.g., when a person calls 9-1-1), the clearinghouse can query an emergency data source 262 for emergency data regarding the emergency. For example, in some embodiments, in response to detecting a 9-1-1 call made from a mobile phone, the additional data ingestion module 252 (as described below) sends a query including the phone number of the mobile phone to a third-party server 260 that stores static medical information. The third-party server 260 can then return any available medical information associated with the phone number of the mobile phone to the additional data ingestion module. In some embodiments, multiple ingestion modules within the set of ingestion modules can receive emergency data for a single emergency. For example, in some embodiments, when a person calls 9-1-1 from a mobile phone, the mobile phone can send a device-based hybrid location to the location ingestion module 251 (as described below) and demographic data (as described above) to the additional data ingestion module 252. In some embodiments, the clearinghouse can receive emergency data from multiple emergency data sources 262 for a single emergency. For example, in some embodiments, when a person calls 9-1-1 from a mobile phone, the clearinghouse can receive a location from the mobile phone (such as through the location ingestion module 251) and a heartrate from a smartwatch that the person is wearing (such as through additional data ingestion module 252). Or for example, in some embodiments, when a person calls 9-1-1 from a mobile phone, the clearinghouse can receive a location from the mobile phone and medical information associated with the person from a third-party server 260.

The set of ingestion modules 258 optionally include a location ingestion module 251, an additional data ingestion module 252, and one or more other data ingestion modules 253. In some embodiments, the location ingestion module 251 is an emergency location service ingestion interface for posting or receiving emergency locations. In some embodiments, the location ingestion module 251 is a REST API that receives an HTTP POST including location data when an emergency alert is generated (e.g., when an emergency call is made from a cell phone). The location data includes a location generated concurrently or in response to the generation of the emergency alert. In some embodiments, the location data includes a location generated before the emergency alert. For example, when an emergency call is made from a cell phone, thereby generating an emergency alert, the location ingestion module 251 receives a location recently generated by the phone but before the emergency alert was generated, ensuring that a location for the emergency is available as quickly as possible. In some embodiments, the location data includes a device-based hybrid location generated by an electronic device 210 that generated the emergency alert. In some embodiments, the location data includes a location generated by a second electronic device communicatively coupled to the electronic device that generated the emergency alert. The location ingestion module 251 is integrated into an electronic device 210 through a mobile application installed on the device 210 or integrated into the firmware or operating system of the electronic device 210.

In some embodiments, the location data is generated by the electronic device 210 before the emergency and is accessible to a PSAP during an emergency. For example, a taxi company may have software that transmits the location of its cars or assets to the emergency clearinghouse 250 preemptively. Thus, when an emergency arises, the location of the affected taxi can be made accessible quicker to send help. In some embodiments, the location data is generated by the electronic device 210 after the emergency has commenced and is made accessible to a PSAP during the on-going emergency. For example, updated location data of a hijacked taxi is also periodically transmitted to the emergency clearinghouse 250 and made accessible to a PSAP.

In some embodiments, the additional data ingestion module 252 is an interface for posting or receiving static or dynamic emergency profile data (hereinafter, "additional data" or "additional information"). In some embodiments, additional data comprises medical data, personal data, demographic data, health data, or any combination thereof. Examples of medical data include information relating to a person's medical history, such as past surgeries or preexisting conditions. Examples of personal data include a person's name, date of birth, height, weight, occupation, address(es) (e.g., home address, work address, etc.), spoken languages, and other personal information. Examples of demographic data include a person's gender, ethnicity, age, etc. Examples of health data include information such as a person's blood type or heartrate. In some embodiments, additional data comprises data received from connected devices such as vehicles, IoT devices, and wearable devices. For example, some intelligent vehicle systems generate and send data regarding a crash, such as the speed at which the vehicle was moving just before the collision, where the vehicle was struck, the number of occupants, etc. In some embodiments, the additional data ingestion module 252 is a REST API (e.g., a JSON (JavaScript Object Notation) REST API). For example, in some embodiments, when an emergency call is made from a cell phone, thereby generating an emergency alert, the cell phone receives a heartrate of the person who made the emergency call from a smartwatch worn by the person and communicatively coupled to the cell phone (e.g., Wi-Fi or Bluetooth connectivity). The cell phone sends the heartrate to the additional data ingestion module 252, along with any other additional data, in an HTTP POST. In some embodiments, the additional data ingestion module 252 is integrated into an electronic device 210 through a mobile application installed on the device 210 or integrated into the firmware or operating system of the electronic device 210. In some embodiments, additional data is sent to the additional data ingestion module 252 from a network server. The additional data ingestion module 252 is accessed by any connected platform that receives data that might be relevant in an emergency. Connected platforms optionally send additional data to the additional data ingestion module 252 at any time. For example, in some embodiments, a website, web application, or mobile application integrated with the additional data ingestion module 252 that allows users to create profiles sends additional data included in the profiles to the additional data ingestion module 252 every time a profile is created or updated.

In some embodiments, the set of ingestion modules 258 includes one or more other data ingestion modules 253. Another data ingestion module 253 is optionally an interface for posting or receiving data relevant to emergencies that is not received by the location ingestion module 251 or the additional data ingestion module 252. In some embodiments, the other data ingestion module 253 receives audio or video streams during an emergency from electronic or communication devices associated with the emergency or proximal to the emergency. For example, an emergency alert is generated by an intelligent vehicle system installed in a vehicle in response to the vehicle experiencing a collision. In this example, the emergency alert is sent to the EMS 120 by the intelligent vehicle system or by an electronic device communicatively coupled to the intelligent vehicle system, such as a cell phone coupled to the intelligent vehicle system via Bluetooth. In response to generating the emergency alert, the intelligent vehicle system additionally begins streaming audio and video from microphones and cameras installed inside or outside of the vehicle to the clearinghouse 250 through the other data ingestion module 253. A cell phone communicatively coupled to the intelligent vehicle system additionally or alternatively streams audio or video from microphones and cameras integrated into the cell phone to the clearinghouse 250 through the other data ingestion module 253. In some embodiments, the one or more other data ingestion modules 253 are REST APIs that are accessed with an HTTP POST.

After receiving the relevant data, the set of ingestion modules 258 can store the data in one or more clearinghouse databases 257. For example, in some embodiments, the clearinghouse databases 257 include a location database and an additional data database. In some embodiments, as described above, the one or more clearinghouse databases 257 are stored on a third-party server communicatively coupled to or otherwise accessible by the EMS 120. In some embodiments, the set of ingestion modules 258 tags or otherwise associates the data received by the modules with an identifier of a user or device associated with the data. For example, the set of ingestions modules 258 tag the data the received by the modules with a user ID number, an email address, or a phone number (e.g., caller ID). In some embodiments, the ingestion modules 258 tag the data received by the clearinghouse 250 based on the data source (e.g., device name or type, application name, user name, phone number, corporate account, etc.).

In some embodiments, the emergency data maintained by the clearinghouse is purged. In some embodiments, the data is purged on a regular or periodic basis. In some embodiments, data that is older than a defined threshold is purged. In some embodiments, different data types are purged according to different schedules and/or thresholds. For example, dynamic data (e.g., data that is subject to constant or regular change) such as location data may be more likely to become out-of-date over time and so may be purged more frequently than static data such as a permanent home address, which may remain permanently in the database until it is replaced with an updated address.

In some embodiments, an individual or group of individuals are associated with multiple identifiers. For example, the location ingestion module 251 receives a location generated by a phone associated with the phone number+1-555-555-5555, associated with John Doe. The additional data ingestion module 252 also receives a heartrate from a smartwatch associated with the email address johndoe@email.com, also associated with John Doe. In this example, the set of ingestion modules 258 tag the location with the phone number "+1-555-555-5555," tag the heartrate with the email address "johndoe@email.com," and associate both the location and the heartrate with John Doe in the clearinghouse databases 257.

In some embodiments, as depicted in FIG. 2, the clearinghouse 250 includes a set of retrieval modules 259. The set of retrieval modules 259 optionally include a location retrieval module 254, an additional data retrieval module 255, and one or more other data retrieval modules 256. In some embodiments, the location retrieval module 254 is an interface for retrieving location data from the clearinghouse databases 257. In some embodiments, the location retrieval module 254 is a JSON REST API that receives a query or request (e.g., in the form of an HTTP GET request) from a requesting party, such as an ESP. In some embodiments, the request is sent from a call-taking application (e.g., call taking module 145) integrated into the ESP system 130. In some embodiments, the request (also referred to as an "emergency data request") is sent from an emergency response application 260. In some embodiments, the location retrieval module 254 provides a single GET endpoint for retrieving either the latest or paginated list of locations for a specific caller ID (e.g., an identifier of a user or an electronic device associated with a user, such as a phone number). For example, as described above, a phone number associated with a device 210 from which a location was received is included in the header, body, or metadata of the request sent to the location retrieval module 254. The clearinghouse 250 then retrieves a location or set of locations from the clearinghouse databases 257 and delivers the location or set of locations to the requesting party. In some embodiments, the location retrieval module 254 is a location information server (LIS). In some embodiments, the LIS is a NG911 standards-based XML API for the retrieval of location data from the clearinghouse databases 257. In some embodiments, as described above, the location retrieval module 254 accepts HELD requests from requesting parties and returns location data for a specific caller ID or anonymous reference. However, in some embodiments, the location retrieval module 254 automatically retrieves and transmits location data using a subscription system, as described below.

As depicted in FIG. 2, the set of retrieval modules 259 optionally include an additional data retrieval module 255. In some embodiments, the additional data retrieval module 255 is a JSON REST API for the retrieval of emergency or additional data. As described above, additional data optionally includes medical data, personal data, demographic data, and health data. Additional data also optionally includes data received from connected devices such as vehicles, IoT devices, and wearable devices. In some embodiments, the additional data retrieval module 255 receives a query or request (e.g., in the form of an HTTP GET request) from a requesting party, such as an ESP. In some embodiments, the request (also referred to as an "emergency data request") is sent from an emergency response application 260. The additional data then retrieves additional data associated with a specific or particular identifier of a user or an electronic device associated with the user, such as a phone number, and returns the data to the requesting party. In some embodiments, the set of retrieval modules 259 further includes one or more other data retrieval modules 256, which function similarly to the location retrieval module 254 and additional data retrieval module 255, for the retrieval of data stored in the clearinghouse databases 257 not retrieved by the location retrieval module 254 or additional data retrieval module 255. However, in some embodiments, the additional data retrieval module 255 automatically retrieves and transmits additional data using a subscription system, as described below.

In some embodiments, a retrieval module within the set of retrieval modules 259 and a corresponding ingestion module within the set of ingestion modules 258 form a sub-clearinghouse. For example, in some embodiments, location ingestion module 251 and location retrieval module 254 combine to form location clearinghouse 150A (as shown in FIG. 1B). Likewise, in some embodiments, additional data ingestion module 252 and additional data retrieval module 255 combine to form additional data clearinghouse 150B. In some embodiments, a requesting party is only given access to a particular sub-clearinghouse. For example, a police officer is only given access to the location clearinghouse 150A, while an EMT (emergency medical technician) is only given access to the additional data clearinghouse 150B. However, a requesting party is given differential access to the clearinghouse 150, sub-clearinghouses, or particular emergency data categories within the clearinghouse 150 based on any factor or set of factors. In some embodiments, a requesting party initiates a query or request (i.e., an emergency data request) using an emergency response application 260 (as described below), which in turn generates the query and transmits the query to the clearinghouse 250.

Emergency Data Subscription System

As described above, in some embodiments, an emergency management system (EMS) maintains a clearinghouse 250 that obtains and shares emergency data to aid emergency service providers (ESPs) in responding to emergencies. During an emergency, in some embodiments, an ESP can send an emergency data request to the EMS through the emergency response application 260, and, in response, the EMS can send any available emergency data associated with the emergency back to the emergency response application 260. In some embodiments, as described above, the emergency response application 260 includes an identifier associated with an emergency alert in the emergency data request. The EMS can then use the identifier associated with the emergency alert to retrieve emergency data associated with the emergency alert from the clearinghouse. For example, as described above, an ESP 230 (e.g., a public safety answering point (PSAP)) can receive an emergency alert in the form of a 9-1-1 phone call (representative of an emergency or potential emergency) from a mobile phone associated with a phone number (e.g., (555) 555-5555). The ESP 230 can then send an emergency data request including the phone number (i.e., the identifier of the emergency alert) to the EMS, which can then retrieve any emergency data within the clearinghouse associated with the phone number and return the available emergency data to the requesting ESP 230. This process of returning emergency data to the emergency response application 260 in response to an emergency data request is referred to as "pulling" emergency data from the clearinghouse.

However, in some embodiments, the EMS can "push" emergency data from the clearinghouse 250 to the emergency response application (i.e., the EMS can send emergency data to the emergency response application 260 without receiving an emergency data request). In some embodiments, the EMS pushes emergency data to the emergency response application 260 using an emergency data subscription system. Using the emergency data subscription, a recipient (or potential recipient) of emergency data from the clearinghouse 250 can subscribe to the clearinghouse 250 for a particular device identifier, user identifier, or ESP account (hereinafter, "subscription"). After subscribing to a subscription, the recipient (e.g., an ESP) may automatically receive updates regarding the subscription without first sending an emergency data request. For example, in some embodiments, if an ESP subscribes to a phone number, whenever the clearinghouse 250 receives updated emergency data associated with the phone number, the clearinghouse 250 can automatically send the updated emergency data associated with the phone number to the ESP (e.g., through the emergency response application 260), without first receiving an emergency data request including the phone number. For example, in some embodiments, if a recipient is subscribed to a particular phone number, and the clearinghouse 250 receives a new or updated location associated with the particular phone number, the clearinghouse 250 will instantly and automatically push the new or updated location associated with the particular phone number to the recipient the moment that the new or updated location is received by the clearinghouse 250, without the recipient having to send an emergency data request. In some embodiments, when an ESP or ESP personnel accesses the emergency response application 260 at a computing device associated with the ESP or ESP personnel, the EMS establishes a websocket connection with the computing device in order to push emergency data regarding a subscription to which the ESP or ESP personnel is subscribed to the emergency response application 260. WebSocket is a type of computer communications protocol. A websocket connection is a longstanding internet connection between a client and a server that allows for bidirectional communication between the client and server without the client needing to send data requests to the server, which differentiates the WebSocket computer communications protocol from other types of computer communications protocols such as the HyperTextual Transfer Protocol (HTTP). The WebSocket protocol is often used by chat clients to facilitate user to user webchats. In some embodiments, the EMS establishes a websocket connection with a computing device (e.g., an ESP console 130) in response to receiving an emergency data request. In some embodiments, the EMS establishes a websocket connection with an ESP console when an ESP personnel logs into the emergency response application 260 at the ESP console. In some embodiments, the EMS establishes a websocket connection with a responder device when an ESP personnel logs into the emergency response application 260 at the responder device. In some embodiments a websocket connection established between the EMS and a computing device associated with ESP personnel is maintained by the EMS for the duration of the ESP personnel's log-in session.

In some embodiments, the EMS automatically subscribes a recipient to a subscription (e.g., a particular device identifier or user identifier) in response to receiving an emergency data request including the subscription or an identifier of the subscription. For example, in some embodiments, when an ESP personnel sends an emergency data request including a phone number to the EMS through their ESP console (e.g., through the emergency response application 260), the EMS subscribes the ESP personnel to the phone number and establishes a websocket connection with the ESP console. Then, whenever the clearinghouse 250 receives updated emergency data associated with the phone number, the EMS can automatically push the updated emergency data associated with the phone number to the ESP console. For example, an ESP personnel logs into an emergency response application 260 in communication with the EMS on the ESP personnel's ESP console. Subsequently, the ESP personnel receives a 9-1-1 call from a mobile phone and then generates and sends an emergency data request including the phone number of the mobile phone to the EMS through the emergency response application 260. The EMS then uses the phone number of the mobile phone to retrieve the most recent location associated with the mobile phone received by the clearinghouse and returns the most recent location associated with the mobile phone to the ESP personnel through the emergency response application 260. The EMS simultaneously subscribes the ESP personnel to the phone number of the mobile phone and establishes a websocket connection between the EMS and the ESP console and automatically pushes any updated emergency data (e.g., locations) associated with the phone number received by the clearinghouse to the emergency response application 260 as soon as the updated emergency data associated with the phone number is received by the clearinghouse 250.

In some embodiments, an ESP is associated with a unique ESP account ID that an ESP or ESP personnel can subscribe to. The EMS can then establish a websocket connection with a computing device associated with an ESP or ESP personnel subscribed to the unique ESP account ID and push emergency data associated with the unique ESP account ID to the computing device (e.g., through the emergency response application 260) whenever new or updated emergency data associated with the unique ESP account ID is received by the clearinghouse 250. For example, in some embodiments, when the clearinghouse 250 receives a location associated with an emergency alert (e.g., when a person calls 9-1-1 from a mobile phone and the mobile phone responsively sends a current location of the mobile phone to the clearinghouse 250), the EMS retrieves one or more geofences (as described below) associated with each ESP registered with the EMS and determines which (if any) of the geofences that the location associated with the emergency alert falls within. The EMS then tags the location associated with the emergency alert with the unique ESP account IDs associated with each of the ESPs associated with geofences that the location associated with the emergency alert falls within. For example, if four ESPs are registered with the EMS—ESP A, ESP B, ESP C, and ESP D—and the clearinghouse 250 receives a location associated with an emergency that falls within the one or more of the geofences associated with ESP A and ESP D, the EMS can tag the location associated with the emergency alert with the unique ESP account ID associated with ESP A and the unique ESP account ID associated with ESP D. The EMS can then push the location associated with the emergency alert to any ESPs or ESP personnel with an established websocket connection with the EMS and currently subscribed to either the unique ESP account ID for ESP A or the unique ESP account ID for ESP D. In some embodiments, when an ESP personnel logs into the emergency response application 260, a communication is sent to the EMS that includes one or more unique ESP account IDs that the ESP personnel or their respective ESP is currently subscribed to.

Emergency Data Geofencing

Figure 3:
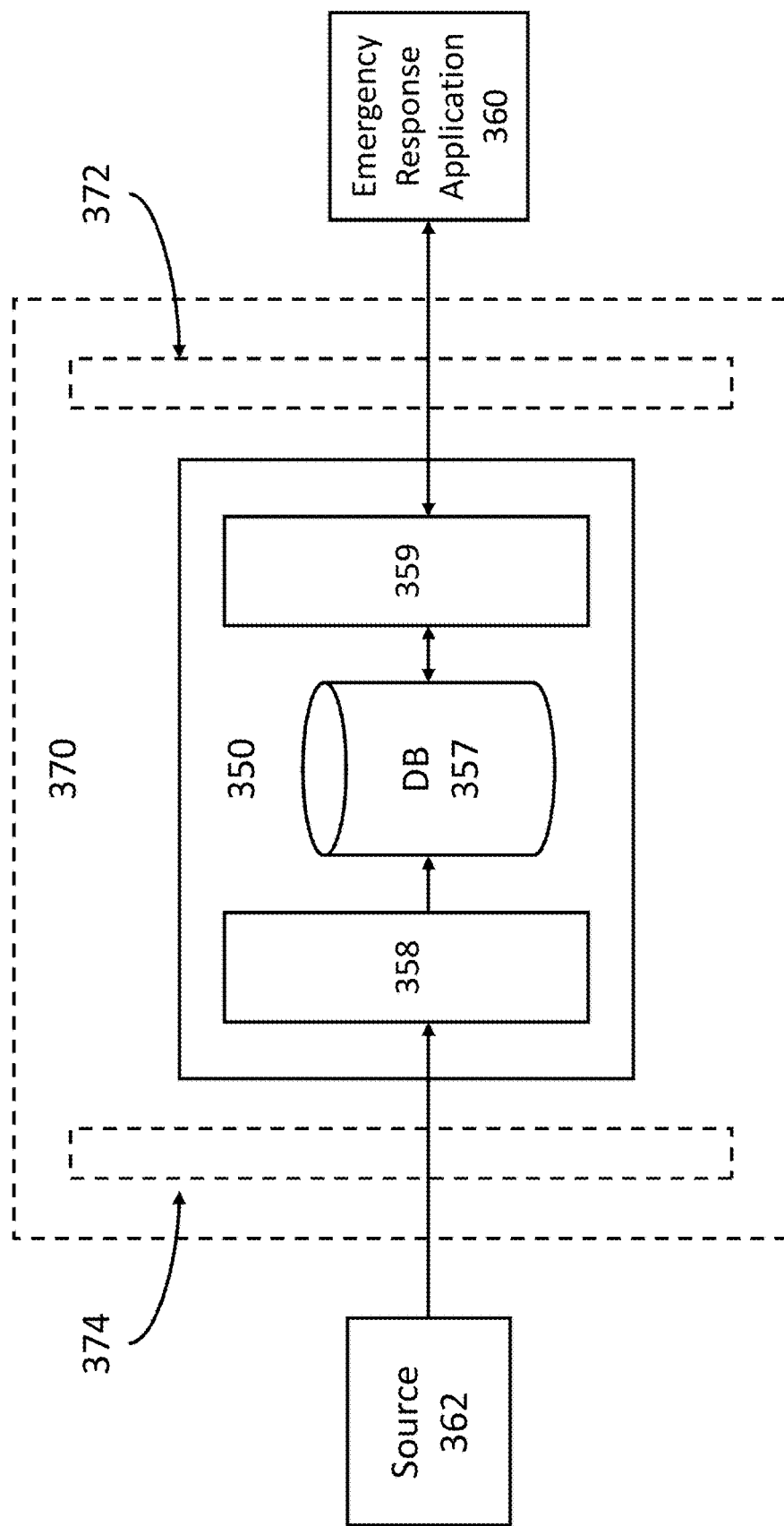
FIG. 3 depicts a diagram showing a non-limiting embodiment of a geofence applied to a clearinghouse for emergency data.

FIG. 3 depicts a diagram of a geofence applied to a clearinghouse for emergency data. In some embodiments, a geofence module 370 is applied to the clearinghouse 350 to protect potentially sensitive emergency data using geospatial analysis. In some embodiments, as described above with respect to FIG. 2, the clearinghouse 350 includes a set of ingestion modules 358 and a set of retrieval modules 359. The set of ingestion modules can receive emergency data, or other information that can be useful in responding to an emergency, from a variety of sources. For example, in some embodiments, a smartphone sends emergency data to the clearinghouse 350 in the form of an HTTP POST API call in response to a user of the smartphone initiating a 911 emergency call. As depicted in FIG. 3, in some embodiments, when emergency data (e.g., an emergency location or additional emergency data) is sent from an electronic device 310 to the clearinghouse 350, the emergency data is first processed by a geofence module 370 before being received by the set of ingestion modules 358 within the clearinghouse 350, as described below with respect to FIG. 10. Similarly, in some embodiments, when an emergency data request is sent from a requesting party (e.g., the emergency response application 360, as described below), the emergency data request is processed by the geofence module 370 before being received by the set of retrieval modules 359 for display on a GUI of the emergency response application 360 on a computing device of the requesting party.

In some embodiments, as mentioned above, a geofence module 370 is applied to the clearinghouse 350 to protect potentially sensitive emergency data using geofences. Generally, a geofence is a virtual perimeter for a real-world geographic area. A geofence can be dynamically generated—as in a radius around a point location—or a geofence can be a predefined set of boundaries (such as school zones or neighborhood boundaries). The use of a geofence is called geofencing, and one example of usage involves a location-aware device of a location-based service (LBS) user entering or exiting a geofence. Entry or exit from a geofence could trigger an alert to the device's user as well as messaging to the geofence operator. The geofence information, which could contain the location of the device, could be sent to a mobile telephone or an email account.

For emergency response, an emergency service provider (public or private entities) may be given jurisdictional authority to a certain geographical region or jurisdiction (also referred to as "authoritative regions"). In the context of emergency services, one or more geofences may correspond to the authoritative region of an ESP. In many cases, the ESP is a public entity such as a public safety answering point (PSAP) or a public safety service (PSS; e.g., a police department, a fire department, a federal disaster management agency, national highway police, etc.), which have jurisdiction over a designated area (sometimes, overlapping areas). Geofences are used to define the jurisdictional authority by various methods and in various Geographic Information System (GIS) formats. In some embodiments, geofences only represent authoritative regions if the geofence has been assigned or verified by a local, state, or federal government. In some embodiments, geofences represent assigned jurisdictions that are not necessarily authoritative regions. For example, in some embodiments, a geofence is unilaterally created by its associated ESP without verification or assignment by a local, state, or federal government.

Geofences can be defined in various ways. For example, in some embodiments, a geofence comprises one or more of the following: a county boundary, a state boundary, a collection of postal/zip codes, a collection of cell sectors, simple shapes, complex polygons, or other shapes or areas. In some embodiments, geofences comprise approximations where the "approximated" geofence encloses an approximation of the authoritative region.

Updates to geofences may be required over time because the authoritative regions may change over time. Geofences may change over time (e.g., a new sub-division has cropped up) and require updates. In some embodiments, the systems and methods described herein allow geofences to be updated (e.g., a PSAP administrator can upload updated geofence GIS shapefiles).

For maintaining the privacy, security and integrity of the data, geofencing may be applied to emergency data. For example, applying geofence filters to the emergency data allows additional avenues for monitoring, both visibility and control, over the clearinghouse to detect anomalies/spikes and reduce the risk of security breaches.

In some embodiments, the emergency data is obtained from an emergency data source 362 (such as an electronic device or third-party server, as described above). On the retrieval side, in some embodiments, an emergency data recipient 363 accesses the clearinghouse 350 by sending an emergency data request to the clearinghouse 350, as described above. An ingestion geofence 374 (also referred to as "upstream filtering") is applied to restrict sending of data from emergency data sources 362 to the clearinghouse 350 from geographical areas that are not covered by the "combined authoritative jurisdiction" (i.e., covered one or more provisioned geofences in the geofence database (not shown)). In some embodiments, the ingestion geofence (also referred to as an "ingress filter") is applied to the ingestion module 358 to protect against accidental breaches of privacy. In some embodiments, the ingestion module 358 of the clearinghouse 350 drops location payloads that do fall within the geographical region covered by the "combined authoritative region."

In some embodiments, the clearinghouse 350 comprises one or more databases 357 (e.g., a database storing emergency data). For example, in some embodiments, the retrieval module 359 obtains emergency data from a clearinghouse database 357 to send to an emergency data recipient 363 (e.g., an ESP) in response to an emergency data request, as described above. In some embodiments, the retrieval geofence 372 (also referred to as an "egress filter") is applied at the retrieval module 359 of the clearinghouse 350. Applying geofencing to retrieved emergency data will protect against abuse and limit the scope of security breaches in cases where credentials have been compromised. In some embodiments, one or more geofences are associated with one or more credentials associated with an ESP agency or organization. In some embodiments, the credentials associated with an ESP agency or organization confers authorization to access data such as emergency data from the clearinghouse. In some embodiments, specific authorization to access data is granted individually to members of a PSAP through tokens derived from the credentials for that PSAP.

In some embodiments, when the retrieval module 359 checks the coordinates of current location data (within retrieved emergency data) associated with a device identifier with the geofence(s) associated with the credentials in an emergency data request. If the current location is within the geofence region (enclosed by the geofence(s)), the current location is returned to the ESP and displayed within the ESP console. If not, the module 359 will return a "not found" message (as opposed to the retrieved location is outside the geofence) to protect privacy.

In some embodiments, geofences can be used for reporting results for internal metrics and monitoring the system. For example, the number of emergency data requests, locations provided, "no location found" etc., can be obtained for a geofence(s) associated with a PSAP. Using single or combined geofences, the emergency data can be obtained on county-wide, city-wide, postal code, course grid (rectangle overlay), state-wide, or country-wide basis. In some embodiments, ingress and egress counters (i.e., percent of emergency sessions where the location data was received, but not queried) and other similar metrics can be calculated and analyzed to identify problems and spikes. In some embodiments, different geofences are used for retrieval and for reporting.

In some embodiments, a given incident (e.g., an incident associated emergency alert, as described below) can be determined to fall within a plurality of geofences, as described below. In some embodiments, emergency data for the incident is pushed to each PSAP having a geofence that the incident (e.g., a location associated with the incident) falls within. In some embodiments, emergency data for the incident is pushed to a subset of PSAPs having a geofence that encloses or encompasses the incident. In some embodiments, the location data of an individual device identifier is not pushed to more than one PSAP at one time. In some embodiments, wherein a device identifier egresses a geofence in which communication began and ingresses into a neighboring geofence, the location data is autocratically pushed to the neighboring PSAP with jurisdiction over the ingress geofence.

To determine the appropriate ESP(s) for sharing emergency data, the authoritative jurisdiction (defined by one or more geofences) of an ESP (e.g. primary agency) has to be evaluated. In case of irregularities (e.g. overlaps, islands, or other irregular features), steps may be taken to check with respective agency, geographical boundaries (national and international borders, county lines, rivers, hills, etc.), or other authority. In some embodiments, call routing data may be analyzed to see which ESP is answering the emergency call.

Raw geofences may be pre-processed to generate processed geofences using a variety of techniques (e.g. before provisioning as shown in FIG. 7. For removing irregularities, a geofence may be processed to resolve overlaps, remove islands and projections, smooth boundaries, modifying the file format or size, etc.

In some cases, there may be overlap between geofence of two or more ESPs. In some embodiments, the emergency data may be shared with the two or more ESPs to err on the side of making mission critical information to all entities that may be involved in the emergency response. In some embodiments, the two or more ESPs are primary agencies (e.g. PSAPs) and the emergency data has to be shared with one appropriate ESP. To determine the appropriate ESP(s) for sharing emergency data, the authoritative jurisdiction (defined by one or more geofences) of the overlapping ESPs by checking with respective agency, geographical boundaries (national and international borders, county lines, rivers, hills, etc.), sample routing data, etc. In contrast, if the overlapping ESPs include one or more secondary ESPs, the overlap may be retained and emergency data may be shared with one or more ESPs (e.g. one primary agency and two secondary agencies).

In some embodiments, a buffer (e.g., +10 km) is added to the geofence(s) so that results within the buffer zone are also returned. In many cases, PSAPs have discretion and incentive to respond to emergencies that are beyond their authoritative jurisdiction. As an example, a geofence that is a circular area with a radius of 10 km would have an area of 100 π or ~314 km2, whereas the same area with a 10 km buffer around its circumference would have yield a combined radius of 20 km and a combined area of 400 π or 1256 km2. In some embodiments, the buffer is from 0.5 km to 5 km, from 0.5 km to 10 km, from 0.5 km to 15 km, from 0.5 km to 20 km, from 0.5 km to 25 km, or from 0.5 km to 30 km. In some embodiments, the buffer is from 1 km to 5 km, from 1 km to 10 km, from 1 km to 15 km, from 1 km to 20 km, or from 1 km to 30 km. In some embodiments, the buffer is at least 0.1 km, at least 0.2 km, at least 0.3 km, at least 0.4 km, at least 0.5 km, at least 0.6 km, at least 0.7 km, at least 0.8 km, at least 0.9 km, at least 1 km, at least 2 km, at least 3 km, at least 4 km, at least 5 km, at least 6 km, at least 7 km, at least 8 km, at least 9 km, at least 10 km, at least 11 km, at least 12 km, at least 9 km, at least 14 km, at least 15 km, at least 16 km, at least 17 km, at least 18 km, at least 19 km, at least 20 km, at least 25 km, or at least 30 km. In some embodiments, the buffer is no more than 0.1 km, no more than 0.2 km, no more than 0.3 km, no more than 0.4 km, no more than 0.5 km, no more than 0.6 km, no more than 0.7 km, no more than 0.8 km, no more than 0.9 km, no more than 1 km, no more than 2 km, no more than 3 km, no more than 4 km, no more than 5 km, no more than 6 km, no more than 7 km, no more than 8 km, no more than 9 km, no more than 10 km, no more than 11 km, no more than 12 km, no more than 9 km, no more than 14 km, no more than 15 km, no more than 16 km, no more than 17 km, no more than 18 km, no more than 19 km, no more than 20 km, no more than 25 km, or no more than 30 km.

Figure 4:
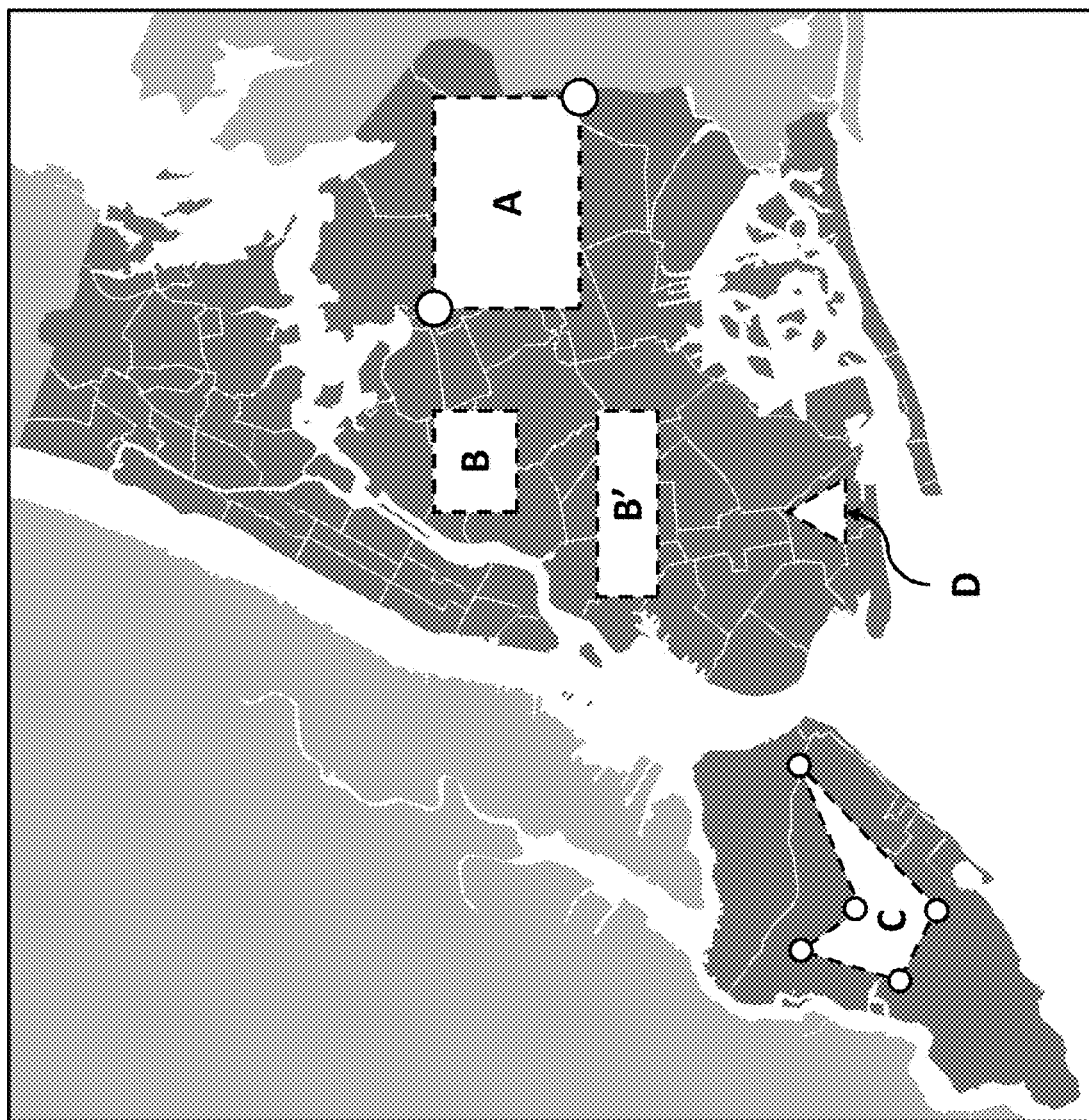
FIG. 4 depicts a map illustrating non-limiting examples of geofence approximations.

FIG. 4 illustrates non-limiting examples of geofence approximations that may be submitted as an "authoritative jurisdiction" for an ESP. One or more geofences enclose the geofenced region which is under the authoritative jurisdiction of an ESP. In some cases, the geofenced region may be a complex polygon, but it may be approximated using an appropriate shape. For example, a/ rectangle (A), two disjointed rectangles (B, B'), a polygon with several sides (C) and a triangle (D), may represent different geofenced regions (defined by one or more geofences).

In some embodiments, an administrator of a PSAP submits the complex authoritative jurisdiction as one or more approximate geofence(s) by specifying points. For example, the PSAP administrator can submit geofenced region A by specifying two points—the north-west corner and the south-east corner using a drawing tool provided by the GUI of the emergency response application. In this example, the two points of the geofenced region are set using two latitude-longitude coordinates. In another example, the multiple-sided polygon C is submitted by specifying the five corners. In some embodiments, a PSAP administrator approximates a geofence for a PSAP by drawing one or more polygons using a drawing tool provided by the GUI of the emergency response application. In some embodiments, a geofence is generated using a series of points that are connected (e.g., entering three longitude-latitude points on a map to form a triangular geofence).

Approximating a complex geofenced region has several advantages. The geofence(s) are simple and the calculations can be quicker and less cumbersome for applications where exact calculations are not needed.

In some embodiments, a PSAP administrator can submit a GIS file (e.g., a shapefile) that represents the actual authoritative jurisdiction of the PSAP, which may then be provisioned in a geofence database. It is appreciated that a GIS file defining the authoritative jurisdiction may be saved in one or more industry-acceptable formats such as a shapefile, a GeoJSON file, KML file, etc. In some embodiments, the GIS file includes one or more features such as points, lines, polygons, density, and other shapes. A GeoJSON is open standard GIS file representing geographical features and non-spatial attributes based on JavaScript Object Notation. Some non-limiting examples of features include points (such as addresses and locations), line strings (streets, highways and boundaries), polygons (countries, provinces, tracts of land), and multi-part collections of these types. A Keyhole Markup Language (KML) file includes geographic annotations and visualization on internet-based maps on Earth browsers. A shapefile is a vector data format for storing the location, shape, and attributes of geographic features. A shapefile is stored in a set of related files, each of which may contain one feature class (e.g., lines, points, polygons, etc.). In some embodiments, the shapefile is a file with extension .SHP in ESRI file format where SHP is the feature geometry, SHX is the shape index position and DBF is the attribute data.

Various embodiments of the geofence database are contemplated. In some embodiments, one or more databases are searchable using a PSAP identifier, credentials, or other information. In some embodiments, an emergency location is searched through several geofences in the geofence database. In some cases, the geofenced region is shrunk for ease of storage and to simplify calculations.

Figure 5:
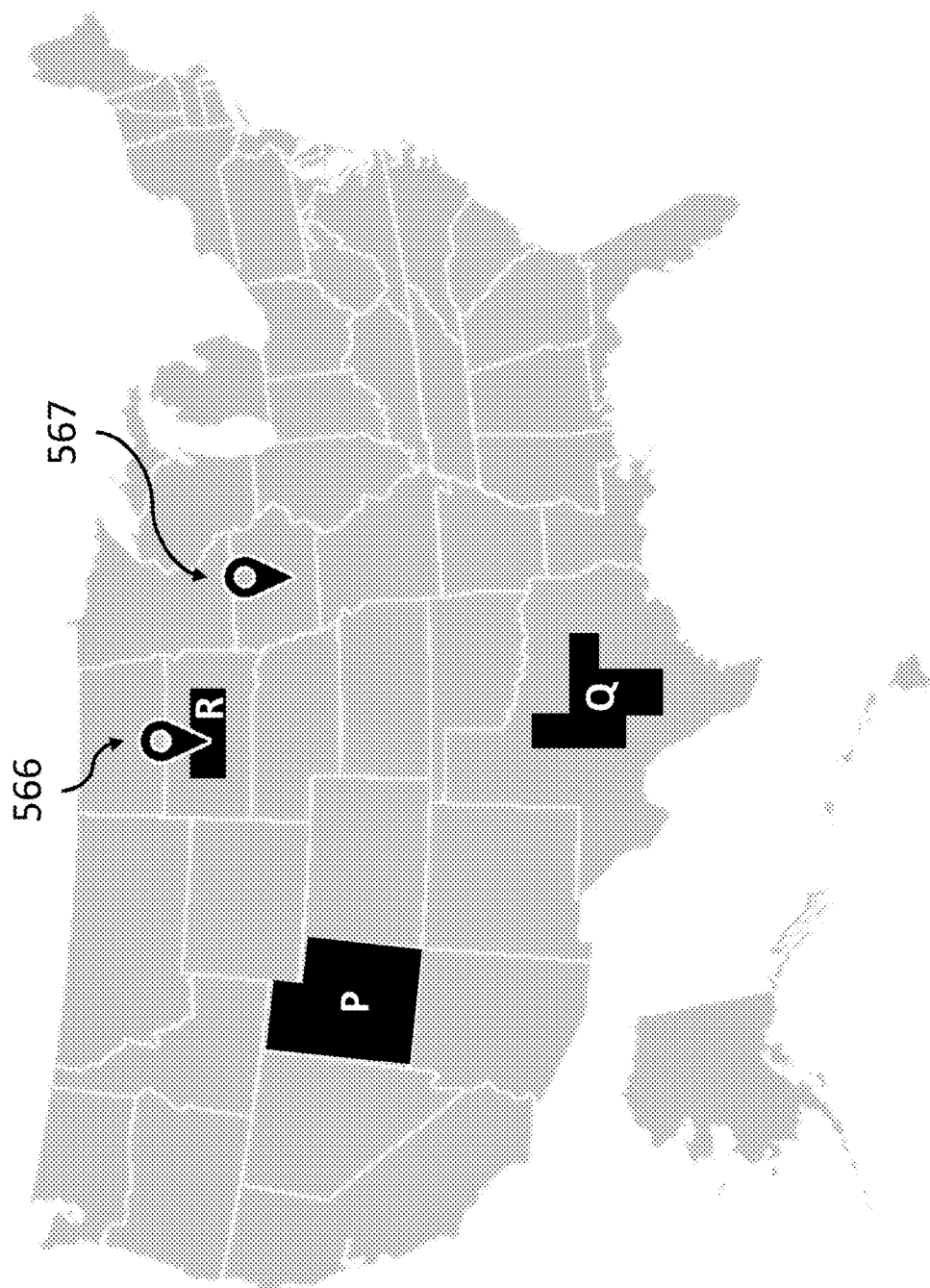
FIG. 5 illustrates non-limiting examples of geofenced regions defined by one or more geofences within the United States.

FIG. 5 illustrates non-limiting examples of geofenced regions defined by one or more geofences within the United States. As shown, the geofenced region (e.g. an authoritative jurisdiction) may comprise an entire state (P), a complex shape within a state (Q), and a simple (rectangle) shape (R). As described in FIG. 3, the clearinghouse 350 will return the emergency location if it is within the retrieval geofence(s) associated with the credentials in the emergency data request. Referring back to FIG. 5, if an ESP member or user associated with geofenced region R is requesting an emergency location using the device identifier at location 566 and 567, the emergency location 566 will be returned, while emergency location 567 will be returned as an "unavailable location."

In some embodiments, geofences may be defined on a grid mesh including equal-sized rectangles or grids, for example, on the entire United States. In such scenarios, the grid-lines may be used as geofences to define geofenced region comprising each grid. Such grid-geofences may be used as other geofences for filtering, reporting and monitoring emergency data.

Figure 6:
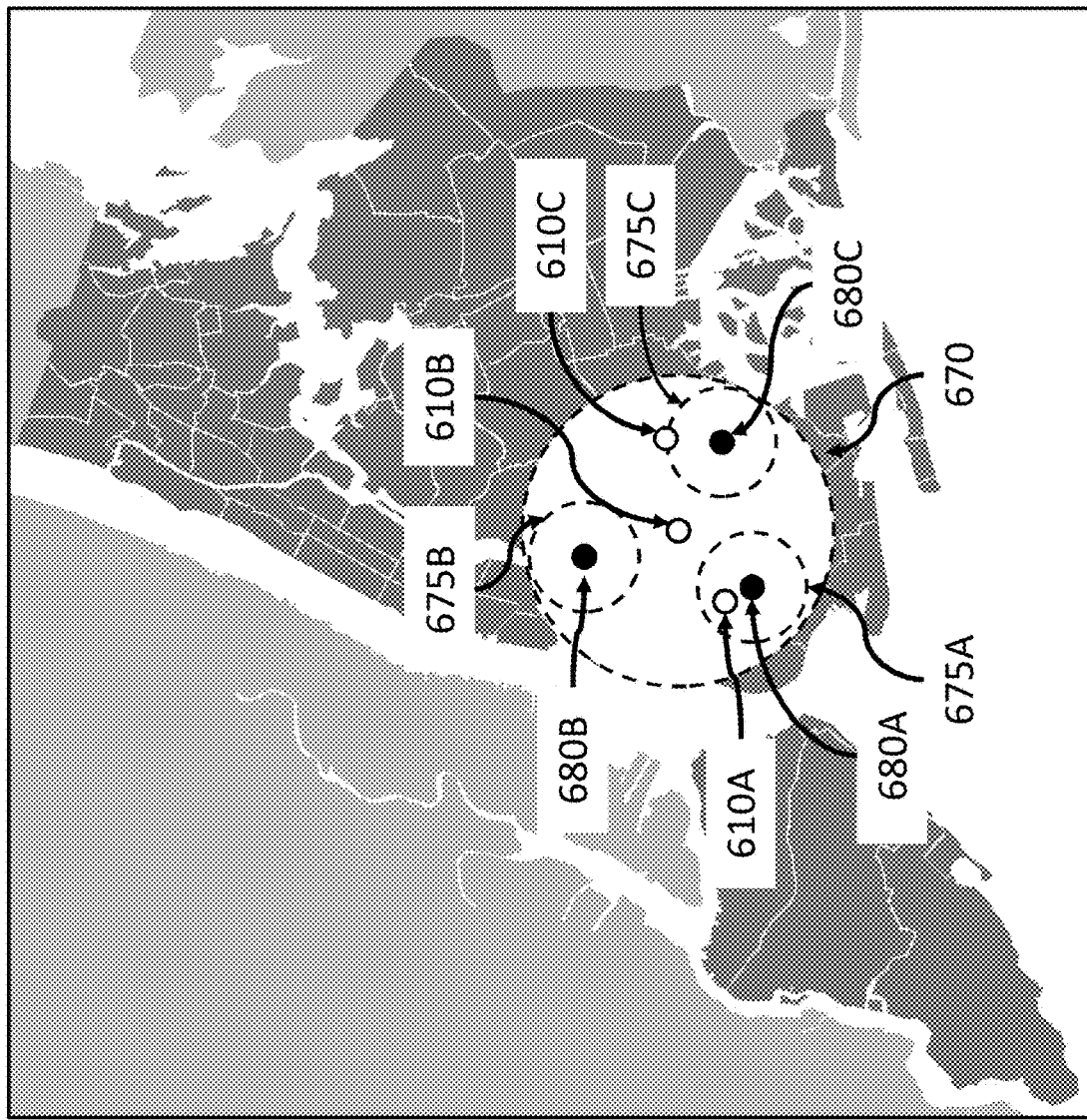
FIG. 6 depicts a map illustrating non-limiting examples of sub jurisdictions within a larger geofenced region.

FIG. 6 illustrates non-limiting examples of sub-jurisdictions within a larger geofenced region. As described, sub jurisdiction geofences may be used for filtering, monitoring and visualizing emergency data. In addition, the sub jurisdiction geofences may also be used for allocating and managing emergency responders. For example, several ESPs or responders may be serving the geofenced region 670. Geofencing can combine awareness of one or more emergency responders with awareness of the responder's proximity to locations where emergencies may be occurring (white dots 610a, 610b, 610c). To mark a responder location (black dots 680a, 680b, and 680c), its latitude, longitude and altitude can be specified. To adjust for proximity, a proximity radius can be added (see 675a, 675b, 675c). The latitude, longitude, and radius define a geofence, creating a circular area, or fence, around the location of the responder.

Various ways of using of proximity radius and assigned jurisdictions for visualizing and responding emergencies are contemplated. In another example, the region 670 is assigned to a police station, which may send officers to respond when the emergency situations arise. In this example, several police officers (black dots 680a, 680b, and 680c) may be assigned a specific beat 675a, 675b, and 675c (in various shapes) to monitor and emergencies occurring within each area.

Various scenarios are contemplated based on where the emergency is occurring. For example, when an emergency occurs in emergency location 610a, it is clearly within officer 680a's assigned jurisdiction and he or she may be first contacted to respond. In some situations, officer 680a may visualize the location of the emergencies and give priority to the emergency that is occurring within his or her beat. In contrast, emergency location 610c, the emergency is on the boundary of the officer 680c. Finally, emergency 610b is occurring outside the sub-jurisdictions of all the officers and one of the officers may volunteer to respond to the emergency. In some embodiments, the geofence may be used to not allow one or more officers to view emergencies outside its main jurisdiction or sub jurisdiction or outside a proximal radius based on the policy of the police station. It is contemplated that a police administrator (e.g. a police chief) may define the sub-jurisdictions or proximal radius to administer the geofenced region 670.

FIG. 7 depicts the process of provisioning and indexing of geofences. Generally, the process includes a geofence submission unit 776 (not marked) and a geofence provisioning unit 778 (not marked). As shown, an ESP administrator 765 can submit a GIS file 773 (e.g. a shape file) for the actual authoritative jurisdiction 775 of the ESP agency or organization, which may be provisioned in a geofence database 779.

It is appreciated that a GIS file 773 defining the authoritative jurisdiction may be saved in one or more industry-acceptable formats such as a GIS shape file, a GeoJSON file, KML file, etc. The GIS file may include various features such as points, lines, polygons, density, etc. A GeoJSON is open standard GIS file representing geographical features and non-spatial attributes based on JavaScript Object Notation. Some non-limiting examples of features include points (such as addresses and locations), line strings (streets, highways and boundaries), polygons (countries, provinces, tracts of land), and multi-part collections of these types. A Keyhole Markup Language (KML) file includes geographic annotations and visualization on internet-based maps on Earth browsers. A GIS shape file is a vector data format for storing the location, shape, and attributes of geographic features. A shapefile is stored in a set of related files, each of which may contain one feature class (e.g. lines, points, polygons, etc.). In some embodiments, the GIS shape file is a shape file with extension .SHP in ESRI file format where SHP is the feature geometry, SHX is the shape index position and DBF is the attribute data.

In some embodiments, the ESP administrator 765 submits one or more geofence(s) for provisioning a geofence database 779 as described in FIG. 5. For example, an approximated geofenced area 775 can be submitted using a shape file. In another example, the geofence may be submitted in one or more formats such as .shp, .shx, .dbf, .xml, .sbn, .sbx, .cpg, GeoJSON, etc., in a zipped folder. In some embodiments, the geofences is converted a common format for pre-processing (e.g. GeoJSON).

The credentials of the ESP administrator 765 can be matched to the ESP agency or organization (associated with an ESP account such as a PSAP identifier) and used for provisioning the submitted geofences in the provisioning unit 778. In some embodiments, the geofences are provisioned into a geofence database 779.

Various embodiments of the geofence database 779 are contemplated. It may be one or more databases that may be searchable using an ESP identifier (e.g. PSAP identifier), ESP account, user credentials, by state, etc. In some embodiments, an emergency location (e.g. from an emergency alert) may be matched with one or more geofences in the database 779 (as described in the jurisdictional awareness views in FIGS. 12, 13A-13C. In some cases, the geofenced region may be shrunk for easy of storage and to simplify calculations.

Emergency Response Application

Figure 8A:
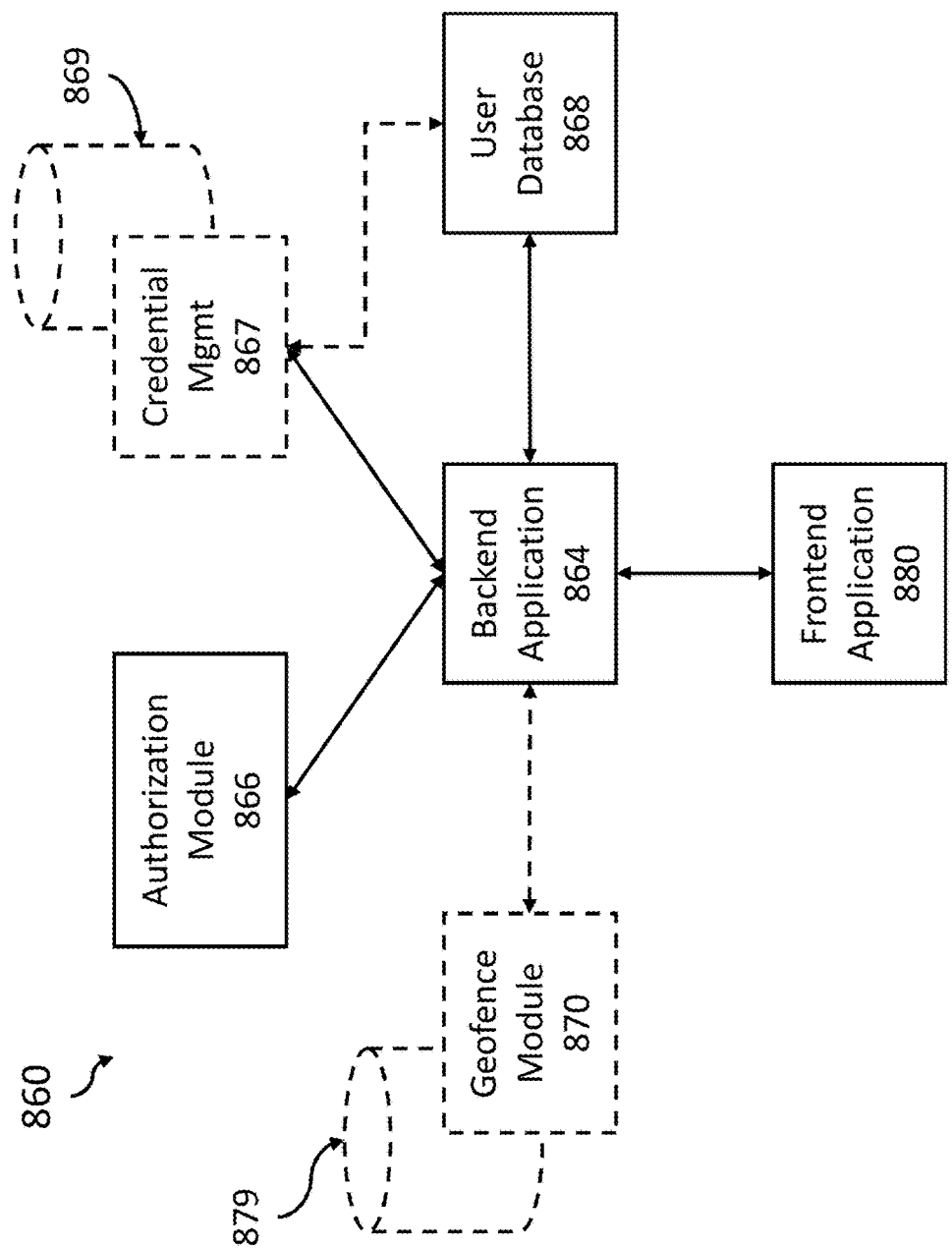
FIG. 8A depicts a diagram of an emergency response application.

As mentioned above, in some embodiments, a requesting party (e.g., a PSAP) initiates a query or request for emergency data using an emergency response application, which in turn generates the query and transmits the query to the clearinghouse. FIG. 8A depicts a diagram of an emergency response application 860. In some embodiments, the emergency response application 860 includes a frontend application 880 (hereinafter "graphical user interface" or "GUI"), a backend application 864, an authorization module 866, and a user database 868. In some embodiments, the emergency response application 860 additionally or alternatively includes a credential management system 867 or a geofence module 870. In some embodiments, the credential management system 867 and the geofence module 870 are external to the emergency response application 860 and communicatively coupled to the emergency response application 860. In general, the components of the emergency response application 860 function to provide a graphical user interface for users (e.g., employees of a PSAP) to register for access to the emergency data stored within the clearinghouse, deliver emergency data requests to the clearinghouse, and receive emergency data from the clearinghouse. In some embodiments, the components of the emergency response application 860 additionally function to provide a graphical user interface for users to submit geospatial representations of jurisdictions (hereinafter, "geofences"), which is optionally used by the EMS to protect potentially sensitive emergency data stored within the clearinghouse, as described below.

In some embodiments, users interact with the emergency response application 860 using the frontend application, or graphical user interface (GUI) 880. In some embodiments, the GUI 880 is a webpage that is accessible through a web browser. In some embodiments, the GUI 880 is accessed through a desktop application. In some embodiments, the GUI 880 contains one or more pages each with their own plurality of interactive elements, such as, but not limited to, entry fields, soft buttons, sliders, maps, images, and videos. In some embodiments, the interactive elements of the GUI 880 are configured to instruct the GUI 880 or the backend application 864, or both, to perform various operations. As an example, a soft button (e.g., a "next" button) instructs the GUI 880 to navigate from one page to another. Another soft button (e.g., a "submit" button) instructs the GUI 880 to navigate from one page to another while concurrently instructing the backend application 864 to store and/or process information submitted by a user into an entry field elsewhere within the GUI 880. In some embodiments, the backend application 864 functions to receive inputs from the GUI 880 and coordinates the functions of the authorization module 866, the credential management system 867, the user database 868, and the geofence module 870 to deliver emergency data requests to the clearinghouse, receive emergency data from the clearinghouse, and display the emergency data to the users of the emergency response application 860. In some embodiments, one or more geofences are stored within one or more geofence databases 869 accessible by the geofence module 870.

Figure 8B:
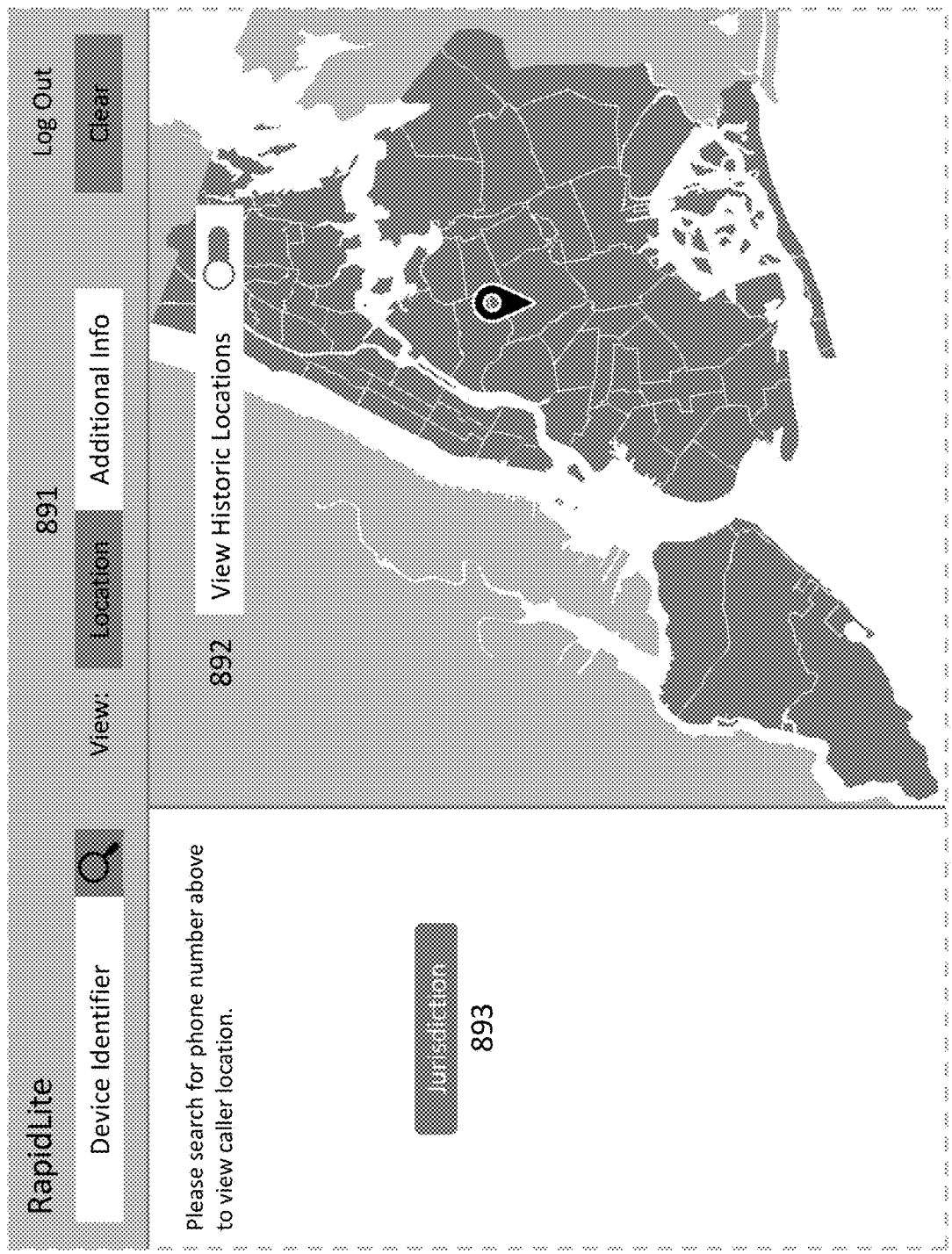
FIG. 8B illustrates an embodiment of a graphical user interface provided by an emergency response application.

In some embodiments, the emergency response application GUI 880 is customizable. FIG. 8B depicts a non-limiting example of an emergency response application webpage GUI 480. In some embodiments, the GUI is configurable to display information relevant to the individual authority. In some embodiments, the GUI is configurable to restrict information from being accessed by an individual authority. For example, the GUI available to a PSAP administrator may display options to access sensor data, traffic data, video data and historical and live location data while a GUI used by a first responder may display live location data, personal medical data, and traffic data. In some embodiments, the individual features of the GUI are customizable, such that a user can enable or disable functionalities and/or data streams 891. For example, a user may enable or disable a historic location overlay 892. In another example a user may enable or disable personal medical information associated with the device identifier. In some embodiments, the individual features of GUI are able to be arranged by the user according to the user's preferences. In some embodiments, features of the GUI are made available based on a user's proximity to an emergency. For example, a first responder may gain access to a medical data associated with a device identifier when the first responder is 5000, 2000, 1000, or 500 meters or less from the emergency. In some embodiments, the GUI includes a functionality to enable and disable a websocket connection 893 that, when enabled, automatically pushes device identifier data (e.g., phone number, IP address) to the emergency response application 860, as described below.

As mentioned above, in some embodiments, the emergency response application 860 is a webpage that can be accessed through an internet or web browser. In such embodiments, the emergency response application 860 can be quickly and easily integrated into the systems used by emergency service providers (ESPs), such as public safety answering points (PSAPs), because accessing and using emergency response application 860 requires no additional software or hardware outside of standard computing devices and networks. As previously discussed, one of the greatest hindrances that PSAPs face in providing emergency assistance to people experiencing emergency situations is in acquiring accurate locations of the emergencies and the people involved, because PSAPs are currently typically limited to verbally asking for and verbally receiving locations from callers. In some embodiments, the clearinghouse is capable of receiving accurate locations (as well as additional emergency data, as described above) from electronic devices such as smartphones and delivering the accurate locations to the appropriate PSAPs during emergency situations. Therefore, it is advantageous to provide the emergency response application 860 to PSAPs in the form of a webpage accessible through a standard web browser, in order to provide the potentially life-saving information stored within the clearinghouse to those capable of providing emergency assistance as quickly and easily as possible.

Figure 9A:
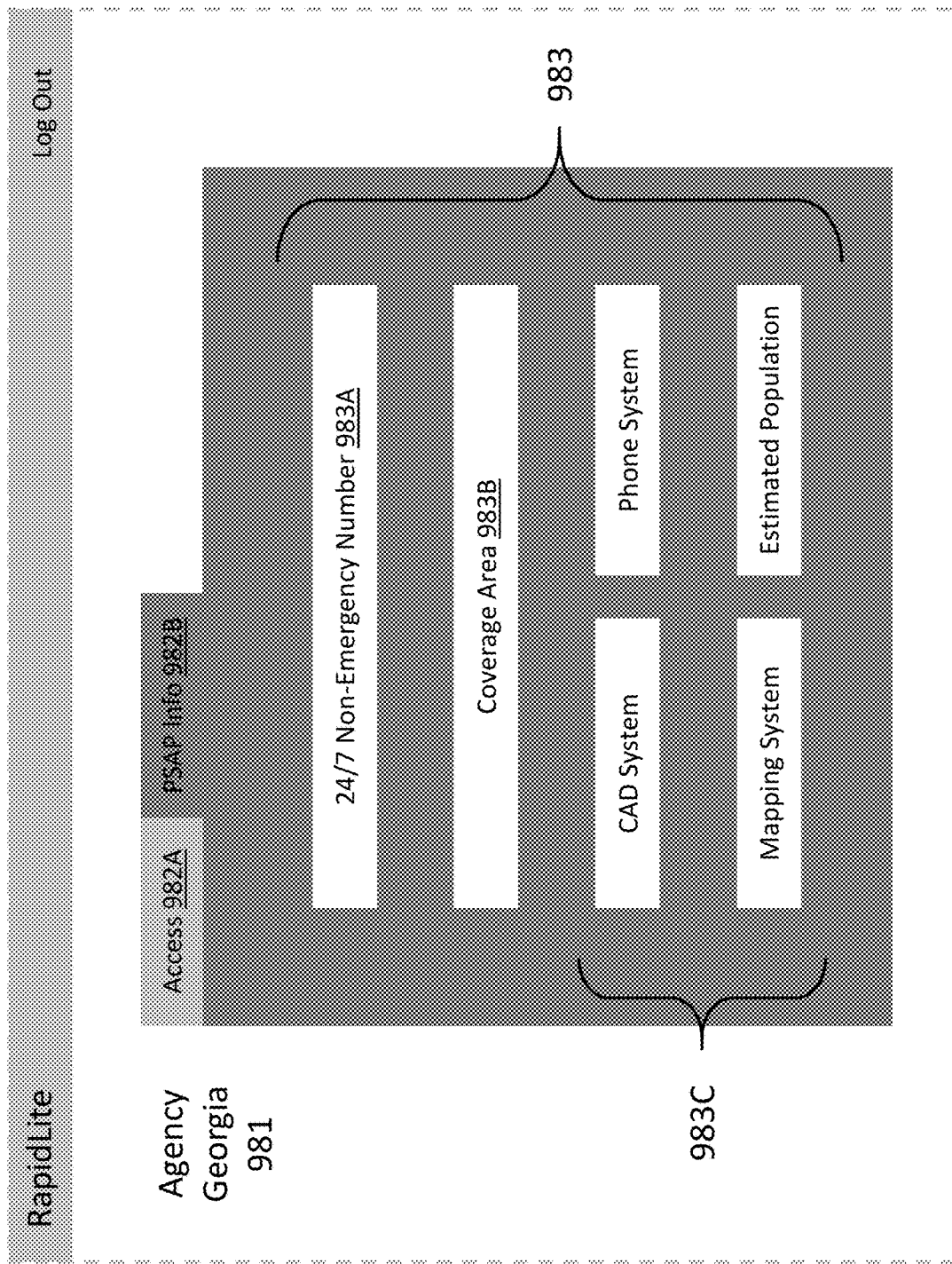
FIG. 9A and FIG. 9B illustrate non-limiting embodiments of a graphical user interface provided by an emergency response application.

In providing the emergency response application 860 to ESPs (and the potentially sensitive emergency data stored within the clearinghouse, by extension) in the most accessible way possible, it is advantageous to provide rigorous security precautions and functions specifically created and suited for the emergency response application 860, as will be described below. In some embodiments, if an ESP desires to access the emergency data stored within the clearinghouse, an administrator of the ESP (hereinafter, "ESP administrator" or "ESP admin") can navigate to the emergency response application 860 using a URL in a standard web browser. The ESP administrator can then use interactive elements of the GUI 880 to request access to the clearinghouse using the emergency response application 860. In some embodiments, upon selecting to request access to the emergency response application 860, the emergency response application 860 prompts the ESP administrator to submit information 983 about the ESP through the GUI 880, as depicted in FIG. 9A. In some embodiments, the information about the ESP includes the name of the ESP (hereinafter, "ESP name") 981, a non-emergency hardline telephone number of the ESP (hereinafter, "non-emergency number") 983A, the coverage area or jurisdiction of the ESP 983B (e.g., a geofence), and other information 983C. In some embodiments, other information 983C includes at least one of a type of computer aided dispatch (CAD) system used by the ESP (e.g., a PSAP), a type of phone system used by the ESP, a type of mapping system used by the ESP, and an estimated population covered by the ESP (i.e., an approximate number of people who reside within the jurisdiction of the ESP). In some embodiments, the ESP administrator can use interactive elements to define a geofence representing the jurisdiction of the PSAP 983B, as described above. In some embodiments, the ESP is not granted access to the emergency response application 860 if some or all of the information 983 is not submitted by the ESP administrator. In some embodiments, the ESP administrator edits or resubmits the information 983 about the ESP by selecting the ESP Information tab 982B. In some embodiments, after the ESP is granted access to the emergency response application 860 and/or the clearinghouse, the ESP administrator can create accounts for other employees or members of the ESP by selecting the Access tab 982A, as described below. In some embodiments, after a request for access to the emergency response application 860 is received by the emergency response application 860, an organization is created for the requesting PSAP within the credential management system 867 and an account node is created for the PSAP administrator within the credential management system 867 and linked with the organization, as described below.

In some embodiments, after the ESP administrator submits a request for access to the emergency response application 860 and/or the clearinghouse, the emergency response application 860 creates an account for the ESP administrator and stores the account for the ESP administrator in the user database 868. In some embodiments, the account created for the ESP administrator includes information about the ESP administrator such as, but not limited to, the name of the ESP administrator, an email address and/or telephone number of the ESP administrator, a system identifier (hereinafter "system ID") for the ESP administrator, and an identifier of the ESP (e.g., the name of the ESP 981). In some embodiments, the request for access to the emergency response application 860 submitted by the ESP administrator must be verified before the ESP administrator is given further access to the emergency response application 860. For example, in some embodiments, the request for access must be verified before the ESP administrator is granted the ability to perform functions such as creating accounts for other employees or members of the ESP or requesting emergency data through the emergency response application 860. In some embodiments, requests for access to the emergency response application are manually verified by public safety professionals, such as by communicating with local government agencies to determine that the information 983 about the ESP requesting access is true and correct. In some embodiments, requests for access to the emergency response application are automatically verified by the EMS or emergency response application 860 if all of the information 983 about the ESP requesting access correctly match previously received or confirmed information. In some embodiments, if some or all of the information 983 about the ESP requesting access is determined to be untrue or false, the request for access to the emergency response application 860 is denied. In some embodiments, if some or all of the information 983 about the ESP requesting access is determined to be untrue or false, the request for access is denied and the ESP is flagged for further investigation.

Figure 9B:
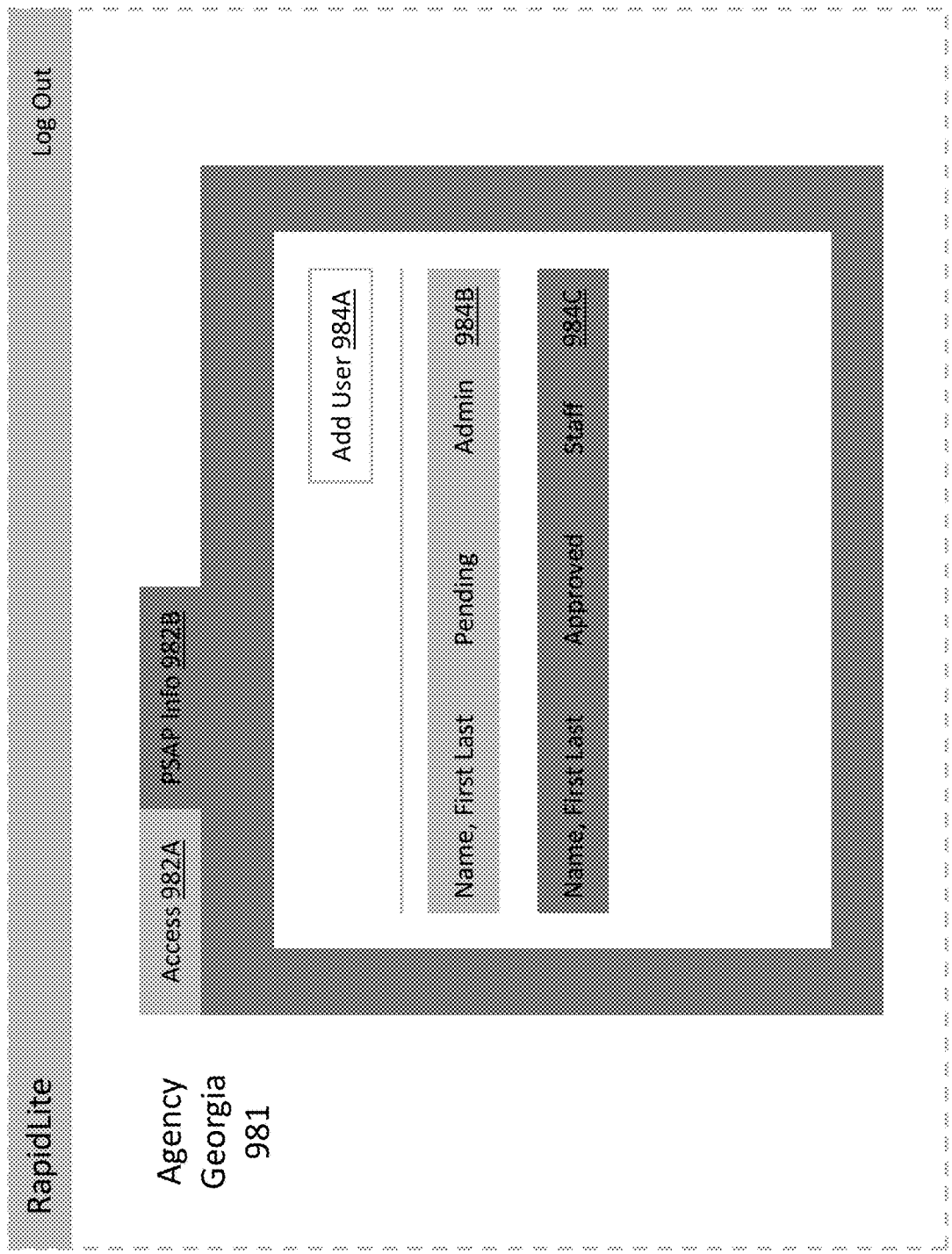

In some embodiments, after an account is created for the ESP administrator in the user database 868, the ESP administrator can create accounts for employees or other members of the ESP. In some embodiments, the emergency response application 860 will not allow an ESP administrator to create accounts for other members of the PSAP until a request for access to the emergency response application from the ESP administrator is verified. In some embodiments, to create an account for another member of an ESP, the ESP administrator can select the Access tab 982A. Selecting the Access tab 982A then prompts the emergency response application to display a list of accounts associated with the particular ESP. For example, FIG. 9B depicts a list of accounts associated with the "Georgia" PSAP, which includes a PSAP administrator account 984B and a PSAP staff account 984C. In this example, although the PSAP administrator account 984B is pending approval (e.g., by a public safety professional, as described above), the PSAP staff account 984C has already been approved. In some embodiments, the emergency response application 860 includes a predefined set of account types with different levels of access to functions within the emergency response application 860. For example, in some embodiments, accounts created within the emergency response application must either be administrator accounts or staff accounts. In some such embodiments, administrator accounts have full access to the functions of the emergency response application, including, but not limited to, editing information 983 about the ESP, creating new accounts, and requesting emergency data. In some embodiments, the staff account lacks the full access of the administrator and/or only has the ability to request emergency data. In some embodiments, ESP administrators define custom account types and designate which functions of the emergency response application 860 are accessible by the respective custom account types.

After selecting the Access tab 982A, an ESP administrator can create a new account for an ESP by selecting the Add User button 984A. In some embodiments, after selecting the Add User button 984A, the emergency response application 860 prompts the ESP administrator to select an account type 985A for the new account, as depicted in FIG. 9B. In some embodiments, as described above, the account types include administrator accounts and staff accounts. In some embodiments, the account types include a token, which can be used to automate the login process. In addition to the account type, the emergency response application 860 prompts the ESP administrator to submit an email address 985B for the user of the new account. Upon submission of the account type and email address, the emergency response application creates a new account within the user database 868 and populates the new account within the user database 868 with the account type and the email address. In some embodiments, an email including a confirmation link is sent to the email address, and the emergency response application 860 does not allow access to the new account until the confirmation link is selected. In some embodiments, the email additionally or alternatively includes a temporary password for the new account. In some embodiments, an ESP administrator creates an account for another member of the ESP before the request for access to the emergency response application 860 is approved. However, in some embodiments, neither the ESP administrator nor any account other created by the ESP administrator can access emergency data stored within the clearinghouse until after the request for access to the emergency response application 860 has been approved. In some embodiments, when a new account is created within the user database 868, a new account node is concurrently created for the new account within the credential management system 867, as described below. In some embodiments, access keys or credentials allow for differential access to different recipients, as described below.

Authentication, Credentials & Roles

To ensure the security, privacy and integrity of the data provided to the ESP, proper authentication may be required at various steps. The authorization process may require the ESP member or user of the emergency response application to verify their identity through the use of credentials such as log-in password, config file (e.g., a configuration created in a third-party system), etc. In some embodiments, the ESP member provides fingerprint, voice command, etc. to log-in, which can be verified.

Various types of credentials may be utilized as a part of the authentication process. Credentials may be generated, stored, verified and validated by the EMS. For example, the credentials may be generated, but must be verified (e.g. phone verification) before use. In some embodiments, the credentials are valid for a specific duration of time (e.g. 1 minute, 5 minutes, 1 hour, and 24 hours). Some non-limiting examples of credentials that can be used are access keys, admin credentials, time-limited tokens, etc. In some embodiments, credentials are transmitted through secure pathways (e.g. using encryption).

In some embodiments, credentials are used in a two-step authentication process. For example, the authentication may require: (i) a log-in and password for the ESP member to log-in the ESP system and (ii) a time-limited token to be generated based on an authentication request. In some embodiments, a role (as described above) may be combined with to create a three-step authentication process. For example, an administrator of the ESP could have designated roles for various ESP members and selected specific data categories to be made accessible for each role.

In contrast to system-generated credentials which must be created, stored and managed in specific ways, roles can be assigned by the admin to each member of the ESP. For example, roles can include admin, agent, call taker, supervisor, manager, etc. In contrast to credentials, roles do not need to be verified by system as they are usually admin-defined. In addition, the admin can update the role of an ESP member to accurately reflect changes in jobs, positions and responsibilities. In this way, the use of the roles allows the admin to customize the management portal to reflect the organizations under their supervision. In some embodiments, an ESP member can have multiple admin-defined roles.

In some embodiments, the authentication of the data request may be through the use of a credential, which is included in the data request (e.g. in the header of the request). When the emergency clearinghouse receives the request, the credential (e.g. a token) is verified to ensure that it is valid and has not expired. In some embodiments, the data request may also include an identifier for the admin-defined role for the ESP member.

In some embodiments, the ESP member or user is subscribed to the emergency data received within the ESP jurisdiction, as described above and below. In this way, the credential system ensures that emergency data that is relevant for the ESP member is accessible and updates are available quickly and efficiently.

Due to the diversity of ESP members (e.g. call dispatcher, PSAP manager, police, and paramedic) and the need for accurate and relevant data, there are specific challenges for emergency response. Although system-defined credentials may also be used to restrict access to emergency data, admin-defined roles were incorporated to allow the customization needed for different ESP members. In this way, the present system allows for both secure authentication and significant customizations for managing access to emergency data for various members of the organization.

Credential Management System & User Database

As previously discussed, it is advantageous to provide rigorous security precautions and functions specifically created and suited for the emergency response application 860 in such embodiments wherein the emergency response application 860 is accessible as a webpage through standard web browsers. In some embodiments, as mentioned above, the emergency response application 860 includes a user database 868 and is communicatively coupled to a credential management system 867. In such embodiments, the user database 868 and the credential management system 867 function cooperatively to secure the emergency response application 860 and the emergency data stored within the clearinghouse. Unlike the emergency response application, which can be accessed through public networks and servers, the credential management system 867 can be securely connected to the clearinghouse through private networks and servers. In this sense, the credential management system 867 can serve as a protective barrier between the emergency response application 860 and the clearinghouse, as described below.

In some embodiments, when an ESP administrator (e.g., a PSAP administrator) requests access to the emergency response application 860 on behalf of an ESP, an organization (also referred to as an "org") is created for the ESP within the credential management system 867. Concurrently, an organization identifier (also referred to as an "org ID") is created for the organization within the credential management system. When the request is granted, a long-lived credential (hereinafter, "credential") is created for the ESP within the credential management system 867. In some embodiments, the credential never expires. In some embodiments, the credential expires after an extended period of time, such as a year. In some embodiments, multiple credentials are created for a single organization. As an example, in the event that a credential is compromised, the credential is deactivated, and a new credential is created for the organization. Alternatively, multiple credentials are created for a single organization, and in some embodiments, the credential management system 867 periodically cycles through the credentials by activating one and deactivating the others to provide an additional layer of security.

In some embodiments, whenever an account is created within the emergency response application 860, the account is stored within the user database 868 and populated with information regarding the account, such as a name of the ESP member for which the account was created, an email address, and the name of the ESP. In some embodiments, a temporary password is created for and stored with the account in the user database 868. Concurrently with storing the account within the user database 868, an account node is created within the credential management system 867 and a system ID is generated for the account node. The emergency response application 860 then stores the system ID in the account stored within the user database 868. In this way, the system ID serves as a link between an account stored within the user database 868 and a correlated account node stored within the credential management system 867. The emergency response application 860 then requests information regarding an account node stored within the credential management system 867 using the system ID associated with the account node, as described below. In some embodiments, organizations, organization IDs, users, and system IDs, and credentials are stored within a credential management system database 869. In some embodiments, the credential management system 867 is a software module included in the EMS. In some embodiments, the credential management system 867 is a third-party service. As an example, an API management service, such as Apigee, may be used as a credential management system.

Login Flow

In some embodiments, once a request for access to the emergency response application 860 from an ESP administrator has been approved, the ESP administrator and any account created by the ESP administrator is able to log into the emergency response application 860 and request emergency data from the clearinghouse through the emergency response application 860. To log into the emergency response application 860, any account holder (i.e., registered user) can navigate to a login page within the GUI 880 of the emergency response application 860 and submit the email address and password associated with their account (e.g., "login information"). If the login information is correct, the emergency response application 860 can grant the account holder access to the emergency response application 860 and display the dashboard within the GUI 880, as depicted in FIG. 8B. In some embodiments, alternate information is used as login information. For example, in some embodiments, login information comprises a username, employee ID, or other suitable identifying information for an account holder.

In some embodiments, the emergency response application 860 or EMS maintains an authorized list (also referred to as a "whitelist") of internet protocol addresses (hereinafter, "IP addresses"). In such embodiments, only login attempts from IP addresses listed on the whitelist are granted access to the emergency response application 860. In some embodiments, when an ESP administrator requests access to the emergency response application 860 and the request is approved, as described above, the IP address from which the ESP administrator submitted the request is automatically added to the whitelist. In some embodiments, the whitelisted IP address from which the ESP administrator submitted the request is associated with the ESP administrator within the ESP administrator's account stored in the user database 868. In some embodiments, each additional account created by an ESP administrator (e.g., another ESP admin account or an ESP staff account) is associated by default with the whitelisted IP address from which the ESP administrator submitted the request to access the emergency response application 860 within the user database 868.

In some embodiments, when a user (e.g., an ESP admin or ESP staff member) attempts to log into the emergency response application 860 by submitting the email address and password for their account, the emergency response application 860 identifies the IP address of the computing device from which the user is attempting to login and cross-references the IP address with the whitelist of IP addresses. If the IP address is found on the whitelist of IP addresses, in addition to the email address and password being correct, the emergency response application 860 can grant the user access to the emergency response application 860. However, if the IP address is not found on the whitelist of IP addresses, the emergency response application 860 can deny the user access to the emergency response application 860. In some embodiments, in addition to denying the user access to the emergency response application 860, the emergency response application 860 can disable or deactivate the account with which the user attempted to login. In some embodiments, when a user attempts to log into the emergency response application 860 by submitting the email address and password for their account, the emergency response application 860 identifies the IP address of the computing device from which the user is attempting to login and cross-references the IP address with one or more IP addresses listed with the account. If the IP address is found within the one or more IP addresses listed with the account, in addition to the email address and password being correct, the emergency response application 860 can grant the user access to the emergency response application 860. However, if the IP address is not found within the one or more IP addresses listed with the account, the emergency response application 860 can deny the user access to the emergency response application 860 and/or disable or deactivate the account with which the user attempted to login.

Figure 10:
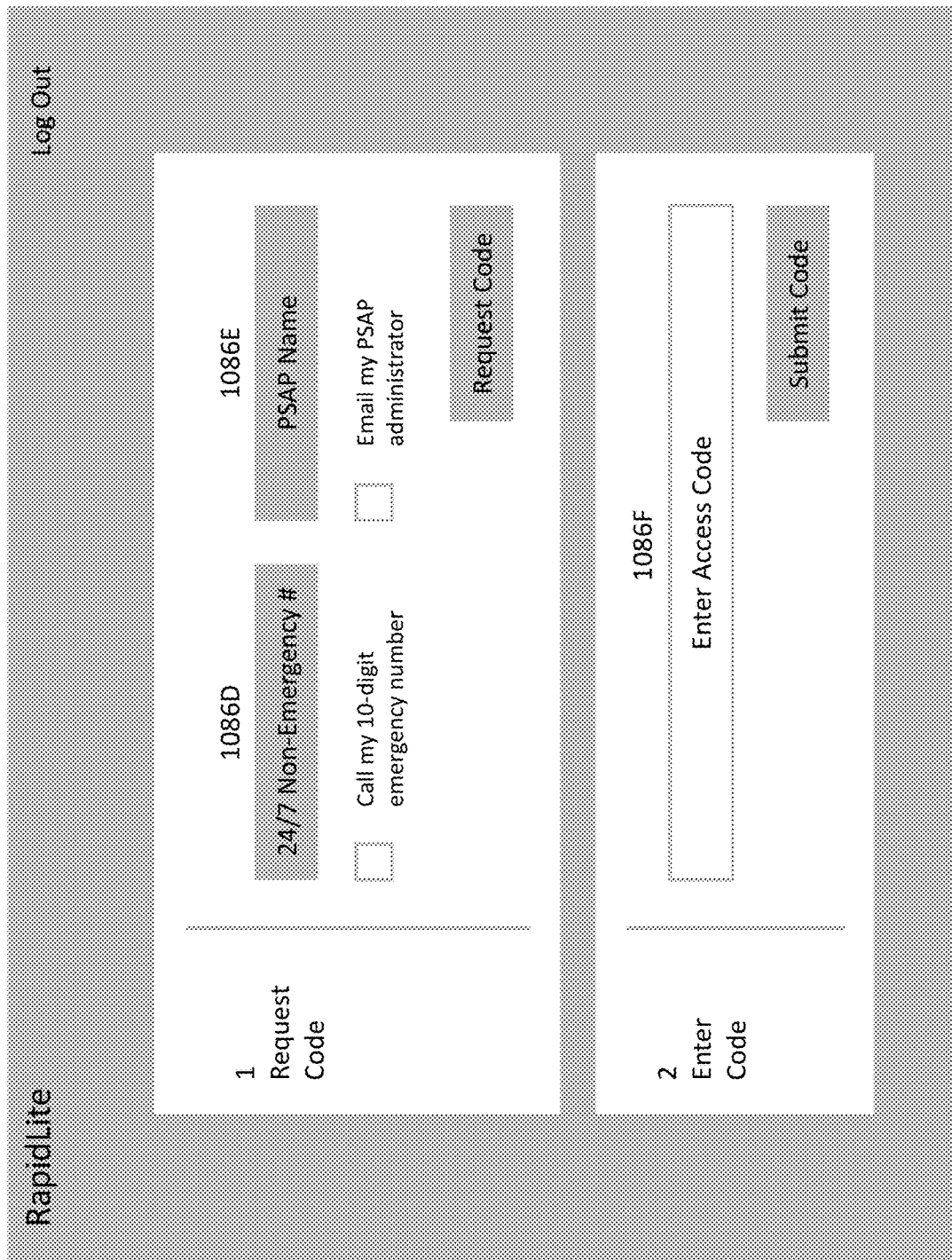
FIG. 10 illustrates a non-limiting embodiment of a graphical user interface provided by an emergency response application that shows options for requesting an access (or reactivation) code.

If an account is disabled or deactivated by the emergency response application 860 in response to receiving a login attempt from an unrecognized IP address (e.g., an IP address that is not found within the whitelist of IP addresses or an IP address that is not found within one or more IP addresses listed with the account), the account must be reactivated by the emergency response application 860 but the account can be used to access the emergency response application 860. In some embodiments, after disabling or deactivating an account, the emergency response application 860 presents options for requesting an access (or reactivation) code through the GUI 880, as depicted by FIG. 10. The access code can be used to reactivate the disabled account. For example, in some embodiments, the emergency response application presents an option to request an access code by receiving a phone call (e.g., an interactive voice response (IVR) call) to a non-emergency number associated with the ESP associated with the disabled account. In such an embodiment, the GUI 880 can present an entry field 1086D through which the non-emergency number can be submitted. After receiving a non-emergency number and confirming that the submitted non-emergency number is indeed associated with the proper ESP, the emergency response application 860 or EMS can deliver an IVR call to the non-emergency number of the associated ESP and playback an access code through the IVR call. This method ensures and confirms that whoever is attempting to log into the emergency response application from the unrecognized IP address is truly affiliated with the associated ESP, because to receive the access they must be physically present at the ESP or receive the access code from another person who is physically present at the ESP. In some embodiments, the IVR call is delivered using voice over internet protocol (VoIP). Once the access code is submitted to the emergency response application 860 (e.g., through the entry field 1086F), the emergency response application 860 can reactivate the disabled account. In some embodiments, after reactivating the disabled account, the emergency response application 860 can add the formerly unrecognized IP address to the whitelist of IP addresses. In some embodiments, after reactivating the disabled account, the emergency response application 860 can associate the formerly unrecognized IP address with the account within the user database 868.

In some embodiments, the emergency response application 860 can present an option to request an access code by delivering an email containing the access code to an ESP administrator associated with the disabled account. In such an embodiment, the GUI 880 can present an entry field 1086E through which an ESP name can be submitted. After receiving an ESP name through the entry field 1086E, the emergency response application 860 can identify an ESP administrator associated with the ESP name within the user database 868 and retrieve an email address of the ESP administrator from the ESP administrator's account. If the emergency response application 860 is unable to identify an ESP administrator associated with the ESP name within the user database 868, the emergency response application 860 can display an error message within the GUI 880. If the emergency response application 860 is able to identify to an ESP administrator associated with the ESP name within the user database 868, the emergency response application 860 can then deliver an email containing an access code to the ESP administrator's email address. This method similarly ensures and confirms that whoever is attempting to log into the emergency response application from the unrecognized IP address is truly affiliated with the associated ESP, because they must receive the access code from the ESP administrator, who has been previously verified. As described above, the access code can then be used to reactivate the disabled account. In some embodiments, the email sent to the email address of the ESP administrator additionally or alternatively includes a confirmation link that is selectable by the recipient of the email (i.e., the ESP administrator) to automatically reactivate the disabled account. Once the account has been reactivated, the emergency response application 860 can grant the account holder access to the emergency response application 860 and display the dashboard within the GUI 880, as depicted in FIG. 8B, and the user can use the emergency response application 860 to request emergency data from the clearinghouse, as described below with respect to FIG. 11A.

Emergency Data Retrieval

In some embodiments, a user logs into the emergency response application 860 and uses the emergency response application 860 to access emergency from the clearinghouse. In some embodiments, a user must log into the emergency response application 860 using an authorized and/or active account, as described above, to access the emergency response application 860. In some embodiments, when a user successfully logs into the emergency response application 860, such as by navigating to the emergency response application 860 within a web browser and submitting their login information through the GUI 880, the emergency response application 860 retrieves the system ID associated with the user's account and sends an account information request including the system ID to the credential management system 867. In response to receiving the account information request from the emergency response application 860, the credential management system 867 can identify an account node correlated with the account and return information regarding the account node to the emergency response application 860. In some embodiments, the information regarding the account node includes the org ID associated with the organization to which the account node is linked. An example of a node is shown below.

```
{
  "apps": [
    "lucas-rad-test",
    "CCInform-Sandbox"
  ],
```

-continued

```
  "companies": [
    "neoteric",
    "test-company",
    "curbcall",
    "uber"
  ],
  "email": "leagerleavitt@rapidsos.com",
  "developerId": "fc4fa636-a321-4e7b-a497-b3922df753a8",
  "firstName": "Lucas",
  "lastName": "Eager Leavitt",
  "userName": "leagerleavitt",
  "organizationName": "rapidsos",
  "status": "active",
  "attributes": [ ],
  "createdAt": 1475683130277,
  "createdBy": "vkoo@rapidsos.com",
  "lastModifiedAt": 1511305645398,
  "lastModifiedBy": "apigee-drupal+rapidsos_jevp@google.com"
```

In some embodiments, after receiving the information regarding the account node from the credential management system 867, the emergency response application 860 then sends a temporary access token request including the org ID to the credential management system 867. In response to receiving the temporary access token request, the credential management system 867 can identify a credential associated with the organization to which the org ID refers and generate a temporary access token based on the credential. In some embodiments, after receiving the information regarding the account node from the credential management system 867, the emergency response application 860 sends a credential request including the org ID to the credential management system 867. In response to receiving the credential request, the credential management system 867 can identify a credential associated with the organization to which the org ID refers and return the credential to the emergency response application 860. In this embodiment, the emergency response application 860 can then send a temporary access token request including the credential to the credential management system 867, which can in turn generate the temporary access token based on the credential and return the temporary access token to the emergency response application 860. In some embodiments, the emergency response application 860 sends the temporary access token request to the credential management system 867 only after the user navigates to the dashboard.

In some embodiments, the credential management system 867 generates the temporary access token by deriving the temporary access token from the credential. In some embodiments, the temporary access token expires after a predetermined duration of time, such as 24 or 48 hours. In some embodiments, the temporary access token expires when the user logs out of the emergency response application 860. In some embodiments, the temporary access token is a short-lived access token created under the OAuth 2.0 authorization protocol. After generating the temporary access token, the credential management system 867 can then return the temporary access token to the emergency response application 860. In some embodiments, the temporary access token is generated automatically upon the successful login of a user without requiring input from the user. In some embodiments, the user must manually request that the temporary access token be generated, such as by selecting a generate access token button after the successful login of the user. However, a temporary access token may be generated in any other way.

Figure 11A:
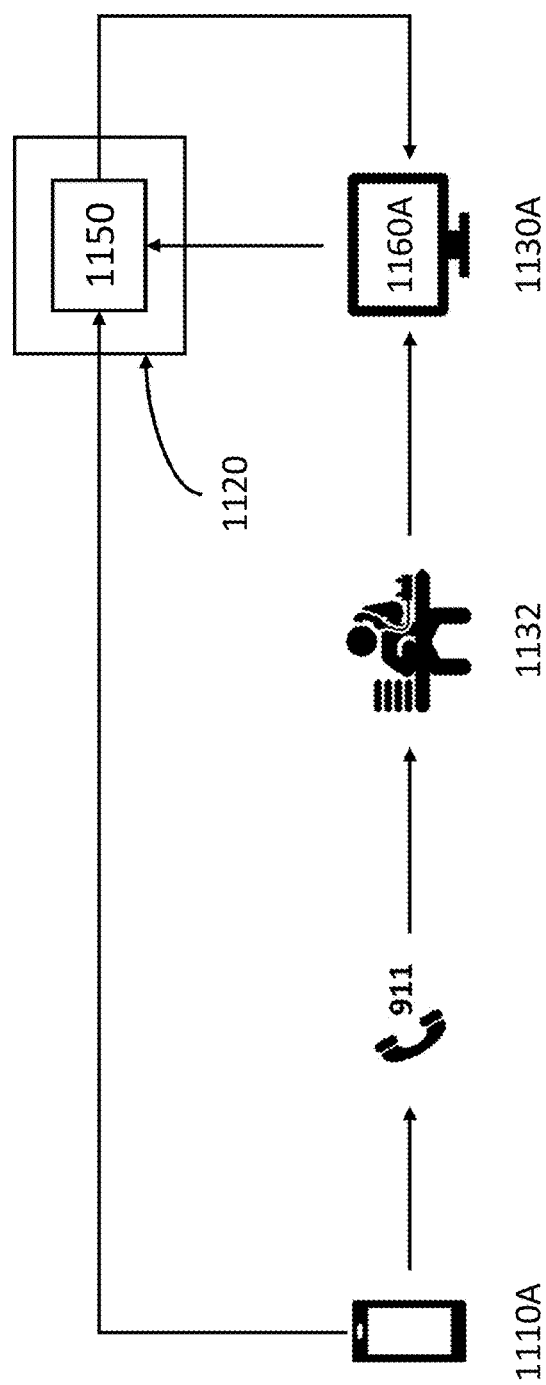
FIG. 11A depicts an example of a flow diagram of an emergency data retrieval process.
Figure 12:
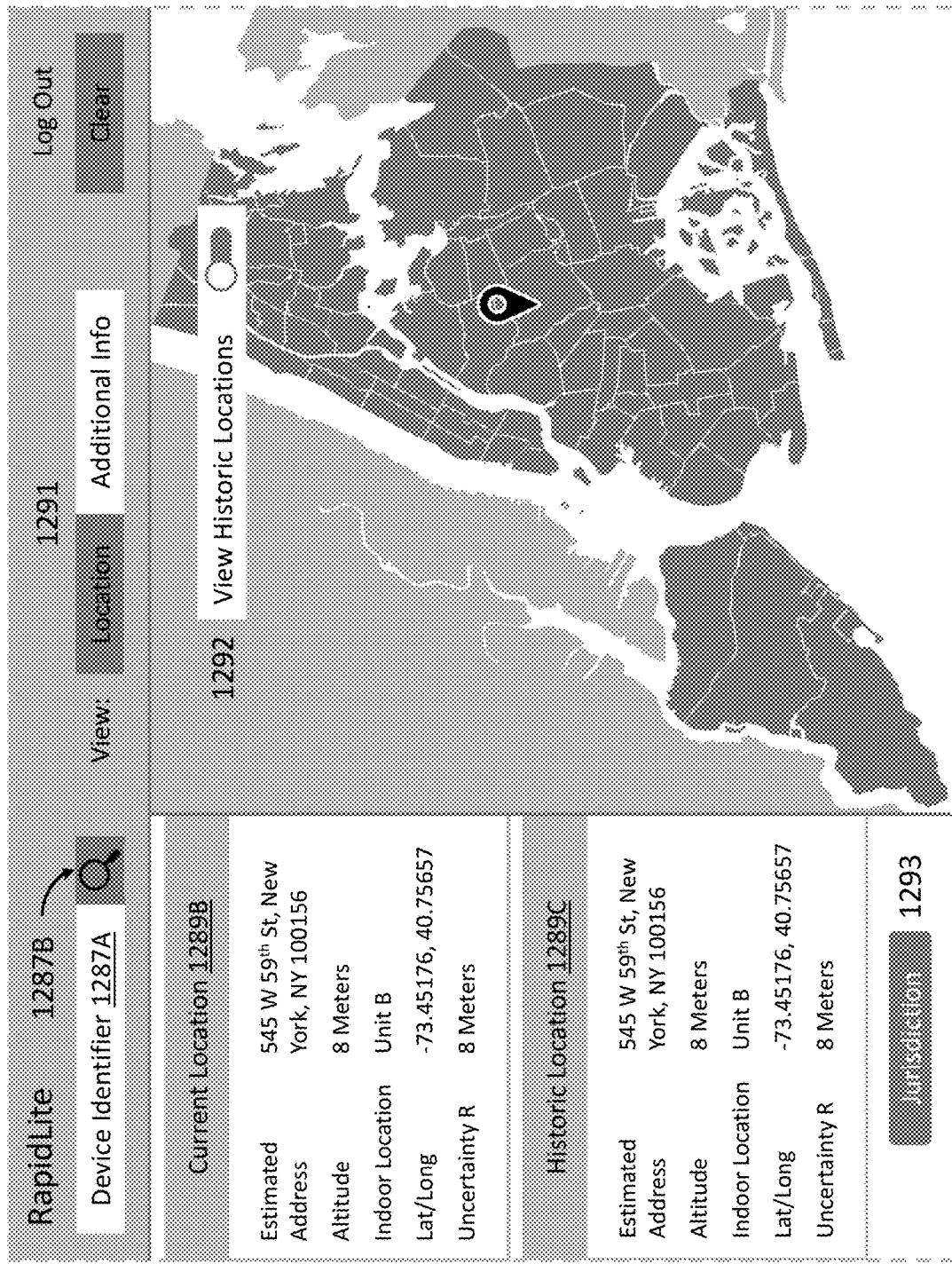
FIG. 12 depicts a dashboard provided by the emergency response application.

In some embodiments, after a user (e.g., a PSAP administrator or PSAP staff member) successfully logs into the emergency response application 860 and a temporary access token is generated for the user, the user can use the emergency response application to generate and send emergency data requests to the clearinghouse. FIG. 11A depicts an example of a flow diagram of an emergency data retrieval process. In some embodiments, a call-taker 1132 (e.g., a PSAP staff member) at a PSAP successfully logs into the emergency response application by navigating to the emergency response application 1160A at an ESP console 1130A and submitting their login information through the GUI 880. When an emergency call is made from an electronic device 1110A to the PSAP, the call-taker 1132 answers the emergency call and begins to respond to the emergency. In some embodiments, the call-taker 1132 can then prompt the emergency response application 1160A to generate a request for emergency data by submitting an identifier of the electronic device 1110A (i.e., a device identifier), such as the phone number of the electronic device 1110A through the emergency response application 1160A. For example, in some embodiments, the call-taker 1132 can submit the device identifier by copying and pasting the device identifier or typing the device identifier into an entry field 1287A and selecting a search button 1287B, as depicted by FIG. 12. In some embodiments, the emergency response application 1160A automatically retrieves the device identifier from a call-handling application installed at the PSAP, and the call-taker 1132 can prompt the emergency response application 1160A to generate an emergency data request by selecting an emergency data request button, such as the search button 1287B. In some embodiments, the emergency response application 1160A can automatically retrieve the device identifier from a call-handing application installed at the PSAP and automatically generate an emergency data request without requiring input from the call-taker. In some embodiments, the device identifier is communicated from the call-handling application to the emergency response application through a websocket. In some embodiments, the websocket is coupled to the emergency response application. In some embodiments, the emergency response application is integrated into the call-handling application installed at the PSAP, and automatically provides location data and additional data to the call-handling application installed at the PSAP.

In some embodiments, the emergency data request generated by the emergency response application 1160A includes the device identifier and/or the temporary access token. In some embodiments, after the emergency response application 1160A generates an emergency data request, the emergency data request is sent to the credential management system 867. After receiving the emergency data request, the credential management system 867 can then identify the appropriate organization using the temporary access token and insert the correlated org ID into the emergency data request. The credential management system 867 can then transmit the emergency data request, now including the device identifier, the temporary access token, and the org ID to the clearinghouse 1150. In such embodiments, although the emergency response application 1160A can communicate with the credential management system 867 over a public network to send emergency data requests, the org ID is not sent over a public network because the org ID is only sent from the credential management system 867 to the clearinghouse 1150, and the credential management system 867 communicates with the clearinghouse 850 over an encrypted or private network. This method provides critical security provisions to the publicly available emergency response application 1160A. In order to access emergency data stored within the clearinghouse 1150, a requesting party must provide both a valid and matching org ID and temporary access token. The interplay between the emergency response application 1160A and the credential management system 867 described above limits the possibility of an unauthorized party acquiring both a valid and matching org ID and temporary access token.

In some embodiments, the emergency data request is an HTTP GET request, as described above. In some embodiments, the emergency data request includes an address of an EMS server and the device identifier in the URL of the emergency data request in the form of https://[EMS_Server]?[Alert_ID] (e.g., https://api.rapidsos.com?caller_id={0}, wherein [EMS_Server] (EMS_Server)=api.rapidsos.com and [Alert_ID] (device identifier)=caller_id={0}). In some embodiments, the device identifier is an 11-digit phone number (also referred to as a CPN) (e.g., caller_id=72743767911, wherein 72743767911 is the 11-digit phone number). In some embodiments, the emergency data request is an HTTP request that includes the following parameters or information in the headers or metadata of the request:

Authorization—temporary access token; and

X-RapidSOS-Role—the account type assigned to the requesting account.

In some embodiments, after receiving the emergency data request from the emergency response application, the EMS or clearinghouse verifies the temporary access token and account type included in the emergency data request. In some embodiments, as described herein, the clearinghouse 1150 receives the emergency data request at the set of retrieval modules. In some embodiments, after receiving the emergency data request, the set of retrieval modules retrieve emergency data associated with the device identifier included in the emergency data request from one or more clearinghouse databases, as described above. In some embodiments, after retrieving the emergency data associated with the device identifier, the clearinghouse 1150 returns the emergency data associated with the device identifier to the emergency response application 1160A, which can in turn display the emergency data associated with the device identifier through the GUI provided by the emergency response application 1160A. In some embodiments, the emergency data associated with the device identifier includes one or more locations (e.g., enhanced locations). In some embodiments, the emergency data associated with the device identifier includes a current location. In some embodiments, the current location is received by the clearinghouse 1150 by the electronic device 1110A to which the device identifier refers. In some embodiments, the current location is received by the clearinghouse 1150 from a second electronic device associated with the electronic device 1150. In some embodiments, the current location is received from a second electronic device communicatively coupled to the electronic device 1110A. In some embodiments, the emergency data associated with the device identifier includes one or more historical locations. In some embodiments, before returning emergency data associated with a device identifier to the emergency response application, the clearinghouse or EMS determines if a current location included in the emergency data is within one or more geofences associated with the PSAP (and/or at least one adjacent PSAP or other ESP) of the requesting user, as described below. In some embodiments, the clearinghouse only returns the emergency data associated with the device identifier if the current location included in the emergency data is determined to be within the geofence associated with the PSAP of the requesting user. In some embodiments, a geofence is associated with the PSAP if it defines a location or area that falls within the jurisdiction of the PSAP.

FIG. 12 depicts an embodiment of a graphical user interface provided by the emergency response application. In some embodiments, FIG. 12 depicts a dashboard provided by the emergency response application. The dashboard is a page within the GUI that provides interactive elements that allow a user to generate an emergency data request using the emergency response application. For example, in some embodiments, the dashboard includes an entry field 1287A through which a user can submit a device identifier, such as by typing or pasting the device identifier into the entry field 1287A. In some embodiments, after submitting a device identifier through the entry field 1287A, the user can prompt the emergency response application to generate and send an emergency data request by selecting a search button 1287B. In some embodiments, in response to a user submitting a device identifier into the entry field 1287A and selecting the search button 1287B, the emergency response application generates an emergency data request including the device identifier and a temporary access token to the clearinghouse, as described above. In some embodiments, in response to a user submitting a device identifier into the entry field 1287A and selecting the search button 1287B, the emergency response application generates an emergency data request including the device identifier and a temporary access token to the credential management system, which in turn injects an org ID into the emergency data request and sends the emergency data request including the device identifier, the temporary access token, and the org ID to the clearinghouse, as described above.

In some embodiments, after receiving an emergency data request including a device identifier, the clearinghouse retrieves or gathers emergency data associated with the device identifier from one or more clearinghouse databases, as described above. In some embodiments, the emergency data associated with the device identifier includes one or more locations. In some embodiments, the emergency data associated with the device identifier includes a current location. In some embodiments, the emergency data associated with the device identifier includes one or more historical locations. In some embodiments, after retrieving or gathering the emergency data, the clearinghouse returns the emergency data to the emergency response application. The emergency response application can then display the emergency data within GUI. In some embodiments, the emergency response application displays the emergency data within the dashboard, as depicted in FIG. 12. For example, in some embodiments, the emergency response application displays a graphical indicator of a current location 1289A returned from the clearinghouse within a map 1288 provided by the GUI. In some embodiments, the emergency response application displays a textual description of a current location 1289B within the GUI. In some embodiments, the emergency response application displays textual descriptions of one or more historical locations within the GUI 1289C. In some embodiments, the textual description of a current or historical location includes a time and date, an estimated address, altitude, latitude and longitude, and an uncertainty radius. In some embodiments, the textual description of a current or historical location includes an indoor location. In some embodiments, the textual description of a current or historical location additionally includes an amount of time elapsed since the current or historical location was received. In some embodiments, the textual description of a current or historical location additionally includes an amount of time elapsed since the current or historical location was generated.

Jurisdictional Awareness View

Figure 13A:
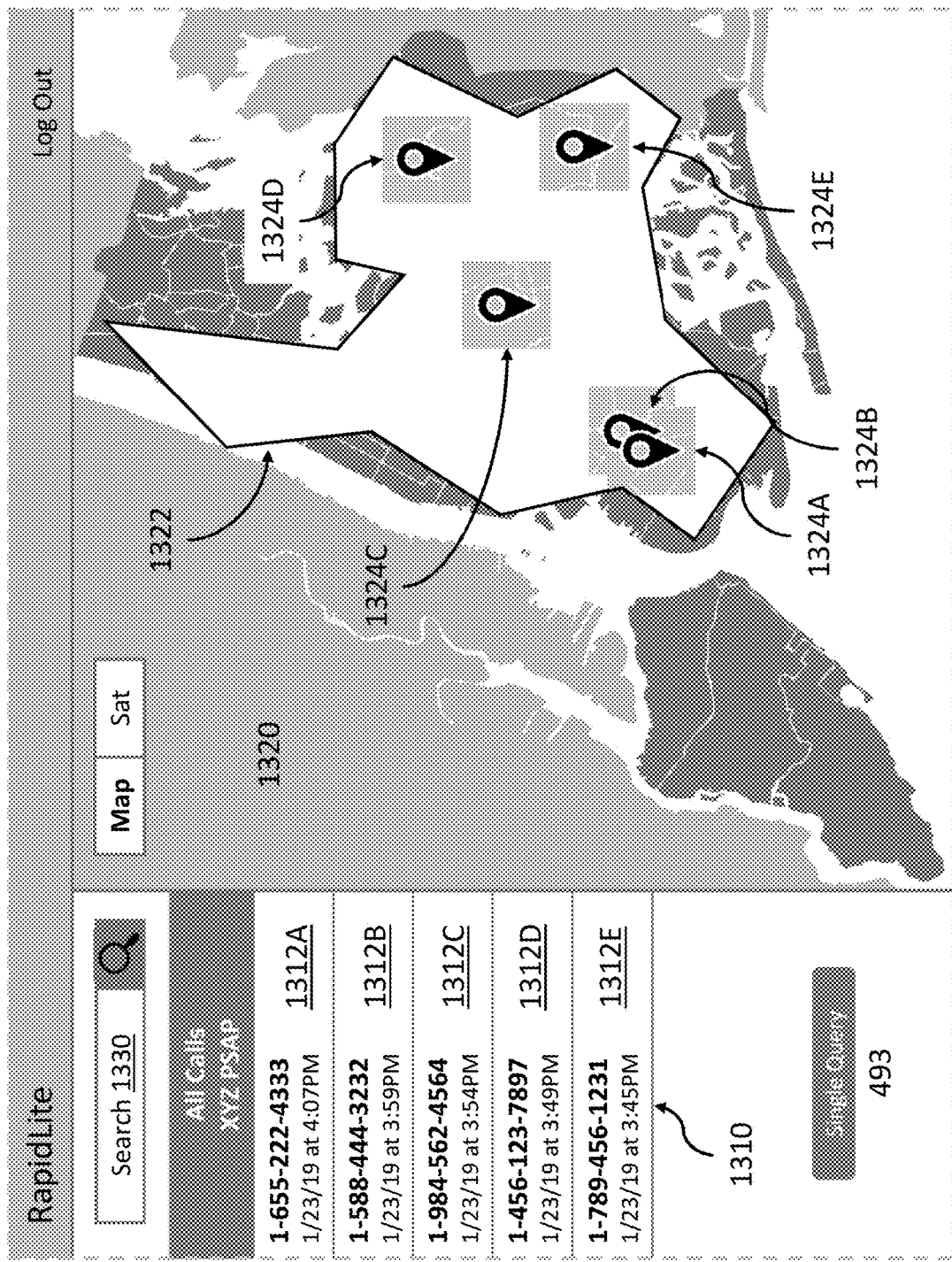
FIG. 13A and FIG. 13B illustrate a non-limiting embodiment of a jurisdictional awareness view displayed within the emergency response application.

In some embodiments, the systems, applications, servers, devices, methods, and media of the instant application provide a jurisdictional awareness view (also termed emergency management view) within the emergency response application. In some embodiments, the jurisdictional awareness view enables an ESP to view one or more ongoing or recently received emergency alerts (e.g., emergency calls) within one or more geofenced jurisdictions. FIG. 13A illustrates the jurisdictional awareness view displayed within the emergency response application. In some embodiments, the jurisdictional awareness view includes an incident queue (e.g., incident queue 1310) that displays one or more incidents associated with one or more device identifiers (e.g. phone numbers, IP addresses). In some embodiments, the jurisdictional awareness view additionally or alternatively includes an interactive map that displays one or more incident locations associated with the one or more incidents associated with the one or more device identifiers, as described below.

Figure 11B:
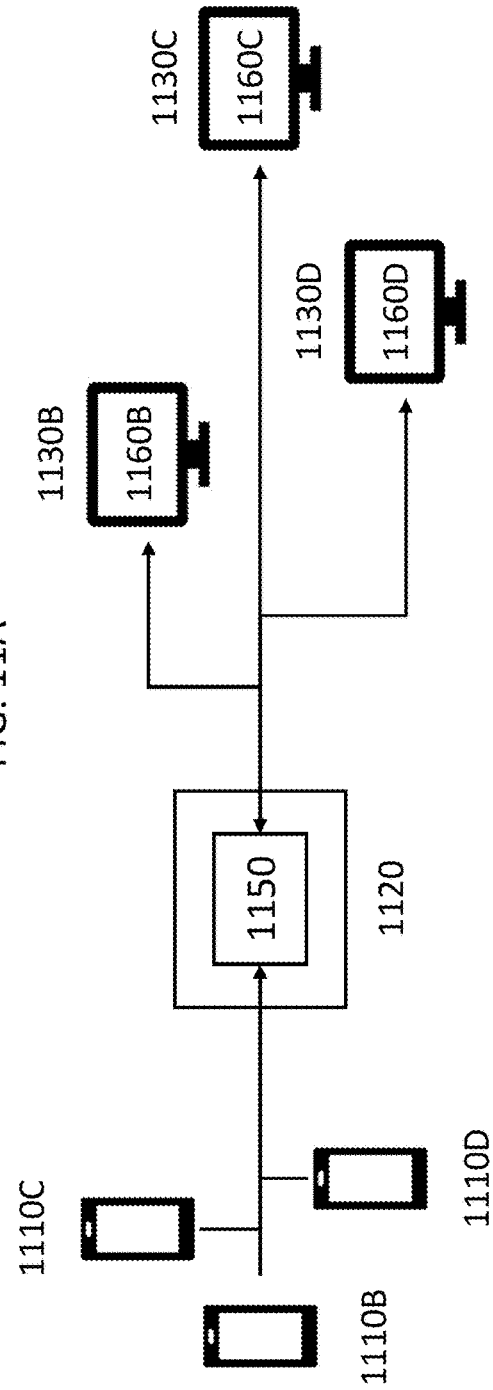
FIG. 11B depicts a non-limiting flow diagram of a process for pushing emergency data from the Emergency Clearinghouse to one or more ESPs.

As described above, in some embodiments, the emergency management system 1120 (EMS) can push emergency data from the Emergency Clearinghouse to emergency service providers (ESPs) using an emergency data subscription system (hereinafter, "subscription system"). FIG. 11B depicts a flow diagram of a process for pushing emergency data from the Emergency Clearinghouse to one or more ESPs. In some embodiments, a member of an ESP (e.g., a PSAP staff member) logs into the emergency response application 1160B at an ESP console 1130B (e.g., a computing device associated with the ESP) by accessing the emergency response application 1160B (e.g., by navigating to the emergency response application 1160B through a web browser) and submitting their login information through the GUI of the emergency response application 1160B. In some embodiments, when the ESP member logs into the emergency response application 1160B by submitting their login information, the emergency response application 1160B or EMS 1120 then determines an ESP account ID associated with the ESP member's account and establishes a longstanding communication link (e.g., a websocket connection) with the ESP console 1130B, automatically subscribing the ESP console to the ESP account ID for the duration of their login session. Then, as described above, when the EMS 1120 receives an emergency alert including a location (e.g., when an emergency call is made from an electronic device 1110B and sends an emergency alert to the EMS 1120 including a location generated by the electronic device 1110B), the EMS 1120 retrieves a geofence associated with every ESP registered with the EMS 1120 and determines if the location falls within any of the geofences. In response to determining that the location falls within a geofence associated with the ESP associated with the ESP account ID, the EMS 1120 then associates the location with the ESP account ID, determines if there are any active longstanding communication links between the EMS 1120 and any computing devices subscribed to the ESP account ID. In this instance, because the ESP console 1130B is subscribed to the ESP account ID and actively linked to the EMS 1120 through the longstanding communication link, the EMS 1120 automatically pushes (e.g., from the clearinghouse 1150) the emergency alert or emergency data associated with the emergency alert to the ESP console 1130B for display within the emergency response application 1160B. In some embodiments, emergency alerts or emergency data associated with emergency alerts that have been pushed to an ESP are displayed within the jurisdictional awareness view.

For example, ESP console 1130B and ESP console 1130C are two different ESP consoles associated with the same ESP (e.g., two computing devices at the same public safety answering point (PSAP)), PSAP A. ESP console 1130D is associated with a second ESP, PSAP B. One day, PSAP call-takers access and successfully log into the emergency response application 1160 (emergency response application 1160B-1160D) at each of the three ESP consoles (ESP console 1130B-1130D), thereby establishing three separate longstanding communication links, one longstanding communication link between the EMS 1120 and each of the three ESP consoles. The ESP consoles are automatically subscribed by the EMS 1120 to the ESP account IDs associated with their respective ESPs (ESP ID A for PSAP A and ESP ID B for PSAP B). Both PSAP A and PSAP B are associated with only one geofence, geofence A and geofence B, respectively. Geofences A and B do not overlap. The geofences have previously been tagged within the EMS 1120 with their respective ESP account IDs (e.g., during the registration process for the emergency response application, as described above).

Later that day, an emergency call is made from communication device 1110B, which causes communication device 1110B to generate a first emergency alert including a first location of the communication device 1110B and transmit the first emergency alert to the EMS 1120. When the EMS 1120 receives the first emergency alert, the EMS 1120 retrieves some or all of the geofences stored within the EMS 1120 and determines if the first location falls within any of the geofences stored within the EMS 1120. In this example, the EMS 1120 determines that the first location falls within geofence A, associated with PSAP A. In response, the EMS 1120 tags the first location with the ESP account ID associated with geofence A, ESP ID A. The EMS 1120 then determines if there are any active longstanding communication links between the EMS and any ESP consoles subscribed to ESP ID A and automatically pushes (e.g., from the clearinghouse 1150) the first emergency alert to those ESP consoles. In this example, both ESP console 1130B and ESP console 1130C are subscribed to ESP ID A, so the EMS 1120 automatically pushes the first emergency alert to both ESP console 1130B and ESP console 1130C for display within emergency response application 1160B and 1160C, respectively, such as through a jurisdictional awareness view (as described below). The first location does not fall within geofence B, because geofence A and geofence B do not overlap, so the first emergency alert is not pushed to ESP console 1130D, even though an active longstanding communication link has been established between the EMS 1120 and ESP console 1130D.

Three minutes later, an emergency call is made from communication device 1110C, which causes communication device 1110C to generate a second emergency alert including a second location of the communication device 1110C and transmit the second emergency alert to the EMS 1120. When the EMS 1120 receives the second emergency alert, the EMS again retrieves some or all of the geofences stored within the EMS 1120 and determines if the second location falls within any of the geofences stored within the EMS 1120. In this example, the EMS 1120 determines that the second location falls within geofence B, associated with PSAP B. In response, the EMS 1120 tags the second location within the ESP account associated with geofence B, ESP ID B and automatically pushes the second emergency alert to ESP console 1130D for display within emergency response application 1160D, because ESP console 1130D has an active longstanding communication link established with the EMS 1120 and ESP console 1130D is subscribed to ESP ID B. The EMS 1120 does not push the second emergency alert to ESP console 1130B or ESP console 1130C. Although ESP console 1130B and ESP console 1130C have active longstanding communication links established with the EMS 1120, they are not subscribed to ESP ID B, and geofence A and geofence B do not overlap, meaning the second location does not fall within geofence A. Two minutes after that, an emergency call is made from communication device 1110C, which then generates a third emergency alert including a third location of the communication device 1110C and transmits the third emergency alert to the EMS 1120. The EMS 1120 determines that the third locations falls within geofence A (like the first location included in the first emergency alert) and thus automatically pushes the third emergency alert to both ESP console 1130B and ESP console 1130C for display within emergency response application 1160B and 1160C. In some embodiments, emergency response application 1160B and emergency response application 1160C display the first emergency alert and the third emergency alert simultaneously, such as through a jurisdictional awareness view, as described below.

Unlike in the process depicted by FIG. 11A, the EMS, using the subscription model, does not require receiving an emergency data request to determine an appropriate ESP to receive an emergency alert or emergency data associated with the emergency alert. As a result, the EMS can use the jurisdictional awareness view within the emergency response application to display emergency alerts and emergency data associated with emergency alerts to appropriate ESPs as the emergency alerts are received by the EMS in real-time. Using the subscription system to automatically push emergency data from the clearinghouse to ESPs provides numerous advantages. The system allows members of an ESP to see and be aware of all emergencies in their jurisdiction whether or not they are handling or responding to a particular emergency and whether or not an emergency call actually gets connected to the ESP. Additionally, even if a member of the ESP is not immediately able to respond to an emergency alert, they are still able to see where the emergency is and when the emergency alert was received. As depicted by FIG. 13A, in some embodiments, the jurisdictional awareness view includes an incident queue 1310 (also referred to as a "list of incidents") and an interactive map 1320. In some embodiments, when an emergency alert or emergency data associated with the emergency alert is pushed to the emergency response application, an incident 1312 is created for the emergency alert and displayed within the incident queue 1310. In some embodiments, as depicted by FIG. 13A, an incident 1312 created for an emergency alert is displayed with a device identifier associated with the emergency alert. For example, FIG. 13A depicts five incidents 1312 associated with five different emergency alerts, 1312A-1312E. Incident 1312A is displayed with the device identifier "1-655-222-4333" representing the electronic device that generated the emergency alert that incident 1312A was created for. It is contemplated that incidents within the incident queue 1310 may be displayed or ordered in any manner for clarity and efficiency. In some embodiments, the incident queue 1310 is ordered sequentially based on the time that the emergency alerts are received by the emergency response application. In some embodiments, the incident queue 1310 is prioritized based on type of emergency, severity of the emergency or other appropriate factors. In some embodiments, the ESP user is required to respond to emergency alerts in the alert queue sequentially. In some embodiments, the ESP user may select or respond to any emergency alert in the queue in any order.

In some embodiments, the incident queue 1310 includes a search box 1330 that allows the user to quickly find device incidents within the incident queue 1310 by their associated device identifiers. In some embodiments, the search box 1330 allows for searching in a current incident queue. In some embodiments, the search box 1330 allows for searching through historical incidents. In some embodiments, the search box 1330 allows for searching in a current incident queue and historical incidents. In some embodiments, a historical incident is an incident terminated or resolved anytime in the previous 5 mins, 30 mins, 60 mins, 3 hours, 6 hours, 12 hours, or 24 hours. In some embodiments, a historical incident is an incident terminated or resolved at a previous time. In this respect, a user is able to review the history of a device identifier with respect to previously emergency alerts (e.g., emergency calls). For example, a search for the device identifier "1-655-222-4333" may return incident 1312A, a current incident that is currently displayed within the incident queue 1310, as well as one or more historical incidents associated with previous emergency alerts associated with the device identifier.

As mentioned above, in some embodiments, the jurisdictional awareness view includes an interactive map 1320. In some embodiments, the jurisdictional awareness view displays one or more geofences 1322 associated with the ESP for which the emergency response application has been accessed. In some embodiments, the jurisdictional awareness view displays one or more incident locations 1324 (e.g., a location marker) for each incident 1312 listed in the incident queue 1310 within the interactive map 1320. For example, FIG. 13A depicts five incident locations 1324 within the interactive map 1320, incident locations 1324A-1324E, one for each of the five incidents 1312 listed in the incident queue 1310, incidents 1312A-1312E, respectively. In some embodiments, the jurisdictional awareness view displays at least one incident location 1324 for each incident 1312 listed in the incident queue 1310. In some embodiments, the jurisdictional awareness view displays only one incident location 1324 for each incident 1312 listed in the incident queue 1310. In some embodiments, each incident location 1324 is customizable by the user. In some embodiments, the shape and/or color of each incident location 1324 is customizable. In some embodiments, the shape and color of the incident location 1324 is denoted in the incident queue 1310. In some embodiments, the user is enabled to annotate text next to or within a text box associated with a particular incident location 1324. In some embodiments, the user is enabled to annotate text next to or below each device identifier within the incident queue 1310. For example, a user may customize three incident locations 1324 currently displayed within the interactive map 1329 by changing the incident locations 1324 to a "yellow star", and the associated incidents 1312 in the incident queue 1310 are automatically denoted with a "yellow star" adjacent to their respective device identifiers.

Figure 13B:
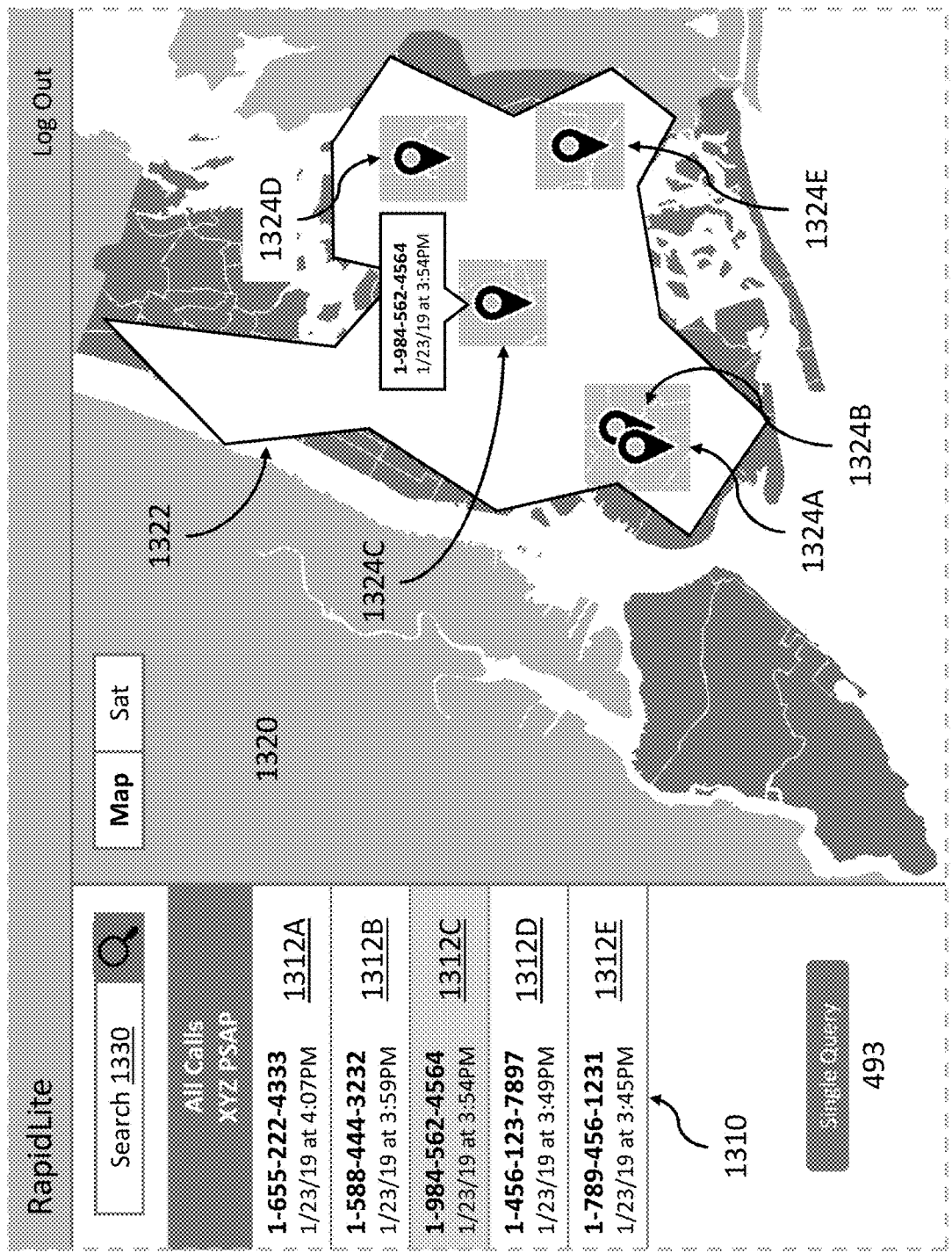

In some embodiments, each incident location 1324 is automatically updated or changed. In some embodiments, the incident location 1324 is updated or changed to reflect response status of secondary response agencies, such as the fire department or police department. In some embodiments, the incident location 1324 is updated or changed to reflect response status at a PSAP. For example, the incident location 1324 may be flashing to indicate that no user at the PSAP has attended to the associated incident 1312. In another example, the incident location 1324 may automatically change color to indicate that a first responder has been dispatched to the associated emergency location. In another example, an incident location 1324 may automatically change to reflect that an emergency is no longer active, or the caller has exited the jurisdictional geofence of the PSAP. In some embodiments, the user is enabled to toggle on and off incident location customization preferences. In some embodiments, the user is enabled to display device identifier data (e.g. phone numbers) adjacent to an incident location 1324. For example, as depicted in FIG. 13B, an additional data overlay associated with incident 1312C (e.g., the associated device identifier and the time and date that the associated emergency alert was received) is displayed directly above the incident location 1324C associated with incident 1312C. In some embodiments, data associated with an incident is displayed within the interactive map 1320 in response to the incident 1312 or associated incident location 1324 being selected within the incident queue 1310 or interactive map 1320. In some embodiments, a user can select an incident 1312 or an incident location 1324 by clicking on or hovering over the incident 1312 or incident location 1324.

The jurisdictional view may allow an ESP user (e.g., a PSAP call taker) to mark one or more incidents as "Cancel", "Duplicate", "Push to CAD", etc. For example, a PSAP call taker can cancel inadvertent calls (e.g., butt dials), prank calls, and other non-emergency calls. For example, a fire that is being reported in two incidents 1312A and 1312B may be reporting the same fire. The ESP user (e.g., PSAP call taker, supervisor, emergency responder) may mark one of these incidents as a duplicate. In some embodiments, the ESP user links the two incidents 1312A and 1312B as related. In some embodiments, the ESP user consolidates the two incidents 1312A and 1312B as the same incident. By allowing identification of redundant emergency alerts, the jurisdictional view improves efficiency and efficacy of the emergency response.

In addition, a PSAP call taker could initiate a CAD (e.g., a computer aided dispatch (CAD) software program included in preexisting PSAP software) incident based on an incident 1312 listed in the incident queue 1310. For example, an emergency alert may have been triggered by smoke alarms in a home and there may not be an associated emergency call. By creating a CAD incident, the PSAP call taker could initiate dispatch and emergency response for to the home. In such an embodiment, the emergency response application can communicate with the CAD program to push an incident 1312 listed in the incident queue 1310 to the CAD program where the CAD program can then create a CAD incident for the incident 1312.

In some embodiments, the user initiates the emergency response application to find the jurisdictional awareness view, which displays one or more geofences associated with the user's ESP within an interactive map 1320. In some embodiments, the jurisdictional awareness view is populated with previous and current incidents associated with emergency alerts being attended to by the ESP. In some embodiments, upon initiation of the emergency response application, the jurisdictional awareness view is not populated with previous and current incidents, but becomes populated with each incoming emergency alert following the initiation of the emergency response application. In some embodiments, as mentioned above, when an incident 1312 is added to the incident queue 1310, a corresponding incident location 1324 is added to the interactive map 1320. In some embodiments, when an incident 1312 is removed from the incident queue 1310 (e.g., if the incident is resolved, marked as a duplicate, or otherwise deleted), the corresponding incident location 1324 is removed from the interactive map 1320. In some embodiments, wherein the user hovers or selects the incident location 1324, the device identifier (e.g. phone number) associated with the corresponding incident 1312 is displayed adjacent to the incident location 1324. FIG. 13B illustrates the selection of an incident 1312C in the incident queue 1310, which is then displayed at the corresponding incident location 1324C. In some embodiments, multiple incidents 1312 can be selected in the incident queue 1310 to display information adjacent to the corresponding incident location 1324.

In some embodiments, wherein a device that generated an emergency alert for which an incident is created within the jurisdictional awareness view is a mobile device and relocating in real time, the device's location is updated within the interactive map of the jurisdictional awareness view in real time. For example, when the emergency alert (including an initial location) is generated and transmitted to (or detected by) the emergency management system (EMS), the EMS can determine an appropriate ESP to receive the emergency alert and any data associated with the emergency alert and then automatically push the emergency alert and any data associated with the emergency alert to the ESP through the jurisdictional awareness view of the emergency response application (as described above). The emergency response application can then create an incident associated with the emergency alert within the jurisdictional awareness view, such as by listing an incident 1312 in the incident queue 1310 and displaying a corresponding incident location 1324 within the interactive map 1320. If the device sends updated location to the EMS, the EMS can automatically push the updated location to the emergency response application. The emergency response application can then update the incident location 1324 by moving the incident location 1324 within the interactive map 1320 to the location of the updated location received from the device. In some embodiments, the emergency response application displays the location associated with all incidents 1312 listed in the incident queue 1310 and tracks the location associated with each incident 1312 in real time simultaneously.

Figure 13C:
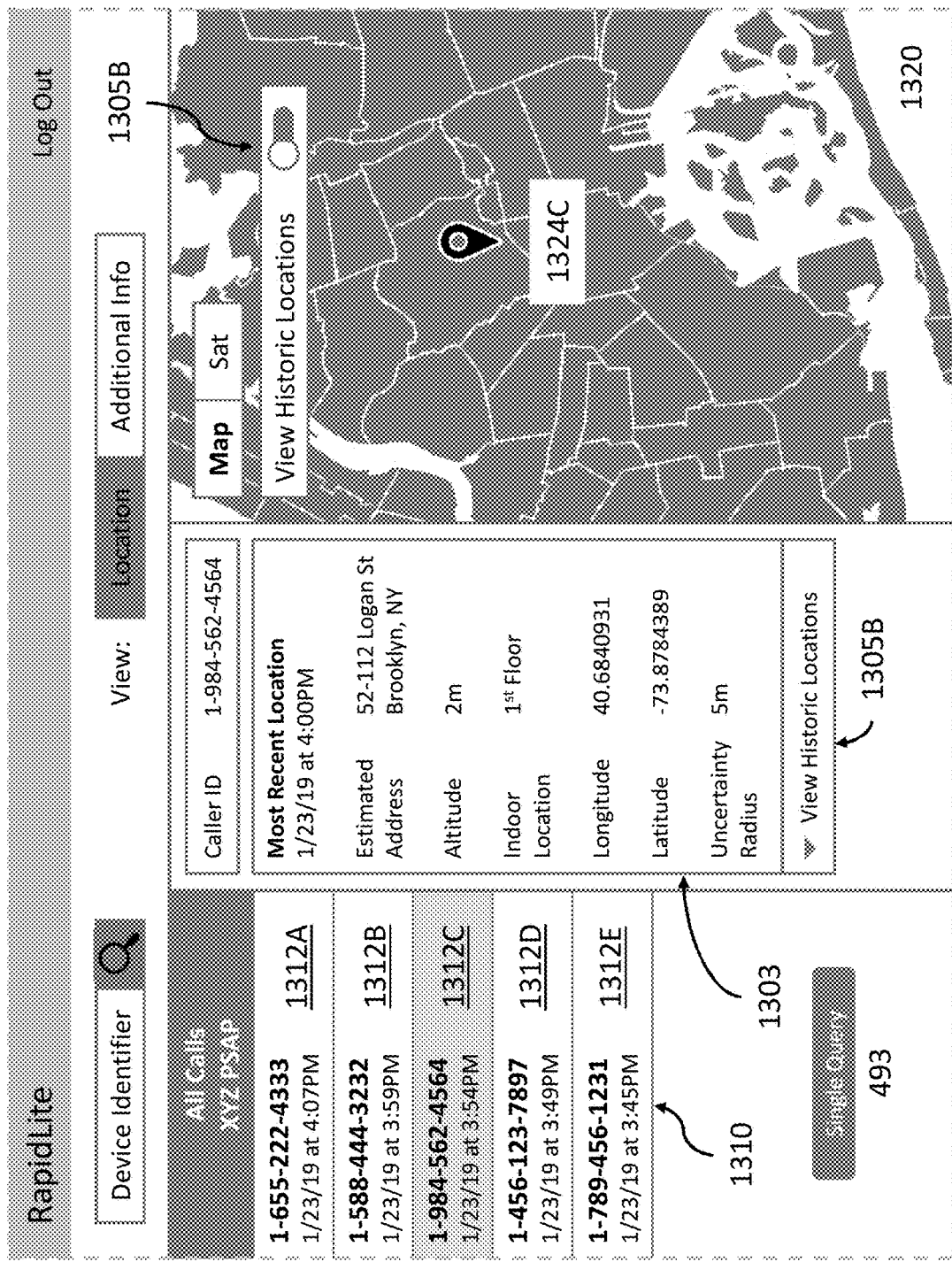
FIG. 13C illustrates the selection of an incident in the incident queue to enter a single incident view.
Figure 14A:
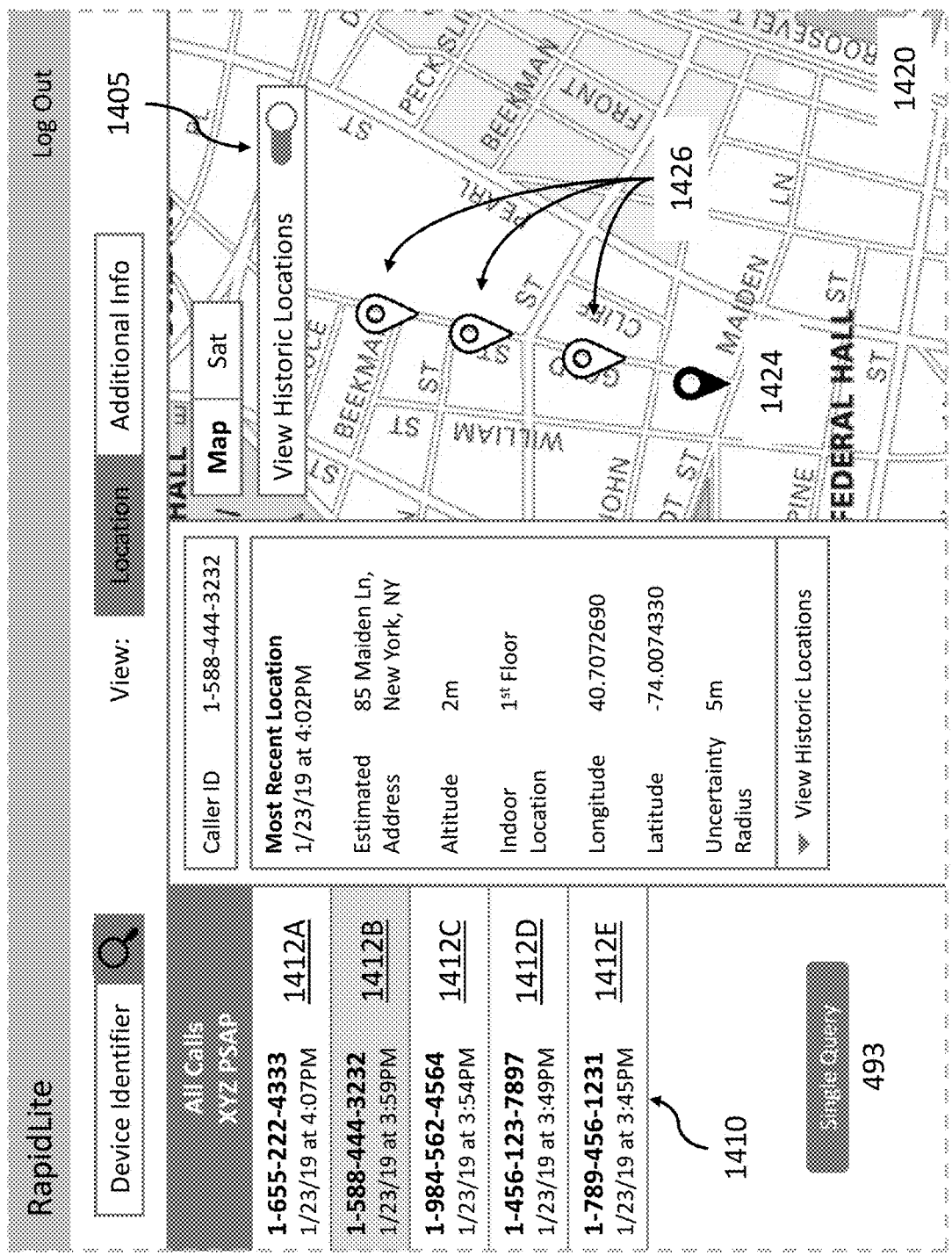
FIG. 14A illustrates a non-limiting embodiment of a jurisdictional awareness view displayed within the emergency response application showing the use of the past location data feature.
Figure 14B:
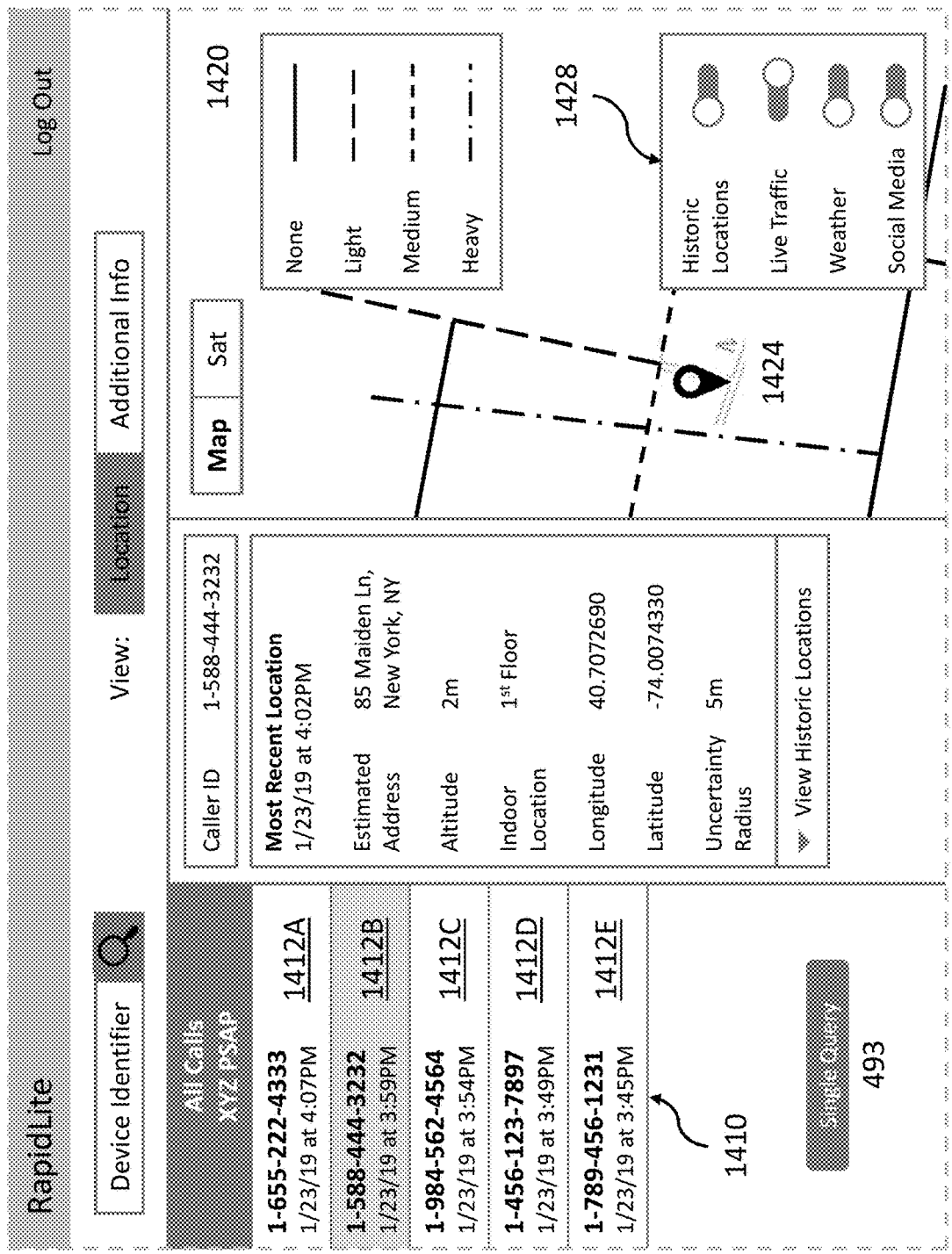
FIG. 14B illustrates a non-limiting embodiment of a jurisdictional awareness view displayed within the emergency response application displaying a data layer feature for traffic conditions.
Figure 14C:
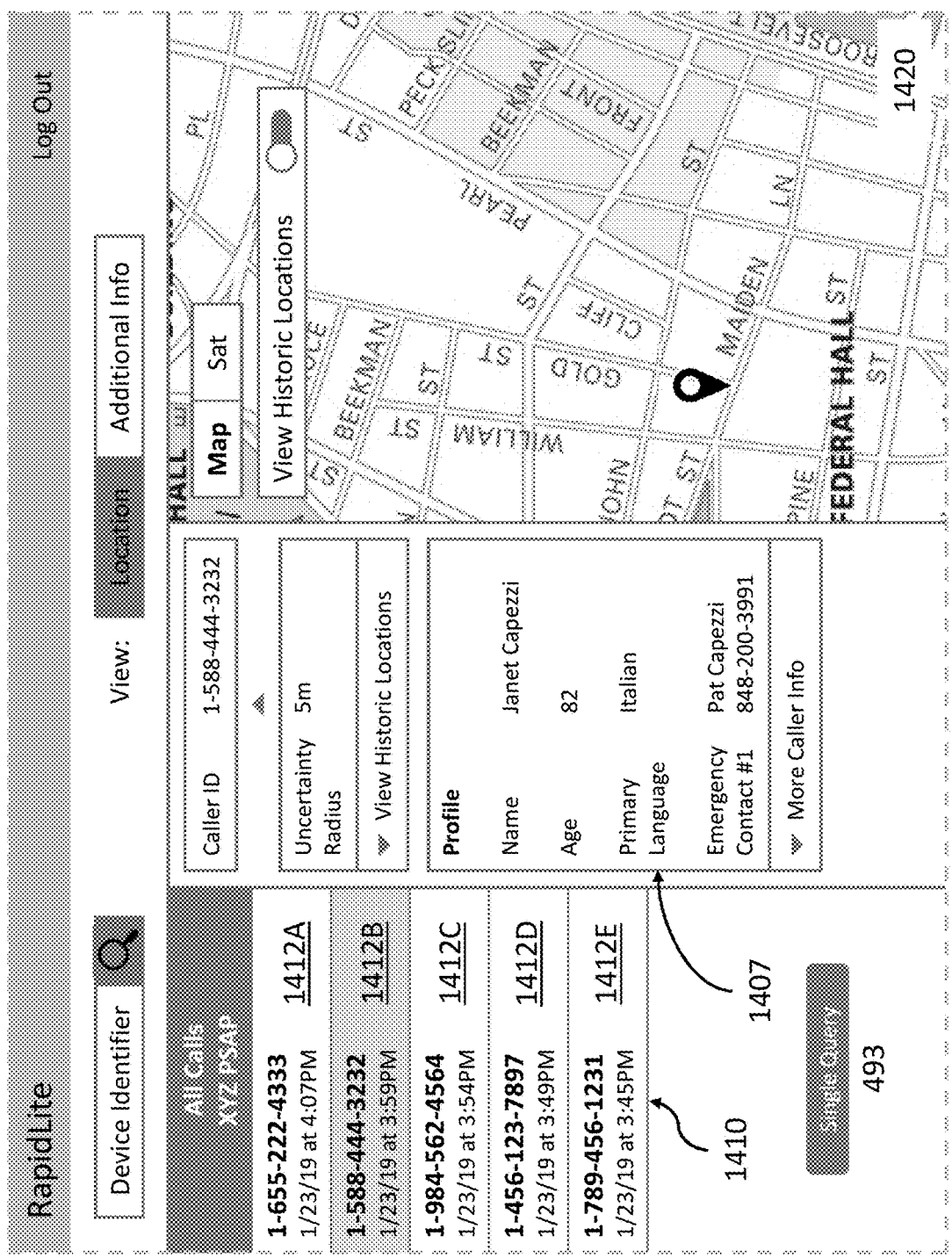
FIG. 14C illustrates a non-limiting embodiment of a jurisdictional awareness view displayed within the emergency response application displaying additional information associated with the selected incident.

In some embodiments, a user of the emergency response application is enabled to access a single incident view from the jurisdictional awareness view. In some embodiments, the single incident view is accessed by the user selecting an incident location or an incident listed on the incident queue. FIG. 13C illustrates the selection of an incident 1312C in the incident queue 1310 to enter the single incident view. In some embodiments, the single incident view enlarges or moves the user's interactive map 1320 to detail the environment around the incident location 1324 (in the example depicted by FIG. 13C, incident location 1324C) corresponding to the selected incident 1312 (in the example depicted by FIG. 13C, incident 1312C). In some embodiments, enhanced location data 1303 or additional data (as depicted by FIG. 14C) is available in the single incident view.

In some embodiments, the single incident view enables a user to access various additional features. For example, in some embodiments, the single incident view enables the viewing of past location data (also referred to as "historic location data") through the use of a toggle button 1305A or menu selection 1305B. FIG. 14A illustrates the use of the past location data feature. In some embodiments, toggling the historic locations button 1405 allows the user to view the past locations 1426 (also referred to as "historic locations") associated with a particular incident 1412 listed in the incident queue 1410. As mentioned above, in some embodiments, the emergency response application can receive location updates regarding an incident 1412 and update the corresponding incident location 1424 accordingly. By selecting to see historic location data for a particular incident 1412, a user can see past locations 1426 associated with an incident 1412 as well as the current location (represented by the incident location 1424) associated with the incident 1412, as depicted by FIG. 14A. FIG. 14A depicts five incidents 1412 listed in the incident queue, incidents 1412A-1412E. In the example depicted by FIG. 14A, incident 1412B has been selected to bring up a single caller view for the incident 1412B. In response, the interactive map 1420 has zoomed in on the incident location 1424 associated with incident 1412B. Additionally, the user has selected to see historic locations 1426 by toggling the historic locations button 1405. In response, the interactive map 1420 now displays markers for historic locations 1426 associated with the incident 1412B. In some embodiments, the emergency response application displays a predetermined maximum number of past or historic locations 1426. For example, in some embodiments, the emergency response application displays no more than three historic locations associated with a particular incident 1412. In some embodiments, the emergency response application displays all of the historic locations 1426 associated with a particular incident 1412. In some embodiments, date and time is displayed when the user selects or moves the cursor over a past location data marker. In some embodiments, past location markers and the current location marker are displayed. In some embodiments, past location markers are automatically denoted or visibly distinct from current location markers. For example, past location markers may be denoted as shades of color, wherein more distant location markers are lighter shades, while the current location marker is the darkest shade of the color, or a different color. For example, as depicted in FIG. 14A, the current (e.g., most recent) location marker is depicted in black while the past location markers are depicted in white.

In another example, in some embodiments, the single incident view enables a user of the emergency response application to access one or more data layers. In some embodiments, a data overlay comprises an additional source of information. Examples of such information sources include IoT sensors (e.g., temperature sensor, camera/video camera), first responder devices (e.g., police vehicle console), wearable sensors (e.g., heart monitor), third party databases, and other relevant sources. In some embodiments, the jurisdictional awareness view is configured to be customizable to show one or more data overlays (or none) based on user configured settings. For example, FIG. 14B depicts the single incident view of the jurisdictional awareness view displaying a data layer. In this example, the jurisdictional awareness view provides a menu of data layers 1428. In this example, the menu of data layers 1428 includes toggles for four different data layers: historic locations (as described above), live traffic, weather, and social media. In the example depicted by FIG. 14B, incident 1412B has been selected and a user has selected the live traffic data layer to be turned on. In response, the jurisdictional awareness view has displayed traffic levels on the streets and roads around the incident location 1424 associated with incident 1412B. In this example, four different levels of traffic are displayed within the interactive map: none, light, medium, and heavy. Traffic levels around the location of an emergency may be particularly helpful for emergency service providers in dispatching first responders to the location. In some embodiments, the weather data layer displays weather conditions in the vicinity of an incident location 1424. In some embodiments, the social media data layer displays relevant social media data, such as social media posts regarding emergencies in the vicinity of an incident location 1424. The emergency response application may provide any type of data layer that offers emergency service providers helpful information in responding to emergencies.

For example, in some embodiments, the jurisdictional awareness view displays the location of available emergency services within a variable proximity to one or more incident locations 1424 (e.g., an emergency services data layer). In some embodiments, the jurisdictional awareness view displays the location of one or more first responders. In some embodiments, the location of a first responder that is assigned to and/or actively responding to an incident 1412 is displayed. In some embodiments, the location of the first responder is provided in real-time. In some embodiments, an estimated time to arrival and/or distance to arrival are displayed (e.g., calculated using the shortest or fastest path between the first responder and the incident location). In some embodiments, the emergency response application enables an ESP to coordinate the dispatch of emergency responders to incident locations 1412, so as to reduce response times and improve the allocation of resources. In some embodiments, the emergency response application is updated in response to the dispatch of a first responder to an incident location 1412. In some embodiments, the emergency response application is updated manually or automatically. In some embodiments, the jurisdictional view is used improve the coordination of first responder resources during large scale emergencies such as natural disasters, industrial accidents, and acts of terror.

In another example, in some embodiments, the jurisdictional awareness view displays one or more sensors within a variable proximity to one or more incident locations 1412 (e.g., a sensor data layer). In some embodiments, the one or more sensors comprise physiological sensors and/or environmental sensors. In some embodiments, the sensors sense one or more environmental or health/physiological parameters. In some embodiments, the environmental parameter is selected from the group consisting of light, motion, temperature, pressure, humidity, vibration, magnetic field, sound, smoke, carbon monoxide, radiation, hazardous chemicals, acid, base, reactive compounds, volatile organic compounds, and smog. In some embodiments, health parameters include heart rate, pulse, electric signals from the heart, blood oxygen levels, blood pressure, blood sugar level, and other health parameters. In some embodiments, a sensor is an Internet of Things (IoT) device such as a home thermostat, vehicle console, a pacemaker implant, etc. As used herein, IoT refers to the ever-growing network of physical devices, buildings, vehicles, and other objects that feature an IP address for internet network connectivity for exchanging data. In many cases, IoT devices are embedded with electronics, software, sensors, network connectivity, or a combination thereof. In some embodiments, IoT devices feature an IP address for internet connectivity. In addition to an IP address, an IoT device is optionally associated with a MAC address or an SSID. It is understood that, IoT devices are connected with one or more other devices through Bluetooth®, Wi-Fi, or other wired and/or wireless technologies which allow for transfer of data.

In some embodiments, the IoT device is in a network of sensors. As an example, IoT networks, wireless sensor networks (WSN) or wireless sensor and actuator networks (WSAN) monitor environmental parameters such as temperature, pressure, sound, etc., using a network of sensors or devices. When one sensor or device detects a sensed value outside of the identified range indicating a likely emergency, it will pass the data to other devices in the network. In some embodiments, the sensor network is a Wi-Fi, WiMAX, or LTE MESH network. In some embodiments, the sensor or IoT devices form nodes in the sensor network. In some embodiments, the sensor network includes a central node for controlling the network. In some embodiments, the sensor network has a distributed architecture to reduce the impact of a failed node.

In some embodiments, an IoT device comprises at least one of the following components including a sensing component (e.g. thermocouple), a networking component (a radio transceiver with an antenna or connection for an external antenna), a microcontroller, an electronic circuit connected to the sensing component, and an energy source. In some embodiments, the sensor network is controlled by a center console (e.g. a smart home console).

In some embodiments, the user of the emergency response application can disable the jurisdictional awareness view by selecting a location marker or a device identifier on the call queue. In some embodiments, the user of the emergency response application can disable the jurisdictional awareness view by way of a toggle button or a menu selection.

Emergency Response Application Additional Data

In some embodiments, the emergency data transmitted from the clearinghouse to the emergency response application includes additional data or information, as described above. For example, as described above, additional information can include, but is not limited to: service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments. In some embodiments, the emergency response application displays additional information included in the emergency data associated with a device identifier within the GUI, as depicted by FIGS. 14C & 15. In some embodiments, the emergency response application displays the additional information within the dashboard, as described above. In some embodiments, the emergency response application displays additional information included in the emergency data associated with the device identifier within a page separate from the dashboard. In some embodiments, a user can access the page displaying the additional information by selecting an additional information button or tab within the GUI. In some embodiments, the emergency response application displays the additional information within the jurisdictional awareness view, as depicted by FIG. 14C. For example, in some embodiments, when a user selects a particular incident 1412 listed in the incident queue 1410, thereby bringing up the single incident view for the particular incident 1412, the emergency response application displays additional data associated with the device identifier associated with the incident 1412, such as the profile information 1407 depicted by FIG. 14C. In some embodiments, as depicted by FIG. 14C, the emergency response application displays additional data above or below enhanced location data associated with an incident. FIG. 15 depicts an additional data displayed within the emergency response application. In some embodiments, when a user selects a particular incident 1512 listed in the incident queue 1510, thereby bringing up the single incident view for the particular incident 1512, the emergency response application presents a toggle 1516 for the user to select between location information and additional information. If the user selects additional information from the toggle 1516, the emergency response application displays additional information associated with the device identifier associated with the particular incident 1512.

In some embodiments, as depicted by FIG. 15, the emergency response application displays emergency data returned from the clearinghouse within discrete categories of emergency data categories, as described above. For example, in some embodiments, the emergency response application can separately display the "Demographics," "Contact Information," and "Addresses" groups of emergency data categories in individual sections. In some embodiments, the "Demographics," "Contact Information," and "Addresses" groups of emergency data categories (as described above) are displayed sequentially under a "Personal Information" (as described above; also referred to as "Caller Information") section of the GUI. In some embodiments, a "Medical Information" (as described above) section is displayed below the "Personal Information" section. In some embodiments, the GUI includes one or more tabs or sections to filter emergency data categories. For example, as depicted in FIG. 15, GUI can include a "Caller Information" tab or section 1518A and a "Medical Information" tab or section 1518B. In some embodiments, the GUI can include a "Location" tab or section, a "Caller-Provided Locations" tab or section, a "Devices" tab or section, and a "Directions" tab or section. In some embodiments, a "Directions" tab can be selected within the GUI to render a map displaying directions from a PSAP to a location of an emergency situation. In some embodiments, the map is capable of providing real-time or near real-time traffic updates.

Figure 16:
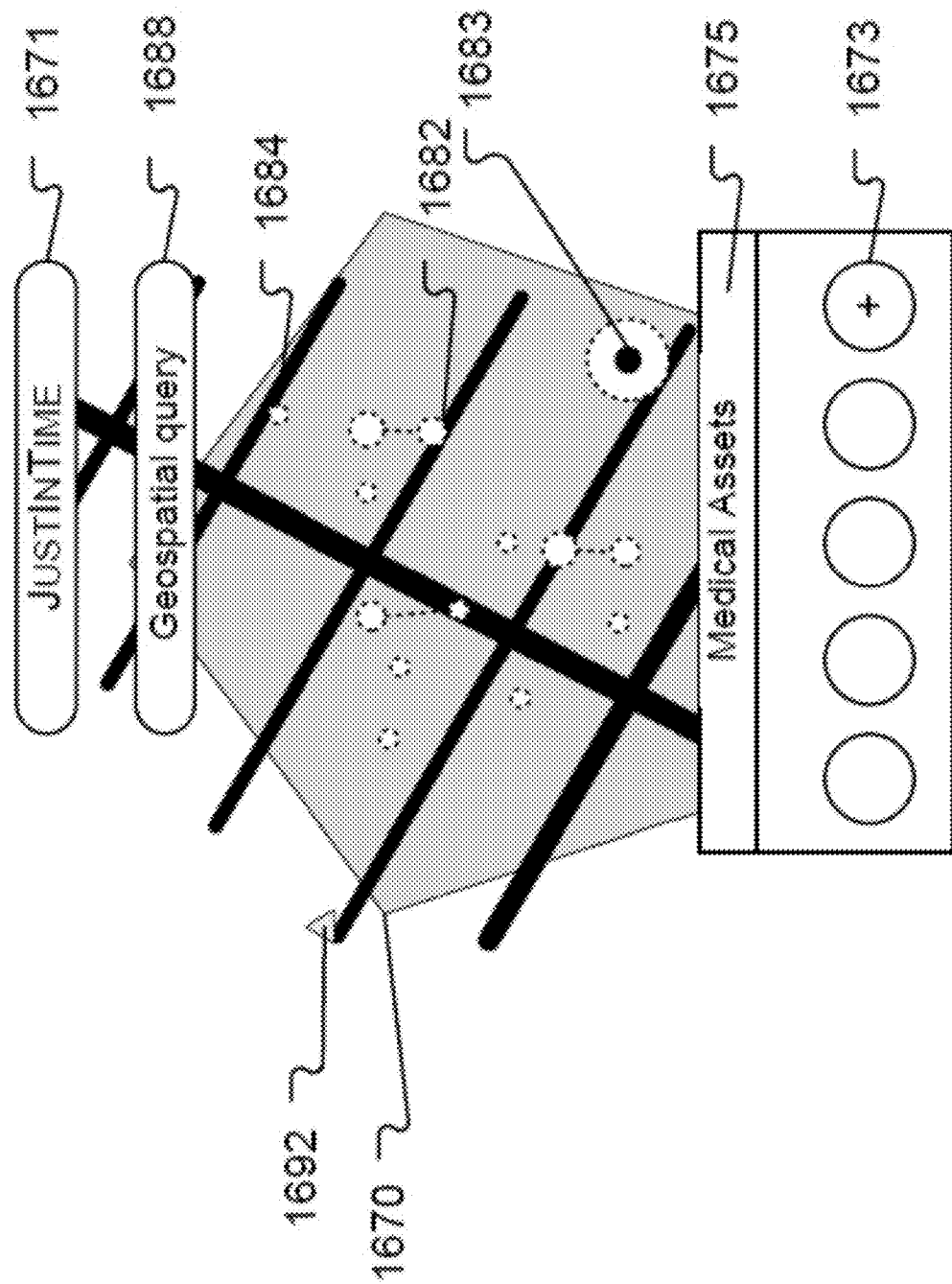
FIG. 16 illustrates a non-limiting example of a graphical user interface displaying the returned results under a jurisdictional awareness view.

FIG. 16 illustrates a non-limiting example of a graphical user interface displaying the returned results under a jurisdictional awareness view. For example, an ESP member (e.g. emergency responder, a police beat within the jurisdiction of the police station) may have entered a location using the geospatial query box 1688. In another example, the emergency location 1683 may be the geospatial query. The geospatial query map may be latitude-longitude, an address, a jurisdictional view of assets, a proximity radius from the emergency location, a proximity radius from landmarks, etc.

The geofence 1670 (e.g. a jurisdiction or sub-jurisdiction) corresponding to the credentials of the ESP member or responder may be displayed as a data overlay on a geographical map. Emergency locations outside the sub jurisdiction (or alternatively in the geofence buffer zone) may be depicted using a different symbol (e.g. triangle 1692). In some cases, the responder 1680 may be able to view different types of events such as fire emergencies (big circles 1682) and medical emergencies (small circles 1684) within its sub-jurisdiction. The responder 1680 may click on an emergency for additional information regarding the emergency. In addition, the responder 1680 may respond or dispatch to the emergency using 1688. Although not shown, the responder 1680 may mark off after the emergency has been responded to or cancel an emergency. Various types of emergencies, assets etc. can be viewed using the options 1673.

Alternatively, a similar screenshot may be displayed at an ESP computer system which has received the emergency request for assistance for dispatching responders to the emergency location and for monitoring the emergency response. For example, an ESP dispatcher may share a similar geographical map of medical assets on display for emergency responders in the field. The geospatial view may include the emergency location 1683 on the geographical map and the ESP users view assets that are in proximity to the emergency location for sending the response. If current location of the responders is available, the movement of response assets (e.g., fire trucks sent to the scene) can also be monitored on the map. In some embodiments, medical assets include hospitals, clinics, doctors, nurses, pharmacies, first aid kits, IoT devices, cameras (e.g. CCTVs), and/or other assets. In some embodiments, the locations of the medical assets are displayed based on their physical addresses listed on public and private lists or databases or from communication devices in those facilities. It is understood that the viewed area of the map is adjustable by zooming in or out, rotating the angle of view, and/or panning.

It is understood that the screenshot in FIG. 16 is a non-limiting example and several variations are contemplated. In some embodiments, the map shows safety assets (such as police, private security personnel, fire extinguishers, fire hydrants, chemical showers, etc.), emergency responders (EMTs, medical services providers (commonly referred to as EMS), paramedics, etc.), volunteers (fire marshals, etc.). In some embodiments, the map shows safety assets (such as police, private security personnel, fire extinguishers, fire hydrants, chemical showers, drones, cameras, IoT devices, etc.), emergency responders (EMTs, paramedics, police vehicles, tow trucks, etc.), volunteers (fire marshals, etc.).

Non-limiting examples of geographical data layers including "police assets", "fire response assets", "safety assets", "drone assets", "IoT devices", "CCTVs", "vehicle rescue assets", "pet rescue assets", "water rescue assets" may also be generated.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing dice is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random-access memory (FRAM). In some embodiments, the non-volatile memory comprises phase-change random access memory (PRAM). In some embodiments, the non-volatile memory comprises magnetoresistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing-based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof Web Application In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™ JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object-oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon Kindle® Basic Web, Nokia® Browser, Opera Software® Opera® Mobile, and Sony® PSP™ browser.

Certain Terminologies

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, an "electronic device" or "computing device" is a digital processing device designed with one or more functionalities such as, for example, a communication device. In some cases, the computing device is a desktop or laptop computer associated with a public safety answering point. For example, a computing device associated with a public safety answering point is a computer that is part of a work station a computer operated by a PSAP dispatcher. In some instances, the PSAP dispatcher is working on location at the PSAP. In some embodiments, the PSAP dispatcher is working off-site from a remote location. A "producing device" refers to an electronic device with a communication component, which will allow it to send and receive information over a wireless channel, a wired channel, or any combination thereof (e.g., sending/receiving information over the Internet). Non-limiting examples of producing devices include a mobile phone (e.g., a smartphone), a laptop, a desktop, a tablet, a radio (e.g., a two-way radio), and a vehicular communication system. In some embodiments, a producing device includes a car security system (e.g., OnStar®), a home security system, or a home control system (e.g., a networked control system for providing network controlled and/or smart temperature control such as a Wi-Fi smart thermostat, lighting, entertainment, and/or door control, such as Nest®). In some embodiments, a producing device is an Internet of Things (IoT) device. In some embodiments, the producing device is a sensor for sensing environmental or health indicators. In some embodiments, the sensor includes a sensing component and a communication component. In some embodiments, the producing device is a sensor in a sensor network or a device that controls a sensor network. In some embodiments, the producing device is a physical panic button or software "panic" button.

In some embodiments, a producing device is a wearable device (e.g., a communication device worn by a user, such as an Apple Watch). In some embodiments, a producing device (e.g., a wearable device) comprises one or more sensors. The one or more sensors optionally include, but are not limited to: a gyroscope, an accelerometer, a thermometer, a heart rate sensor, a barometer, or a hematology analyzer. As used herein, a "mobile wireless device" refers to a device that is portable and communicates wirelessly. In some embodiments, a user wears or carries the mobile wireless device on the user's person or in the user's vehicle. Non-limiting examples of mobile wireless devices include mobile or cellular phones, wearable devices (e.g., smart watch, fitness tracker, wearable sensor, smart glasses, etc.).

As used herein, a "querying device" refers to a communication device that is querying for the emergency data (e.g. by allowing a user to send an emergency data request). In some embodiments, the querying device is a computing device within an ESP computer system, PSAP computer system, or PSS computer system. For example, the querying device may be a stationary terminal at a PSAP or a PSS (e.g. a police station, a command center), a responder device (e.g. a police radio, a vehicle console in an ambulance, etc.).

As used herein, a "consuming device" refers to a communication device that is receiving the emergency data for servicing the emergency. In many cases, the consuming device is the same as the querying device (e.g. the device sending the emergency data request). In some embodiments, the consuming device may be different from the querying device. For example, an ESP administrator may obtain the emergency location via a querying device at the ESP, dispatch a private individual or entity to respond to an emergency, and provide the emergency location to the consuming device of the individual or entity.

As used herein, an "associated device" refers to a communication device that is associated with an electronic device. For example, a user is using several communication devices such as a mobile phone, a wearable, a home security system, a car computer. The user has registered these devices with his or her account(s) and linked these devices with a user name, user number(s), email address(es), home or other physical address(es). In some embodiments, associated devices include communication devices of at least one additional user who is associated with user, e.g., a husband and wife, a father and son, a patient and doctor, friends, work colleagues, etc. In some cases, the user has added the second user as an emergency contact, a primary contact, a secondary contact, or a member of a group (e.g., part of the same club, organization, or workplace). In some cases, user has agreed to share location and other data with the second user. In some embodiments, the second user is someone who is frequently contacted by the user and the communication device identifies the second user from the "Recently called" or "Frequently called" list. In some embodiments, the associated devices are devices that are proximal or nearby to the producing device such as obtained through a Wi-Fi scan. In some embodiments, an associated device is proximal to the triggering device when the location of the associated device is within 1, 5, 10, 15, 20, 25, 30, 35, 40, 45, 50, 60, 70, 80, 90, 100, 200, 300, 400, or 500 meters of the location of the producing device, including increments therein.

As used herein, the "device identifier" refers to information allowing identification of the device or a user of the device (e.g. a phone number associated with a user of a producing device). In some embodiments, the device identifier includes a phone number, email address, physical address, coordinates, IMEI number, IP address, BSSID, SSID or MAC address.

As used herein, an "emergency alert" refers to a communication relating to an emergency or non-emergency situation. In some embodiments, an emergency alert is an emergency request for assistance (e.g., the request is associated with an emergency situation). In some embodiments, an emergency alert is a phone call. In some embodiments, an emergency alert comprises an emergency indication. In further embodiments, an emergency indication is selected from one or more of the group consisting of traffic accident, police emergency, medical emergency, and fire emergency. In some embodiments, an emergency alert is associated with a non-emergency situation (e.g., request for a tow truck after car breaks down). In some embodiments, an emergency alert is associated with a device sending the alert. In other embodiments, an emergency alert is associated with a device not sending the alert (e.g., a proxy request on behalf of a second device and/or a member device in a group of devices). As used herein, an emergency alert is "associated" with a device or user when the emergency alert relates to an emergency or non-emergency situation involving the device or user. In some embodiments, an emergency alert comprises data associated with a device (or user thereof). In some embodiments, an emergency alert comprises data associated with an electronic device sending the alert or another device. For example, in some embodiments, an emergency alert comprises data associated with a device, wherein the data set comprises current and/or past location data. In another example, the data set comprises current and/or past health data associated with the user of an electronic device. In other embodiments, an emergency alert is sent and/or received separately from data associated with a device.

As used herein, a "first responder" or an "emergency responder" refers to any person or persons responsible for addressing an emergency situation. A first responder is optionally referred to as an "emergency responder." In some embodiments, a first responder refers to government personnel responsible for addressing an emergency situation. In some embodiments, a first responder is responsible for a particular jurisdiction (e.g., a municipality, a township, a county, etc.). In some embodiments, a first responder is assigned to an emergency by an emergency dispatch center (hereinafter, "EDC"), such as a PSAP. In some embodiments, a first responder responds to a request for emergency assistance placed by a user via a user communication device.

In some embodiments, a first responder includes one or more firefighters, police officers, emergency medical personnel, community volunteers, private security, security personnel at a university, or other persons employed to protect and serve the public and/or certain subsets of the population.

As used herein, an "emergency service provider" (ESP) is a public or private organization or institution responsible for providing emergency services. For example, in some embodiments, an EDC (e.g., a public safety answering point (PSAP)), a fire department, a police department, and a hospital may all be considered emergency service providers. In some embodiments, an emergency responder is a member of an ESP. In some embodiments, an ESP personnel is a person who works at an ESP. For example, an ESP personnel may be a call-taker at a PSAP or a first responder at a fire department. In some embodiments, the ESP is a private call center. In some embodiments, the ESP is university or corporate campus police. There may be different types of ESPs (e.g., primary agencies, secondary agencies, public safety agencies, private agencies, etc.). Primary agencies may have authoritative responsibility to respond to emergencies within its geofence, while secondary agencies may be assigned to respond to emergencies by primary agencies. For example, the primary agency is a PSAP, while a secondary agency is a local medical service provider. In another example, the primary agency is a PSAP, while a secondary agency is a regional authority, where the jurisdiction of the secondary agency may overlap with the jurisdiction of the PSAP.

As used herein, a public safety service (PSS) refers to a local, state, or federal government agency or institution that is responsible for providing safety, security, or medical services to members of the public. Examples of public safety services include fire departments, police departments, and hospitals. In some embodiments, public safety services additionally include public safety answering points (PSAPs). A PSAP refers to a call center responsible for answering calls to an emergency telephone number for police, firefighting, and ambulance services. Trained telephone operators (also referred to as call-takers) are also usually responsible for dispatching these emergency services. The Federal Communications Commission (FCC) of the United States government maintains a PSAP registry. The registry lists PSAPs by an FCC assigned identification number, PSAP Name, State, County, City, and provides information on any type of record change and the reason for updating the record. The FCC updates the registry periodically as it receives additional information. In some embodiments, the ESP identifier or PSAP identifier comprises the FCC identification of the agency.

As used herein, a "emergency authority" refers entities or organizations that have been given authority by the government to service emergency alerts and calls (911, 112 or other emergency numbers) within a specific area (the "authoritative region"). Non-limiting examples of emergency authorities include PSAPs and various types of PSS such as emergency command centers.

As used herein, a "recipient" refers to one or more persons, services, or systems that receive a request for assistance (e.g., an emergency alert). The recipient varies depending on the location of the emergency and type of request. In some embodiments, a recipient is an emergency service provider (ESP). In some embodiments, a recipient is an emergency service when the request for assistance pertains to an emergency (e.g., a tier 2 emergency). In some embodiments, a recipient is an emergency management system. In some embodiments, a recipient is an emergency dispatch center (e.g., a public safety answering point or PSAP). In some embodiments, a recipient is an emergency dispatch center, wherein the request is first routed through an emergency management system (e.g., request is sent to the EMS, but ultimately is sent to an EDC). In some embodiments, a recipient is a dispatcher or call taker associated with a particular PSS such as a PSAP. In some embodiments, the recipient is located on-site at the PSS (e.g., PSAP station) or is working remotely (e.g., at home). In some embodiments, a recipient is a first responder (e.g., a communication device of a first responder). In some embodiments, a recipient is an associated device of a user or an account associated with the user. In some embodiments, a recipient is a non-emergency service or personnel, for example, a relative or friend. In such situations, a user of a communication device (or member device or second device) does not require emergency assistance but does need help.

As used herein, a "user" refers to one or more person or persons associated with a system, server, or device (e.g., electronic device, member device, second device, device of a first responder, etc.).

In some embodiments, emergency data may designate a source (also referred to as a "data source" or "info source") from where the emergency data was received or generated. In some embodiments, the source is a public or private organization. In some embodiments, the organization provides a transportation service (e.g., taxi company, ride-sharing company, shipping company, railroad company, etc.). In some embodiments, a user utilizes a producing device to send an emergency alert or request for assistance and produce emergency data. In some embodiments, user refers to one or more persons who are paid subscribers of a network access service, for example, cellular service subscribers. In some embodiments, a user refers to anyone who gains access to a network via a router, for example, a Wi-Fi router, and is not a paid subscriber of any access service. In some embodiments, a device associated with a user is a device carried or worn on the person of the user (e.g., a phone or wearable device). In some embodiments, a device associated with a user is not carried or worn on the person of the user (e.g., a home security sensor or camera installed in the home of the user, a vehicle tracking system installed in a vehicle of the user, etc.).

As used herein, "data" refers to a collection of information about one or more entities (e.g., user of a user communication device) and/or an environment that pertains to characteristics of the one or more entities. In some embodiments, an entity is a person such as a user. In some embodiments, an entity is a thing (e.g., a house). For example, in some embodiments, data comprises sensor data from home sensors associated with a house. In this example, the data is also associated with one or more persons (e.g., the homeowner(s) and/or inhabitant(s)). In some embodiments, data refers to meta-data. In some embodiments, data comprises health information about the user of a communication device. In some embodiments, data comprises information about the surrounding environment of the user of the user communication device (e.g., surrounding temperature, location, elevation, barometric pressure, ambient noise level, ambient light level, surrounding geography, etc.). In some embodiments, data comprises information about other users that is pre-stored in a device or in a database (e.g., a database within a group of devices who are related to the user of the user communication device as predefined by the user). In some embodiments, the data set comprises information from two or more users of user communication devices, wherein each user is affected by an emergency situation. As an example, two unrelated users are involved in a vehicular collision, and each user sends a separate emergency alert (for traffic accident) using his/her communication device. In this example, the separate emergency alerts are associated (e.g., by an emergency management system and/or emergency dispatch center) with the same emergency based on the proximity of time, location, and emergency indication of the emergency requests. As a result, the data set for this accident comprises information from both user communication devices. In this example, the data set comprises location data from both devices (e.g., GPS coordinates, device-based hybrid location, "location services", etc.), biosensor data for one or both devices (e.g., biosensor data such as heart rate and blood pressure can be important in case of injury), and information about the vehicle driven by each user (e.g., make, model, and year of manufacture information stored on the device). In some embodiments, data comprises current data. In further embodiments, current data comprises information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old, including increments therein. In further embodiments, current data comprises information that equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, data comprises historical data. In further embodiments, historical data comprises information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old, including increments therein. In further embodiments, historical data comprises information that equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, the age of information is calculated from the date the information is first collected (e.g., when a sensor first detects a sensed parameter such as, for example, heart rate).

As used herein, "health data" refers to medical information associated with a user of a device. In some embodiments, health data comprises medical history such as, for example, past illnesses, surgery, food and/or drug allergies, diseases, disorders, medical diagnostic information (e.g., genetic profile screen), or any combination thereof. In some embodiments, health data comprises family medical history (e.g., family history of breast cancer). In some embodiments, health data comprises current health information such as, for example, current symptoms, current medications, and/or current illnesses or diseases. In some embodiments, health data comprises user age, height, weight, blood type, and/or other biometrics. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old. In some embodiments, current health information comprises information that is equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, current health information comprises medical information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old.

As used herein, "user data" refers to general information associated with a user of a device. In some embodiments, user data comprises user identity, user name, height, weight, eye color, hair color, ethnicity, national origin, religion, language(s) spoken, vision (e.g., whether user needs corrective lenses), home address, work address, occupation, family information, user contact information, emergency contact information, social security number, alien registration number, driver's license number, vehicle VIN, organ donor (e.g., whether user is an organ donor), or any combination thereof. In some embodiments, user data is obtained via user input.

As used herein, "sensor data" refers to information obtained or provided by one or more sensors. In some instances, a sensor is associated with a device (e.g., user has a communication device with a data link via Bluetooth with a wearable sensor, such as, for example, a heart rate monitor or a pedometer). Accordingly, in some embodiments, the device obtains sensor data from the sensor (e.g., heart rate from the heart rate monitor or distance traveled from the pedometer). In some instances, the sensor data is relevant to an emergency situation (e.g., heart rate during a cardiac emergency event). In some embodiments, a sensor and/or sensor device comprises an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge, a thermometer, a proximity sensor, a motion detector (e.g., in a home security system), an occupancy sensor, or any combination thereof, and in some embodiments, sensor data comprises information obtained from any of the preceding sensors. In some embodiments, one or more sensors are physically separate from a user device. In further embodiments, the one or more sensors authorize the user device to obtain sensor data. In further embodiments, the one or more sensors provide or send sensor data to the user device autonomously. In some embodiments, the user device and the one or more sensors belong to the same group of devices, wherein member devices are authorized to share data. In some embodiments, a user device comprises one or more sensors (e.g., user device is a wearable device having a sensor or sensing component).

As used herein, "emergency data" refers to data pertaining to an on-going or historical emergency. The emergency data may be generated at the time of the emergency. The emergency data may be generated before the emergency occurs and may be made accessible when the emergency occurs. In some embodiments, the emergency data comprises location data, particularly the current location of the emergency (often times based on the location of the user device). Because of privacy and security concerns, emergency data must be stored, accessed, transmitted using security and privacy measures.

As used herein, "communication link" refers to a communication pathway from a device (e.g., communication device) to another device or to an intermediate device (e.g., a router) such as over a network. In some embodiments, the communication device establishes a communication link with another device or an intermediate device to transfer information (e.g., a location of the device) or to obtain information from a recipient such as, for example, location of a first responder assigned to a request for assistance associated with the communication device (e.g., device of first responder). In some embodiments, a communication link refers to the point-to-point communication channels, point-to-point and end-to-end data sessions, and/or the physical hardware facilitating the communication channel(s) (e.g., antennas used to communicate/transmit information). In some embodiments, a data session comprises session parameters and the network route taken from one device to another device.

As used herein, a "data session" refers to a communication session between two devices wherein data packets are exchanged between the devices. In some embodiments, a data session is setup using exchange of certain data packets, also called as "handshake signals," which are able to define the capabilities of the data session. For example, in some embodiments, the data session "handshake" provides for the ability to transfer multi-media data, voice data, and other data via the data session. In some embodiments, the data session is setup without the use of handshake signals, wherein the two devices involved share data packets according to a predefined protocol (e.g., a previously agreed upon protocol). In some embodiments, the data session is routed through an EMS, which stores the multi-media, voice, and/or other data from any of the devices that are part of the data session. In further embodiments, the EMS shares the data from the data session with the other device (e.g., device of a first responder). In some embodiments, the EMS manages the data session.

Modern communication devices, for example, smart phones, tablet computers, wearable communication devices, smart sensor devices and/or systems are often equipped with a variety of features for determining location information of the communication device using, for example, GPS, or triangulation with cellular phone towers. Modern communication devices also often include functionality to store data regarding a user of the communication device, for example, health information about the user.

In some embodiments, the communication device (or communication module of the device) communicates with a recipient through one or more data channels. In some embodiments, the recipient is an emergency management system. In some embodiments, the EMS routes communications to an EDC. In further embodiments, the EMS establishes a first data channel with the communication device and a second data channel between the EMS and the EDC, wherein the EMS bridges the first and second data channels to enable the communication device and the EDC to communicate. In some embodiments, the EMS converts data (e.g., data set) from the communication device into a format suitable for the EDC (e.g., analog or digital, audio, SMS, data, etc.) before sending or routing the formatted data to the EDC. In some embodiments, the EMS routes communications to a device associated with a first responder. In some embodiments, the communication device relays additional communications, information, and/or data sent or shared between member devices in the group of devices to the EMS or EDC after a request for assistance has been sent. In further embodiments, the additional information is relayed to the EMS or EDC after the request for assistance has been sent in order to provide current information that is relevant to the request. For example, in some instances, communications between member devices contain information relevant to the emergency (e.g., information that the user of member device who is experiencing a medical emergency suffers from diabetes). Accordingly, in some embodiments, the information is sent autonomously, at request of a user of the communication device, or at request of the recipient (e.g., EMS, EDC, first responder, etc.).

EXAMPLES

The following illustrative example is representative of embodiments of the invention described herein and is not meant to be limiting in any way.

Example 1

Just In Time, an emergency response company, aids public safety services (such as public safety answering points, or "PSAPs") by gathering emergency data from a variety of sources and delivering the data directly to the public safety services. Traditionally, PSAPs are only technologically capable of receiving telephone calls (e.g., 9-1-1 emergency calls) with no additional data. Thus, when an emergency all is made to a PSAP from a mobile phone (with a dynamic and uncertain location), PSAP operators or call-takers must speak directly to the caller to determine the person's location. Unfortunately, many people involved in emergency situations are unable to articulate their location or may not even know—and even if they do, the time spent articulating their location to the PSAP operator can often be the difference between life and death. Similarly, PSAP operators are forced to respond to emergencies with little or no information about the persons involved (e.g., health data or medical histories) or context of the emergencies (e.g., type of emergency, audio/video of the surroundings, etc.). Just In Time knows just how critical it is to quickly and accurately provide locations and situational/contextual information during emergencies to public safety services.

To aid PSAPs, Just In Time maintains and provides an Emergency Clearinghouse (hereinafter, "clearinghouse") that receives and stores data and information from a plurality of sources, such as mobile phones and mobile applications, internet of things (IoT) devices, intelligent vehicles systems, and other electronic devices. During an emergency, the clearinghouse can gather information stored within the clearinghouse regarding the emergency and deliver the information to PSAPs. In order to provide access to the information stored within the clearinghouse to PSAPs as quickly and easily as possible, Just In Time develops and provides an emergency response application in the form of an emergency management application The administrator of a PSAP in Georgia, Joe, learns of the helpful and potentially life-saving information stored within Just In Time's clearinghouse—such as accurate emergency locations and medical histories (hereinafter, "emergency data")—and that is automatically pushed to registered PSAPs. Accordingly, Joe registers his PSAP, including GIS file providing a geofence of the jurisdiction of the PSAP.

Once registered, Joe then creates Nick Of Time accounts for any number of other members of his PSAP to use to access Nick Of Time. For example, Joe creates an account for one of the Georgia PSAP call-takers, Jane. Just In Time then sends Jane an email including a temporary password for her to use to access Nick Of Time. When Jane attempts to log into Nick Of Time, Nick Of Time checks the IP address that Jane's login attempt was received from, and determines that the IP address is different from the IP address Joe used to register the PSAP (e.g., Jane attempted to log in from a different computer within the PSAP). In response, Jane's login attempt is blocked and her account is disabled. Nick Of Time presents Jane with two options for requesting an access code to reactivate her account: a phone call to the PSAP's non-emergency telephone number that will audibly relay the access code; or an email sent to Joe. This security method ensures that Jane is legitimately associated with the Georgia PSAP, as she must either be physically present at the PSAP, receive the access code from someone who is physically present at the PSAP, or receive the access code from Joe, who has been previously vetted.

Since Jane is physically present at the PSAP, she chooses to receive the phone call and records the access code that is dictated by the call. She submits the access code into Nick Of Time, which reactivates her account and adds her IP address to a list of authorized IP addresses. Nick Of Time then presents an emergency management view on a computer display to Jane through the Nick Of Time GUI, where Jane can view a master list and/or an interactive map showing one or more ongoing and recent incidents within the jurisdiction. Jane soon receives an emergency call from a man named Eric, whose phone number is (555) 444-6666. Upon making the emergency call, Eric's smartphone automatically sends a current location (determined using the phone's GPS rather than cell tower triangulation) to a third party database, which then relays the information to the clearinghouse.

In addition, the clearinghouse searches its records for additional information including Eric's home and work addresses, Eric's medical history, and a phone number for Eric's mother, who is listed as Eric's emergency contact. The clearinghouse then uses the identifier of the Georgia PSAP to retrieve the geofence submitted by Joe during the Nick Of Time registration process. The clearinghouse then determines whether or not Eric's current location is within the geofence. For security purposes, the clearinghouse does not return emergency data to requesting parties if a current location included in the emergency data is not within a geofence associated with the requesting party. However, the clearinghouse determines that Eric's current location is within the geofence provided by Joe. The clearinghouse also accesses the ALI feed or CAD spill of the PSAP to locate the phone identifier corresponding to the current location for Eric's phone. Once the location has been successfully matched to the phone identifier, the clearinghouse associates the emergency with a particular PSAP that has authoritative jurisdiction to handle the emergency. The EMS pushes all of the emergency data associated with Eric's phone number to Jane (who is a user for the authoritative PSAP) to be visualized using the emergency management view. The emergency management view displays a graphical representation of Eric's current location within a map and a textual description of Eric's current location (e.g., latitude and longitude) within a text box. The emergency data is already available when Jane accesses the emergency management view, and Jane immediately dispatches emergency help to Eric's current location.

To access the emergency data, Jane simply opens the emergency management view which shows the interactive map. The graphical representation of Eric's current location is user selectable and configured to provide any additional information upon selection. Moreover, the map is configured to show one or more data overlays visualizing additional sources of information. In this case, Jane has modified the settings to display the IoT sensor overlay showing sensors within a 200 meter radius of a current incident's location. Accordingly, IoT sensors within the 200 meter proximity to Eric's current location are graphically shown as an IoT sensor overlay on the interactive map. Eric communicates to Jane that the emergency is for a fire in his apartment building. Jane selects the emergency alert from the Tot sensor and marks it as a "duplicate." Jane selects a traffic camera at an intersection close to Eric's location and accesses the data feed to assess the fire. She also selects IoT temperature sensors located near Eric's location to access temperature readings. Jane then relays the information to the first responder (fire department) that has been assigned to respond to the emergency incident.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system comprising:
 a) an emergency management system (EMS) configured for delivering emergency data to an emergency service provider (ESP), the EMS comprising a memory, a network component, and at least one processor, operatively coupled to the network component, the at least one processor of the EMS operative to:
  i) detect an active communication link established between the EMS and a first ESP through an emergency response application executed on a computing device at the first ESP;
  (ii) receive a first emergency alert generated by an electronic device, the first emergency alert comprising emergency data comprising a first location and a first device identifier associated with the electronic device, wherein the emergency alert is not a phone call between the electronic device and the first ESP;
  iii) automatically access one or more geofences associated with one or more emergency service providers (ESPs) from a geofence database, the one or more geofences comprising a first geofence associated with the first ESP;
  iv) determine that the first location is within the first geofence associated with the first ESP;
  v) in response to determining that the first location is within the first geofence associated with the first ESP, associate the first emergency alert with an identifier of the first ESP; and
  vi) in response to both detecting the active communication link between the EMS and the first ESP and associating the first emergency alert with the identifier of the first ESP, automatically transmit the emergency data to the first ESP through the active communication link; and
 b) an emergency response system comprising at least one processor, a memory, a user interface, a network component, a display, and at least one processor, operatively coupled to the network component, the at least one processor of the emergency response system operative to:
  i) provide an emergency response application comprising a graphical user interface (GUI) at the first ESP displaying an interactive map;
  ii) establish the active communication link between the EMS and the first ESP through the emergency response application before the EMS receives the emergency alert;
  iii) automatically receive the emergency data from the EMS through the active communication link; and
  iv) display the first location within the interactive map as an incident location associated with the first device identifier.

2. The system of claim 1, wherein the first ESP is associated with login credentials of one or more ESP users through an ESP account, wherein the emergency data within the first geofence of the first ESP is automatically pushed to the one or more ESP users.

3. The system of claim 1, wherein the first ESP is a public safety answering point (PSAP) and the first geofence is an authoritative jurisdiction of the PSAP.

4. The system of claim 1, wherein the GUI of the emergency response application is configured to display a list of one or more incidents corresponding to a list of emergency calls located within the first geofence associated with the first ESP.

5. The system of claim 1, wherein the at least one processor of the emergency response system is further operative to:
 a) gather additional emergency data associated with the first device identifier;
 b) receive selection of the incident location associated with the first device identifier within the interactive map; and
 c) in response to receiving selection of the incident location associated with the first device identifier, display at least a subset of the additional emergency data in an additional data overlay within the GUI.

6. The system of claim 5, wherein the additional emergency data comprises at least one of caller information, sensor data, emergency contact information, emergency indication, and medical information.

7. The system of claim 1, wherein the at least one processor of the emergency response system is further operative to:
 a) receive credentials associated with an account of an ESP personnel;
 b) identify the identifier of the first ESP, wherein the identifier of the first ESP is associated with the account of the ESP personnel; and
 c) determine that the geofence associated with the ESP is associated with the identifier of the first ESP.

8. The system of claim 1, wherein the GUI displays a list of incidents corresponding to emergency alerts, wherein the list of incidents is ordered chronologically by time of receipt for the emergency alerts.

9. The system of claim 1, wherein the first device identifier is one of a phone number, an email address, or an IP address.

10. The system of claim 1, wherein the at least one processor of the EMS is further operative to:
 a) receive a second emergency alert associated with a second device identifier, the second emergency alert comprising a second location;
 b) determine that the second location is within a threshold proximity of the first location; and
 c) consolidate the second emergency alert with the first emergency alert within the first incident, wherein the first incident is then associated with both the first device identifier and the second device identifier.

11. The system of claim 1, wherein at least one processor of the EMS is further operative to:
 a) receive an updated location associated with the first device identifier; and b) move the first incident location within the interactive map to the updated location associated with the first device identifier.

12. The system of claim 1, wherein the first geofence associated with the first ESP is submitted through the emergency response system by a member of the first ESP.

13. The system of claim 1, wherein the GUI comprises a data overlay displaying at least a subset of the emergency data associated with the first incident.

14. The system of claim 1, wherein the at least one processor of the emergency response system is further operative to display one or more assets proximal to the first incident location, wherein the one or more assets comprise one or more of medical, fire, police, and safety assets.

15. The system of claim 1, wherein the at least one processor of the emergency response system is further operative to display one or more data layers on the interactive map comprising one or more of weather, traffic and safety hazards.

16. The system of claim 1, wherein the first ESP is associated with the login credentials of one or more ESP users through an ESP account.

17. The system of claim 16, wherein the one or more ESP users are subscribed to the first ESP account, wherein the emergency data within the geofence of the first ESP is automatically pushed to the one or more ESP users.

18. An emergency management system (EMS) configured for delivering emergency data to an emergency service provider (ESP), the EMS comprising a memory, a network component, and at least one processor operatively coupled to the network component, the at least one processor operative to:
  a) detect an active communication link established between the EMS and an ESP through an emergency response application executed on a computing device at the ESP;
  b) receive an emergency alert generated by an electronic device, the emergency alert comprising emergency data comprising a location and a device identifier associated with the electronic device, wherein the emergency alert is not a phone call between the electronic device and the ESP;
  c) automatically access one or more geofences associated with one or more emergency service providers (ESPs) from a geofence database, the one or more geofences comprising a geofence associated with the ESP;
  d) determine that the location is within the geofence associated with the ESP;
  e) in response to determining that the location is within the geofence associated with the ESP, associate the emergency alert with an identifier of the ESP; and
  f) in response to both detecting the active communication link between the EMS and the ESP and associating the emergency alert with the identifier of the ESP, automatically transmit the emergency data comprising the location to the emergency response system for display through a graphical user interface (GUI) at the ESP, wherein said GUI displays an interactive map and displays the location within the interactive map as an incident location associated with the device identifier, wherein the active communication link was established between the EMS and the ESP by the emergency response system before the EMS receives the emergency alert and automatically receives the emergency data from the EMS through the active communication link.

19. A method for delivering emergency data to an emergency service provider (ESP), the method comprising:
  a) detecting, by an emergency management system (EMS), an active communication link established between the EMS and an ESP through an emergency response application executed on a computing device at the ESP;
  b) receiving, by the emergency management system, an emergency alert generated by an electronic device, the emergency alert comprising emergency data comprising a location and a device identifier associated with the electronic device, wherein the emergency alert is not a phone call between the electronic device and the ESP;
  c) automatically accessing, by the emergency management system, one or more geofences associated with one or more emergency service providers (ESPs) from a geofence database, the one or more geofences comprising a geofence associated with the ESP;
  d) determining, by the emergency management system, that the location is within the geofence associated with the ESP;
  e) in response to determining that the first location is within the geofence associated with the ESP, associating, by the emergency management system, the emergency alert with an identifier of the ESP;
  f) in response to both detecting the active communication link between the EMS and the ESP and associating the emergency alert with the identifier of the ESP, automatically transmitting, by the emergency management system, the emergency data to the ESP through the active communication link; and
  g) providing an emergency response application at an emergency response system, the emergency response application comprising a graphical user interface (GUI) accessible by the computing device at the PSAP, the GUI displaying an interactive map showing the location within the interactive map as an incident location associated with the device identifier, wherein the active communication link is established between the EMS and the ESP through the emergency response application before the EMS receives the emergency alert, and wherein the emergency response application automatically receives the emergency data from the EMS through the active communication link.

* * * * *